US012582142B1

(12) United States Patent
Balatsky et al.

(10) Patent No.: US 12,582,142 B1
(45) Date of Patent: Mar. 24, 2026

(54) FEED SUPPLEMENTS FOR REDUCING ENTERIC METHANE EMISSIONS AND METHODS THEREOF

(71) Applicant: Alga Biosciences Inc., Berkeley, CA (US)

(72) Inventors: Daria Alexandra Balatsky, Oakland, CA (US); Amy Rose Eisenberg, Oakland, CA (US)

(73) Assignee: Alga Biosciences Inc., Berkeley, CA (US)

( * ) Notice: Subject to any disclaimer, the term of this patent is extended or adjusted under 35 U.S.C. 154(b) by 223 days.

(21) Appl. No.: 18/366,528

(22) Filed: Aug. 7, 2023

Related U.S. Application Data

(60) Provisional application No. 63/483,963, filed on Feb. 8, 2023, provisional application No. 63/396,174, filed on Aug. 8, 2022.

(51) Int. Cl.
*A23K 50/10* (2016.01)
*A23K 10/30* (2016.01)
*A23K 20/163* (2016.01)

(52) U.S. Cl.
CPC .............. *A23K 50/10* (2016.05); *A23K 10/30* (2016.05); *A23K 20/163* (2016.05)

(58) Field of Classification Search
CPC ....... A23K 50/10; A23K 20/163; A23K 10/30
USPC ............................................................. 426/2
See application file for complete search history.

(56) References Cited

U.S. PATENT DOCUMENTS

| | | | | |
|---|---|---|---|---|
| 1,475,492 | A | 11/1923 | Krase | |
| 11,006,655 | B2 | 5/2021 | Tomkins | |
| 2016/0339067 | A1 | 11/2016 | Machado | |
| 2019/0174793 | A1 | 6/2019 | Tomkins | |
| 2022/0175670 | A1 * | 6/2022 | Lay | A61K 31/02 |
| 2022/0184159 | A1 * | 6/2022 | Paul | A23K 20/158 |

FOREIGN PATENT DOCUMENTS

| | | | | |
|---|---|---|---|---|
| AU | 2015208661 | A1 | 8/2016 | |
| BR | 112015016962 | A2 | 7/2018 | |
| CA | 2937580 | A1 | 7/2015 | |
| CN | 106232128 | A | 12/2016 | |
| CN | 111374226 | A | 7/2020 | |
| CN | 111686135 | A | 9/2020 | |
| DK | 3102219 | T3 | 1/2021 | |
| EP | 0782442 | B1 * | 1/2004 | A23K 40/30 |
| EP | 3102219 | A2 | 12/2016 | |
| ES | 2219646 | T5 | 11/2008 | |

(Continued)

OTHER PUBLICATIONS

International search report and Written Opinion received for PCT Application No. PCT/US2022/039752, 13 pages, Dec. 9, 2022.

(Continued)

*Primary Examiner* — Jennifer McNeil
(74) *Attorney, Agent, or Firm* — Baker Botts L.L.P.

(57) ABSTRACT

Described here are ruminant animal formulations and feed supplements that reduce enteric methane emissions. Also described are methods of assessing efficacy of the formulation or the feed supplement in reducing enteric methane emissions in ruminant animals. Also described are methods of obtaining meat, milk or wool products from ruminant animals maintained on the formulation or the feed supplement.

58 Claims, 33 Drawing Sheets

100

(56) References Cited

FOREIGN PATENT DOCUMENTS

| | | | | | |
|---|---|---|---|---|---|
| ES | 2838803 | T3 | | 7/2021 | |
| GB | 2075818 | A | | 5/1981 | |
| HU | E053269 | T2 | | 6/2021 | |
| MX | 369067 | B | | 10/2019 | |
| NZ | 722423 | A | | 10/2021 | |
| PL | 3102219 | T3 | | 7/2021 | |
| PT | 3102219 | T | | 11/2020 | |
| WO | WO-2012159186 | A1 | * | 11/2012 | A61P 1/14 |
| WO | 2015/109362 | A2 | | 7/2015 | |
| WO | WO-2021001642 | A1 | * | 1/2021 | A23K 50/70 |
| WO | WO-2021205420 | A1 | * | 10/2021 | A01H 13/00 |
| WO | WO 2023275152 | A1 | | 1/2023 | |
| WO | PCT/US2022/039752 | | | 2/2023 | |
| WO | WO-2023010170 | A1 | * | 2/2023 | A61K 9/127 |
| WO | WO-2023015042 | A1 | * | 2/2023 | A23K 20/10 |

OTHER PUBLICATIONS

Tomkins, et al., "Development of algae based functional foods for reducing enteric methane emissions from cattle", Final Report, Aug. 1, 2015, pp. 1-55. XP055897945, Retrieved from the Internet: https://www.mla.com.au/contentassets/605d6f37d76e4216a90c88e3d7735413/b.cch.6420_final_report.pdf.

Machado, et al., "In Vitro Response of Rumen Microbiota to the Antimethanogenic Red MacroalgaAsparagopsis taxiformis", Microbial Ecology, Springer US, New York, vol. 75, No. 3, Oct. 10, 2017, pp. 811-818.

Bowman, et al., "The Toxicity of Some Halomethanes in Mice", Toxicology and Applied Pharmacology, vol. 44, Issue 1, Apr. 1978, pp. 213-215.

Bryant, Encyclopedia of Toxicology, Bromoform, vol. 1 (Third Edition) Science Deirect, pp. 561-562. https://doi.org/10.1016/B978-0-12-386454-3.00258-X, Apr. 14, 2014.

Camus, et al., Overview of 3 year precommercial seafarming of Macrocystis pyrifera along the Chilean coast; Reviews in Aquaculture, 10:543-559. https://doi.org/10.1111/raq.12185, Oct. 3, 2016.

"Livestock solutions for climate change", Food and Agriculture Organization of the UN, Gleam 2.0, reference year 2010, https://www.fao.org/3/18098e/i8098e.pdf, 8 pages. Retrieved on Aug. 18, 2023.

Hofbauer, "Toxic or Otherwise Harmful Algae and the Built Environment", Toxins, 2021,13, 465. https://doi.org/10.3390/toxins13070465, 28 pages, Jun. 30, 2021.

IARC (International Agency for Research on Cancer), Working Group on the Evaluation of Carcinogenic Risks to Humans; Re-evaluation of Some Organic Chemicals, Hydrazine and Hydrogen Peroxide; IARC Monographs on the Evaluation of Carcinogenic Risks to Humans, vol. 71, 1999, 1597 pages. Retrieved on Aug. 8, 2023.

Nutrient Requirements of Beef Cattle, Seventh Revised Edition: Update 2000, National Research Council (NRC), The National Academies Press, Washington, DC, 249 pages. http://nap.nationalacademies.org/9791. Retrieved on Aug. 8, 2023.

Nutrient Requirements of Dairy Cattle, NRC, National Research Council, Seventh Revised Edition, 2001; National Academy Press, Washington DC, 401 pages. Retrieved on Aug. 8, 2023.

Paul, et al., Chemical defense against bacteria in the red alga *Asparagopsis armata*: linking structure with function, Marine Ecology Progress Series, vol. 306: 87-101, Jan. 11, 2006. https://www.int-res.com/articles/meps2006/306/m306p087.pdf.

Pizzolla, False Irish moss (*Mastocarpus stellatus*); In Tyler-Walters H. and Hiscock K. Marine Life Information Network: Biology and Sensitivity Key Information Reviews, Plymouth: Marine Biological Association of the United Kingdom, 6 pages. https://www.marlin.ac.uk/species/detail/1446, May 29, 2008.

Preskitt, Acanthophora spicifera, University of Hawaii, Botany Department, 2001, 2 pages. Retrieved on Aug. 8, 2023.

Guidelines for drinking-water quality, World Health Organization, Fourth edition incorporating the first and second addenda, ISBN 978-92-4-004506-4 (electronic version), 614 pages. Retrieved on Aug. 8, 2023.

Production, Management and the Environment: Environmental Quality, J. Anim. Sci. vol. 89, E-Suppl. 1/J. Dairy Sci. vol. 94, E-Suppl. 1, pp. 757-760, retrieved on Aug. 8, 2023.

U.S. Appl. No. 18/366,523, filed Aug. 7, 2023, Daria Alexandra Balatsky.

U.S. Appl. No. 18/366,532, filed Aug. 7, 2023, Daria Alexandra Balatsky.

B. Cancho et al.; Behavior of halogenated disinfection by-products in the water treatment plant of Barcelona, Spain; Bulletin of Environmental Contamination Toxicology, 63: 610-617, Aug. 19, 1999.

N.A. Paul, et al.; Chemical defence against bacteria in the red alga *Asparagopsis armata*: linking structure with function; Marine Ecology Progress Series, vol. 306: 87-101, Jan. 11, 2006.

John R. Hardee, et al; Quantitative Measurement of Bromoform in Swimming Pool Water Using SPME with GC-MS, An Undergraduate Instrumental Analysis Experiment; Journal of Chemical Education vol. 79, No. 5, May 2022.

D. Wade Abbott, et al.; Seaweed and Seaweed Bioactives for Mitigation of Enteric Methane: Challenges and Opportunities. Animals (Basel). 10(12):2432. doi: 10.3390/ani10122432, Dec. 18, 2020.

Isabell A. Abbott; The uses of seaweed as food in Hawaii; Economic Botany, 32(4), 409-412, Aug. 1, 1978.

Bowman, F., et al.; The Toxicity of Some Halomethanes in Mice; Toxicology and Applied Pharmacology 44, 213-215, 1978.

M.A. Bryant; Bromoform; Encyclopedia of Toxicology, vol. 1 (Third Edition) pp. 561-562, https://doi.org/10.1016/B978-0-12-386454-3.00258-X, 2014.

Carolina Camus, et al.; Overview of 3 year precommercial seafarming of Macrocystis pyrifera along the Chilean coast; Reviews in Aquaculture, 10: 543-559, https://doi.org/10.1111/raq.12185, 2018.

L.J. Carpenter, et al.; On temperate sources of bromoform and other reactive organic bromine gases; Journal of Geophysical Research, vol. 105, No. D16, pp. 20539- 20547, doi:10.1029/2000JD900242, Aug. 27, 2000.

Chemsafety Pro; n-Octanol/Water Partition Coefficient (Kow/logKow); https://www.chemsafetypro.com/Topics/CRA/n_Octanol_Water_Partition_Coefficient_Kow.html, Jan. 13, 2016.

I. Chu, et al.; The acute toxicity of four trihalomethanes in male and female rat;. Toxicolofy and Applied Pharmacology, vol. 52. Issue 2, pp. 351-353, Feb. 1980.

A. Cieslak, et al.; Plant components with specific activities against rumen methanogens; The Animal Consortium, 7:s2, p. 253-265, doi: 10.1017/S1751731113000852. PMID: 23739468, Apr. 14, 2013.

Stuart E. Denman, et al.; Quantitation and diversity analysis of ruminal methanogenic populations in response to the antimethanogenic compound bromochloromethane; Federation of European Microbiological Societies 62, pp. 313-322, Nov. 2007.

Marie T. Dittmann, et al.; Influence of ruminal methane on digesta retention and digestive physiology in non-lactating dairy cattle; British Journal of Nutrition, 116, pp. 763-773, https://doi.org/10.1017/S0007114516002701, Sep. 14, 2016.

Guido Rychen, et al.; Guidance on the assessment of the safety of feed additives for the target species. EFSA Journal, https://doi.org/10.2903/j.efsa.2017.5021, Sep. 26, 2017.

EPA. (2000). Hazard Summary for Bromoform. (Summary created in Apr. 1992, updated in Jan. 2000), https://www.epa.gov/sites/default/files/2016-09/documents/bromoform.pdf.

EPA Office of Water; Drinking Water Criteria Document for Brominated Trihalomethanes; Document No. EPA-822-R-05-01, https://www.epa.gov/sites/default/files/2019-03/documents/dw-brominated-trihalomethanes.pdf, Nov. 15, 2005.

EPA, United States Environmental Protection Agency; EPA Protocol for the Third Review of Existing National Primary Drinking Water Regulations; Document No. EPA 810-R-16-007, https://www.epa.gov/sites/default/files/2016-12/documents/810r16007.pdf, Dec. 2016.

(56) References Cited

OTHER PUBLICATIONS

Food and Agriculture Organization of the United Natiosn; Livestock solutions for climate change; https://www.fao.org/3/18098e/i8098e.pdf, 2017.
Andrea Flynn; Farmed Seaweed; Monterey Bay Aquarium Seafood Watch, Jul. 28, 2014.
Christopher R.K. Glasson, et al.; Benefits and risks of including the bromoform containing seaweed *Asparagopsis* in feed for the reduction of methane production from ruminants; Algal Research, vol. 64, 102673, https://doi.org/10.1016/j.algal.2022.102673, May 2022.
H.K. Goering, et al.; Forage Fiber Analyses (Apparatus, Reagents, Procedures, and Some Application); Agriculture Research Service, U.S. Department of Agriculture, Handbook 379, Jacket No. 387-598, https://books.google.com/books?id=yn8wAAAAYAAJ&printsec=frontcover&source=gbs_ge_summary_r&cad=0#v=onepage&q&f=false, Dec. 1970.
Woldgang Karl Hofbauer; Toxic or Otherwise Harmful Algae and the Built Environment; Toxins, 13, 465. https://doi.org/10.3390/toxins13070465, 2021.
Catriona L. Hurd, et al.; Seaweed Ecology and Physiology (2nd ed.); Cambridge University Press. doi:10.1017/CBO9781139192637, Aug. 2014.
IARC (International Agency for Research on Cancer), Working Group on the Evaluation of Carcinogenic Risks to Humans; Re-evaluation of Some Organic Chemicals, Hydrazine and Hydrogen Peroxide; IARC Monographs on the Evaluation of Carcinogenic Risks to Humans, No. 71, 1999.
E.D. Johnson, et al.; Some effects of methane inhibition in ruminants (steers), Canadian Journal of Animal Science, 52: 703-712 (Dec. 1972), Aug. 28, 1972.
Robert D. Kinely, et al.; Mitigating the carbon footprint and improving productivity of ruminant livestock agriculture using a red seaweed; Journal of Cleaner Production, https://doi.org/10.1016/j.jclepro.2020.120836, Feb. 29, 2020.
T. Knight, et al.; Chloroform decreases rumen methanogenesis and methanogen populations without altering rumen function in cattle; Animal Feed Science and Technology, https://doi:10.1016/j.anifeedsci,2011.04.059, Jun. 23, 2011.
A.F. Koontz, et al.; Effect of ractopamine on whole body and splanchnic energy metabolism in Holstein steers; Canadian Journal of Animal science 90(1):77-85, Dec. 3, 2009.
Stefan Kraan, et al.; Commercial farming of Asparagopsis armata (Bonnemaisoniceae, Rhodophyta) in Ireland, maintenance of an introduced species?; Journal of Applied Phycology 17, 103-110, https://doi.org/10.1007/s10811-005-2799-5, Feb. 23, 2005.
Frank Laturnus, et al.; Release of reactive organic halogens by the brown macroalga *Saccharina latissima* after exposure to ultraviolet radiation; Polar Research 29 2010 379-384, https://doi.org/10.1111/j.1751-8369.2010.00167.x, Dec. 1, 2010.
Ian J. Lean, et al.; A meta-analysis of effects of dietary seaweed on beef and dairy cattle performance and methane yield; PLOS ONE 16(7): e0249053, https://doi.org/10.1371/journal.pone.0249053, Jun. 29, 2021.
Lorenna Machado, et al.; Identification of bioactives from the red seaweed *Asparagopsis taxiformis* that promote antimethanogenic activity in vitro; Journal of Applied Phycology, https://doi.org/10.1007/s10811-016-0830-7, Mar. 10, 2016.
Harinder P.S. Makkar, et al.; Seaweeds for livestock diets: A review; Animal Feed Science and Technology, 212, 1-17, https://dx.doi.org/10.1016/j.anifeedsci.2015.09.018, Sep. 21, 2015.
Gonzalo Martinez-Fernandez, et al.; Methane inhibition alters the microbial community, hydrogen flow, and fermentation response in the rumen of cattle; Frontiers in Microbiology, vol. 7, Article 1122; https://doi.org/10.3389/fmicb.2016.01122, Jul. 19, 2016.
Gonzalo Martinez-Fernandez, et al.; Phloroglucinol degradation in the rumen promotes the capture of excess hydrogen generated from methanogenesis inhibition; Frontiers in Microbiology, vol. 8, Article 1871, https://doi.org/10.3389/fmicb.2017.01871, Oct. 5, 2017.
Byeng R. Min, et al.; The role of seaweed as a potential dietary supplementation for enteric methane mitigation in ruminants: Challenges and opportunities; Animal Nutrition, 7(4), 1371-1387, ISSN 2405-6545, https://doi.org/10.1016/j.aninu.2021.10.003, Oct. 9, 2021.
D.L. Morris, et al.; Dietary fatty acid and starch content and supplemental lysine supply affect energy and nitrogen utilization in lactating Jersey cows; American Dairy Science Association, J. Dairy Sci 104:10753-10779. https://doi.org/10.3168/jds.2020-20055, Mar. 14, 2021.
Wouter Muizelaar, et al; Safety and Transfer Study: Transfer of Bromoform Present in Asparagopsis taxiformis to Milk and Urine of Lactating Dairy Cows; Foods, 10(3):584, https://doi.org/10.3390/foods10030584, Mar. 10, 2021.
National Research Council (NRC); Nutrient Requirements of Beef Cattle: Seventh Revised Edition: Update 2000; The National Academies Press, Washington, DC, http:/nap.nationalacademies.org/9791, 2000.
M. Niu, et al.; Effect of dietary crude protein and forage contents on enteric methane emissions and nitrogen excretion from dairy cows simultaneously; Aminal Production Science, 56:312-321, http://dx.doi.org/10.1071/AN15498, Feb. 9, 2016.
Natalja P. Nørskov, et al.; Targeted and Untargeted Metabolic Profiling to Discover Bioactive Compounds in Seaweeds and Hemp Using Gas and Liquid Chromatography-Mass Spectrometry; Metabolites, 11, 259, https://doi.org/10.3390/ metabo11050259, Apr. 22, 2021.
NRC, National Research Council; Nutrient Requirements of Dairy Cattle, Seventh Revised Edition, 2001; National Academy Press, Washington DC, 2001.
Ronald L. Melnick, Ph.D.; NTP Technical Report On The Toxicology And Carcinogenesis Studies Of Tribromomethane (Bromoform) (Cas No. 75-25-2) In F344/N Rats and B6C3F1 Mice. National Toxicology Program. NIH Publication No. 89-2806, https://ntp.niehs.nih.gov/sites/default/files/ntp/htdocs/lt_rpts/tr350.pdf, May 1989.
N.A. Paul , et al.; Chemical defense against bacteria in the red alga *Asparagopsis armata*: linking structure with function; Marine Ecology Progress Series, vol. 306: 87-101, 2006, https://www.int-res.com/articles/meps2006/306/m306p087.pdf, Jan. 11, 2006.
Leonel Pereira, et al.; Edible Seaweeds of the World; https://doi.org/10.1201/b19970, Jan. 13, 2016.
P.F Pizzolla; False Irish moss (*Mastocarpus stellatus*); In Tyler-Walters H. and Hiscock K. Marine Life Information Network: Biology and Sensitivity Key Information Reviews, Plymouth: Marine Biological Association of the United Kingdom, https://www.marlin.ac.uk/species/detail/1446, 2008.
Jose M.S. Ponte, et al.; *Asparagopsis* Genus:What We Really Know About Its Biological Activities and ChemicalComposition. Molecules, 27,1787, https://doi.org/10.3390/ molecules27061787, Mar. 9, 2022.
Linda Preskitt; Acanthophora spicifera; University of Hawaii, Botany Department (2002).
Michael Y. Roleda, et al.; Chemical profiling of Ulva species for food applications: What is in a name?; Food Chemistry, 361, 130084, ISSN 0308-8146, ttps://doi.org/10.1016/j.foodchem.2021.130084, May 12, 2021.
Breanne M. Roque, et al; Inclusion of Asparagopsis armata in lactating dairy cows' diet reduces enteric methane emission by over 50 percent; Journal of Cleaner Production 234 (2019) 132e138, https://doi.org/10.1016/j.jclepro.2019.06.193, Jun. 20, 2019.
Breanne M. Roque, et al; Red seaweed (*Asparagopsis taxiformis*) supplementation reduces enteric methane by 80 percent in beef steers. PLoS ONE 16(3): e0247820, https://doi.org/10.1371/journal.pone.0247820, Mar. 17, 2021.
Sonia A.O. Santos, et al.; Chlorophyta and Rhodophyta macroalgae: a source of health promoting phytochemicals; Food Chemistry 183 (2015) 122-128, http://dx.doi.org/10.1016/j.foodchem.2015.03.006, Mar. 11, 2015.
H. A. Stefenoni, et al.; Effects of the macroalga *Asparagopsis taxiformis* and oregano leaves on methane emission, rumen fermentation, and lactational performance of dairy cows; Journal of Dairy Science vol. 104 No. 4, 2021, doi: 10.3168/jds.2020-19686, Jan. 28, 2021.
N.W. Tomkins, et al.; A bromochloromethane formulation reduces enteric methanogenesis in cattle fed grain-based diets, Animal

(56) References Cited

OTHER PUBLICATIONS

Production Science 49, 1053-1058, https://www.researchgate.net/publication/248903888, Jan. 2009.
William S Utley; Bromoform; Encyclopedia of Toxicology (Second Edition), https://doi.org/10.1016/B0-12-369400-0/00151-4, Nov. 18, 2005.
Breanna M. Roque, et al; Effect of Mootral—a garlic- and citrus-extract-based feed additive-on enteric methane emissions in feedlot cattle; Translational Animal Science, 3(4): 1383-1388, doi: 10.1093/tas/txz133, Aug. 9, 2019.
Sandra Vijn, et al.; Key considerations for the use of seaweed to reduce enteric methane emissions from cattle; Frontiers in Veterinary Science:1135, doi: 10.3389/fvets.2020.597430, Dec. 23, 2020.
World Health Organization; Guidelines for drinking-water quality; World Health Organization, Fourth edition incorporating the first and second addenda, ISBN 978-92-4-004506-4 (electronic version), 2022.
J.M. Wood; The Reaction of Multihalogenated Hydrocarbons with free and bound reduced vitamin B12; Biochemistry vol. 1, No. 5, 1707-1713, May 1968.
M. Xu, et al.; Yucca schidigera extract decreases in vitro methane production in a variety of forages and diets; Animal Feed Science and Technology, 159 18-26, doi:10.1016/j.anifeedsci.2010.05.005, May 22, 2010.
Zimmerman, et al.; Development of a user-friendly online system to quantitatively measure metabolic gas fluxes from ruminants. Journal of Dairy Jan. 2011 Science, 94 (E-Suppl. 1) (2011), 1 page (Abstract).

* cited by examiner

100

110 ⎤　Prepare a mixture comprising at least one
　　　　methanogenesis inhibitor

120 ⎤　Encapsulate the mixture within a carrier,
　　　　wherein the carrier comprises a core
　　　　comprising the methanogenesis inhibitor

200

210 —| Prepare a water phase solution comprising a spray dry powder substrate

220 —| Prepare an oil phase solution comprising one or more oil solvents, one or more emulsifiers, and the methanogenesis inhibitor 230 —| Mix the oil phase solution with the water phase solution to obtain a spray drying stock solution 240 —| Spray drying the spray drying stock solution

300

310 — Prepare an oil phase solution comprising the methanogenesis inhibitor and one or more emulsifiers 320 — Mix the oil phase solution with an adsorbent to obtain a mixture 330 — Pass the mixture through a sieve <u>500</u>

510   Prepare a solution comprising the methanogenesis inhibitor

520   Melt wax in a vessel

530   Homogenize the solution comprising the methanogenesis inhibitor into the molten wax to obtain a homogenate 540   Inject the homogenate onto a spinning disk of a spin disk atomizer

700

710    Administer the ruminant animal, (1) a formulation comprising at least one methanogenesis inhibitor encapsulated in a biologically acceptable carrier, or (2) a feed supplement comprising the formulation, a substrate, and a binder 720    Harvest the slaughtered meat product from the ruminant animal

800

810 ⌐ | Administer the ruminant animal, (1) a formulation comprising at least one methanogenesis inhibitor encapsulated in a biologically acceptable carrier, or (2) a feed supplement comprising the formulation, a substrate, and a binder 820 ⌐ | Harvest the dairy milk product from the ruminant animal <u>900</u>

910   Administer the ruminant animal, (1) a formulation comprising at least one methanogenesis inhibitor encapsulated in a biologically acceptable carrier, or (2) a feed supplement comprising the formulation, a substrate, and a binder 920   Harvest the wool product from the ruminant animal

1100

1110

Administer to a ruminant animal a feed supplement comprising a formulation comprising at least one methanogenesis inhibitor encapsulated in a biologically acceptable carrier, a substrate, and a binder

1120

Reduce methane production

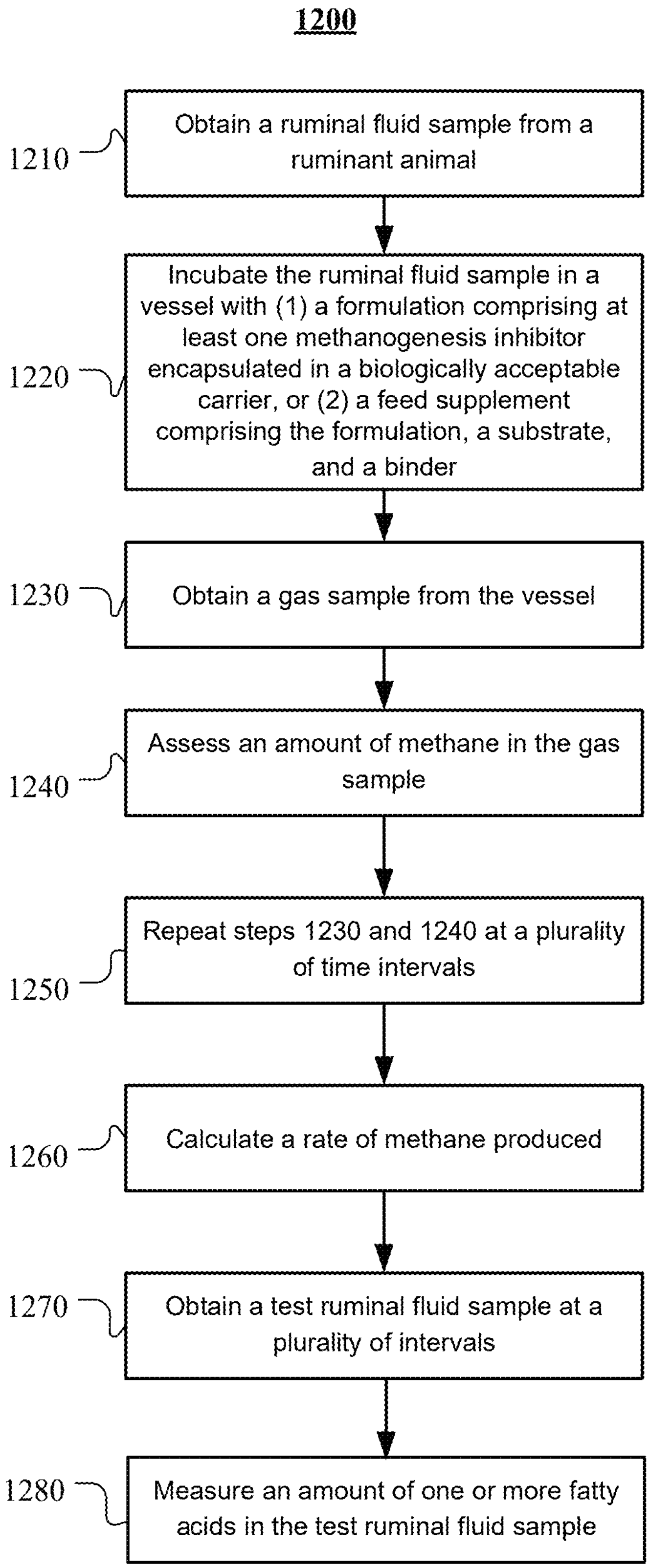

1210 — Obtain a ruminal fluid sample from a ruminant animal

1220 — Incubate the ruminal fluid sample in a vessel with (1) a formulation comprising at least one methanogenesis inhibitor encapsulated in a biologically acceptable carrier, or (2) a feed supplement comprising the formulation, a substrate, and a binder 1230 — Obtain a gas sample from the vessel 1240 — Assess an amount of methane in the gas sample 1250 — Repeat steps 1230 and 1240 at a plurality of time intervals 1260 — Calculate a rate of methane produced 1270 — Obtain a test ruminal fluid sample at a plurality of intervals 1280 — Measure an amount of one or more fatty acids in the test ruminal fluid sample

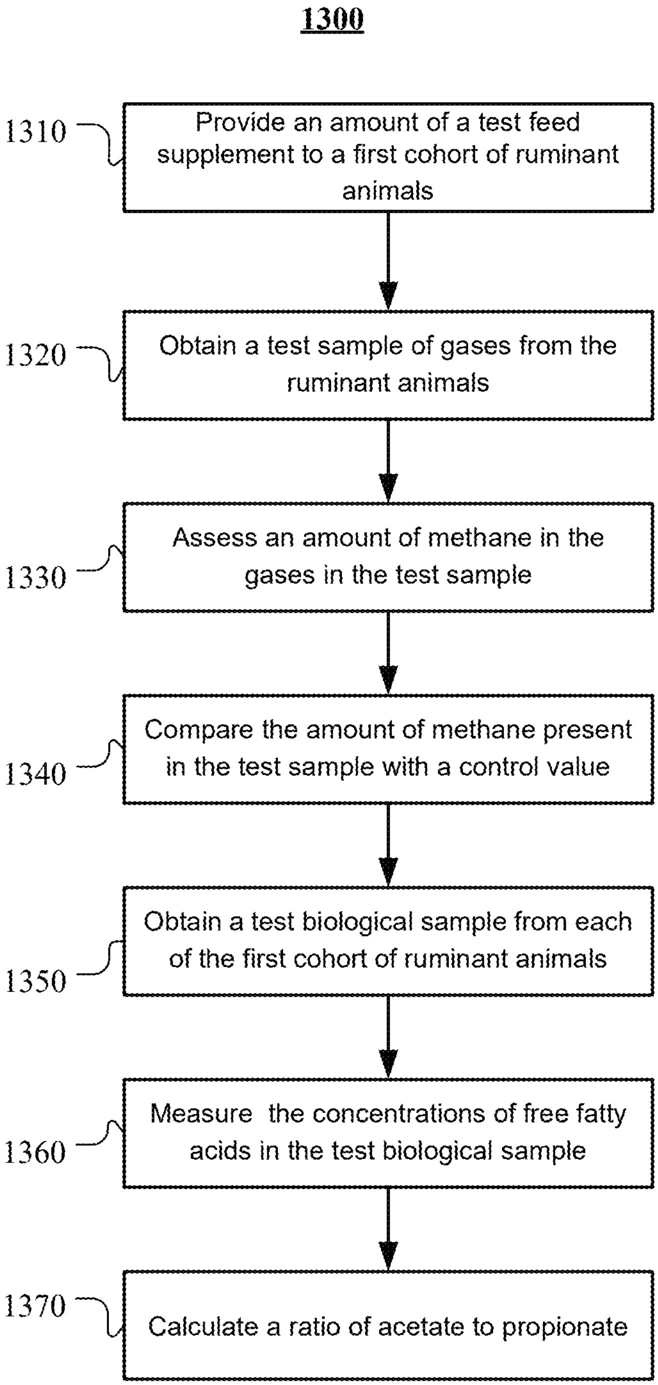

1310 — Provide an amount of a test feed supplement to a first cohort of ruminant animals 1320 — Obtain a test sample of gases from the ruminant animals 1330 — Assess an amount of methane in the gases in the test sample 1340 — Compare the amount of methane present in the test sample with a control value 1350 — Obtain a test biological sample from each of the first cohort of ruminant animals 1360 — Measure the concentrations of free fatty acids in the test biological sample 1370 — Calculate a ratio of acetate to propionate

| Sample ID | Formulation Description | Disk Speed (RPM) | Disk Temp (°C) | Reservoir Temp (°C) | Wax Temp (°C) | Pour Time onto disk (sec) | % Yield | Particle Size Dv 10 (mm) | Particle Size Dv 50 (mm) | Particle Size Dv 90 (mm) | Particle Size Span |
|---|---|---|---|---|---|---|---|---|---|---|---|
| 22-0202-038-P4 | 88g Carnauba wax + 12g bromoform | 4000 | 93 | 94 | 92 | 13 | 73 | 71.1 | 134 | 230 | 1.189 |
| 22-0202-038-P5 | 70g Carnauba wax + 18g soybean oil + 12g bromoform | 4000 | 93 | 94 | 92 | 13 | 63.4 | 64.1 | 123 | 209 | 1.174 |
| 22-0202-038-P6 | 88g Dynasan® 118+ 12g bromoform | 4000 | 90 | 86 | 86 | 13 | 64.5 | 64.4 | 120 | 202 | 1.154 |
| 22-0202-038-P7 | 70g Dynasan® 118 + 18g soybean oil + 12g bromoform | 4000 | 90 | 86 | 86 | 13 | 60.8 | 65.8 | 122 | 207 | 1.15 |
| 22-0202-038-P8 | 88g Stearic Acid + 12g bromoform | 4000 | 82 | 84 | 82 | 13 | 70.4 | 72.6 | 138 | 230 | 1.14 |
| 22-0202-038-P9 | 70g Stearic Acid + 18g soybean oil + 12g bromoform | 4000 | 82 | 84 | 82 | 13 | 61.2 | 69.2 | 132 | 221 | 1.152 |
| 22-0202-038-P10 | 88g Beeswax + 12g bromoform | 4000 | 75 | 70 | 70 | 13 | 56.3 | 88.6 | 155 | 249 | 1.033 |
| 22-0202-038-P11 | 70g Beeswax + 18g soybean oil + 12g bromoform | 4000 | 75 | 70 | 70 | 13 | 58.9 | 75.4 | 141 | 235 | 1.137 |
| 22-0202-038-P12 | 88g Paraffin Wax + 12g bromoform | 4000 | 65 | 65 | 65 | 13 | 60.1 | 73.9 | 135 | 227 | 1.13 |
| 22-0202-038-P13 | 70g Paraffin wax + 18g soybean oil + 12g bromoform | 4000 | 65 | 65 | 65 | 13 | 55.8 | 76.8 | 142 | 237 | 1.124 |

Figure 15

| No. | Material name/description | Quantity (wt/wt %) | Use |
|---|---|---|---|
| 1 | Kelp - species will vary depending upon availability and cost; will be sourced from within the categories defined within AAFCO definitions 60.19 and 60.76[a] | 83.32 | Source of energy |
| 2 | Dry blend comprising methanogenesis inhibitor(s) | 11.63 | |
| | Dextrin | 50.7 | Formulation aid[1], processing aid[2], stabilizer[3], thickener[4], surface-finishing agent[5]. |
| | Gum Arabic | 20.0 | Stabilizer[6] |
| | Soybean Oil | 18.28 | Adherent |
| | Bromoform | 8.0-9.85 | Methanogenesis inhibitor |
| | Xanthan Gum | 0.98 | [7]Stabilizer, emulsifier, thickener, suspending agent, bodying agent, foam enhancer |
| 3 | Soybean oil | 5.05 | Adhering dry proprietary blend to kelp substrate |

[a]There are several families of seaweed that are included in AAFCO definitions:
60.19 (dried kelp from the families of Laminariacae and Fucaceae),
60.76 (Dried Seaweed meal – the product of drying and grinding non-toxic macroscopic marine algae of the following botanical divisions: Division Rhodophyta (red algae), Division Phaeophyta (Brown algae), Division Chlorophyta (Green algae)
[1] GRAS. 21 CFR § 184.1277 § 170.3(o)(14)
[2] GRAS. 21 CFR § 184.1277 § 170.3(o)(24)
[3] GRAS. 21 CFR § 184.1277 § 170.3(o)(28)
[4] GRAS. 21 CFR § 184.1277 § 170.3(o)(28)
[5] GRAS. 21 CFR § 184.1277 § 170.3(o)(30)
[6] GRAS. 21 CFR § 582.7330
[7] 21 CFR s172.695

Figure 17

FEED SUPPLEMENTS FOR REDUCING ENTERIC METHANE EMISSIONS AND METHODS THEREOF

PRIORITY

This application claims the benefit under 35 U.S.C. § 119(e) of U.S. Provisional Patent Application No. 63/483,963, filed 8 Feb. 2023, and U.S. Provisional Patent Application No. 63/396,174, filed 8 Aug. 2022, each of which are incorporated by reference herein.

TECHNICAL FIELD

This disclosure generally relates to methanogenesis inhibitors, and in particular relates to compositions and methods for reducing enteric methane emissions from ruminant animals.

BACKGROUND

Emissions of greenhouse gases (GHG) have been implicated in global warming and extreme climate change. The Food and Agriculture Organization of the United Nations (FAO) has identified agriculture, more specifically livestock production, as a major contributor to worldwide GHG production. The U.S. Environmental Protection Agency (EPA) estimates that 95% of methane emissions resulting from livestock production is attributable to cattle (Inventory of U.S. Greenhouse Gas Emissions and Sinks, 2002). Although methane is short-lived relative to other greenhouse gases (GHG), persisting in the atmosphere for approximately 10 years, it has a significant impact on the climate due to its global warming potential (GWP), which is ~28-times higher than that of carbon dioxide ($CO_2$) as it is significantly more effective in trapping heat. Methane is the second-most abundant greenhouse gas after carbon dioxide ($CO_2$). Methane's short lifespan means that taking steps now to significantly reduce methane will have a significant impact within our lifetimes.

Agriculture contributes around 40-46% of global methane emissions. Because of rising food production, these emissions are on a path to increase roughly 40% by 2050. Of these emissions, two-thirds are from methanogenesis in livestock, primarily, cattle, buffalo, sheep, and goats and are mostly released by eructation (in contrast to manure).

Enteric fermentation is a highly evolved process that allows ruminant animals to digest cellulose, the basic component of plant cell walls. Rumen microbes ferment simple and complex carbohydrates like cellulose to produce volatile fatty acids (VFAs), which can satisfy over 70% of the energy requirements of the animal. However, production of certain VFAs also produces hydrogen ($H_2$), which is converted to methane ($CH_4$) by methanogenic archaea (i.e., methanogens). Methane production from carbon in ruminant animals represents a loss of energy, about 2-12% of gross energy intake from feed.

Numerous approaches for mitigating enteric methane emissions have been proposed and investigated over the last several decades, including rumen manipulation through feed supplements that indirectly or directly inhibit methanogenesis including administering seaweeds containing halogenated compounds. Efforts to reduce methane production in cattle have included dietary interventions to alter rumen fermentation and rate of feed passage through the rumen, supply of alternative hydrogen sinks, and/or reducing the population of methanogenic archaea. Other approaches include the use of feed supplements that indirectly or directly inhibit methanogenesis including administering seaweeds containing halogenated compounds in cattle diets to reduce enteric methane production (Roque et al., 2021; Kinley et al., 2020; Vijn et al., 2020; Glasson et al., 2022).

U.S. Pat. No. 11,006,655, incorporated herein by reference, discloses a method for improving the growth performance of a livestock animal in various farming systems, including providing a red marine macroalgae to the farming systems to enable consumption of the red marine macroalgae. U.S. Pat. No. 11,006,655 describes a formulation such that the animal is provided with of red marine macroalgae per day for animals maintained at pasture and states that amounts to approximately 1-5% of algae on a dry matter basis or 1-3% on an organic matter basis per day. U.S. Pat. No. 11,006,655 also discloses providing an animal with approximately 200-600 g/day of algae for animals on a finishing diet in feedlots. In one example, U.S. Pat. No. 11,006,655 discloses the filamentous tetrasporophyte lifestage of *Asparagopsis* as a potential feedstock for a feed premix. However, several factors limit potential use of *Asparagopsis* as a feed supplement in an amount sufficient to significantly inhibit methanogenesis in ruminant animals. Some of these include its unpleasant odor and taste, high iodine content, epiphytic nature, and the lack of capacity to synthesize substantive concentrations of the halogenated compounds (especially in male *Asparagopsis* specimens). Additionally, concentrations of bromoform and other halogenated compounds available from *Asparagopsis taxiformis* and other red algae are inconsistent due to variations in growth environment, seasonality, species, strain, life stage, and cultivation methods, among others.

The poor palatability of seaweed is evidenced by reports that cows regularly refused seaweed or selected against it when mixed with their fresh feed, (Muizelaar et al., 2021). Roque et al., 2021 reports that seaweed fed at higher levels in the diet has led to a reduced dry matter intake (DMI) in beef cattle. Similar reports have been issued for dairy cows (Roque et al., 2019, Stefenoni et al., 2021, Muizelaar et al., 2021). A lower feed intake is particularly problematic as this can also lead to lower performance as shown by reduced milk yield when cows are fed high amounts of seaweed (Roque et al., 2019, Stefenoni et al., 2021, Muizelaar et al., 2021).

Seaweed is also known to contain high iodine levels (Makkar et al., 2016). For example, feeding seaweed (*Asparagopsis taxiformis*) at 0.25% and 0.5% inclusion level in the diet to beef cattle resulted in a daily intake of 106-225 mg/day of iodine (Roque et al., 2021). This exceeds the recommended daily iodine intake levels of around 5 mg/day based on a 0.5 mg/kg Dry Matter Intake (National Research Council, 2006) and 10 mg/kg DM intake in this study. The transfer of iodine in milk is of significant concern since feeding *Asparagopsis taxiformis* at 0.5% in the diet can result in a five-fold increase in iodine levels in milk (3 mg/L, Lean et al., 2021).

For livestock producers, it is important to evaluate the economic benefits of any future anti-methanogenic feed supplement. Even if regulations mandate use of products to reduce methane emissions, farmers' financial burden could increase if animal performance is not improved simultaneously through improved productivity, efficiency, health, or quality of products including, meat, milk, leather, and wool. The value of these improvements must therefore be sufficient to cover the costs pertaining to reducing enteric methane emissions or, additional incentive programs must be established to achieve widespread adoption.

Presently, the use of algae supplements to reduce enteric methane emissions is fraught with significant challenges including poor animal performance, making it economically non-viable. Cost effective and readily implementable enteric methane reduction strategies are therefore needed to enable farmers to adopt clean farming practices with limited financial hardships. The disclosed subject matter addresses this long-standing need and desire in the art.

SUMMARY OF PARTICULAR EMBODIMENTS

In particular embodiments of the presently disclosed subject matter, there is provided a formulation comprising at least one methanogenesis inhibitor and a biologically acceptable carrier, wherein the carrier comprises a core comprising the methanogenesis inhibitor.

In particular embodiments, the methanogenesis inhibitor is an organohalide or a salt thereof.

In particular embodiments, the organohalide salt has a formula $(X_3C—)_aY+$, where X is a halide selected from bromine, chlorine, or iodine; and Y is an inorganic cation, when a=1, or 2, or 3, the Y is a monovalent, or a divalent, or a trivalent inorganic cation respectively.

In particular embodiments, the organohalide salt is has the formula:

$(Br_3C—)Na+$, or $(Br_3C—)K+$

In particular embodiments, the organohalide is a haloform selected from a group consisting of: bromoform, chloroform, iodoform, dibromoacetate, bromochloro acetate, dibromoacetic acid, 3,3 dibromoacrylic acid, 2-bromoethanesulfonic acid, salts thereof, derivatives thereof, and combinations thereof.

In particular embodiments, the methanogenesis inhibitor is present in the formulation in an amount from approximately 0.1% w/w to approximately 10% w/w.

In particular embodiments, the methanogenesis inhibitor is present in the formulation in an amount from approximately 0.22% w/w to approximately 1.3% w/w.

In particular embodiments, the carrier is an oil, a wax, a microparticle, a microsphere, a microcapsule, or a nanoparticle, wherein the methanogenesis inhibitor is encapsulated in the carrier. In particular embodiments, the carrier further comprises an excipient.

In particular embodiments, the excipient is one or more of silicon dioxide, a maltodextrin, a starch, N-CREAMER® 2000, CAPSUL® TA, HI-CAP® 100, N-LOK® 1930, N-Zorbit™ 2144, or N-Zorbit™ M.

In particular embodiments, the carrier is adapted for sustained delivery of the methanogenesis inhibitor.

In particular embodiments, the carrier is a wax-based carrier, or a poly(lactic-co-glycolic acid) (PLGA) based carrier for sustained delivery.

In particular embodiments, the methanogenesis inhibitor is present in the formulation in an amount from approximately 4.21% w/w to approximately 8.44% w/w.

In particular embodiments, the formulation is administrable via oral route or parenteral route.

In particular embodiments, the formulation is administrable via parenteral route, wherein the parenteral route is intravenous, intramuscular, subcutaneous, intraperitoneal, intramammary, or topical.

In particular embodiments, the methanogenesis inhibitor is an exogenous methanogenesis inhibitor not derived from a natural (biological) source.

In particular embodiments of the presently disclosed subject matter, there is provided feed supplement for reducing enteric methane emissions. The feed supplement comprises a formulation comprising at least one methanogenesis inhibitor encapsulated in a biologically acceptable carrier, a substrate, and a binder.

In particular embodiments, the methanogenesis inhibitor is an organohalide or a salt thereof.

In particular embodiments, the feed supplement further comprises an essential oil, an antibiotic, an ionophore, a saponin, a tannin, a terpene, 3-Nitrooxypropanol, propylene glycol, fumaric acid, a green tea extract, a grape pomace, a Mootral™, an Agolin™, a Biochar a dried yeast, a probiotic (direct feed microbials), a fiber, a prebiotic, or a combination thereof.

In particular embodiments, the feed supplement comprises an essential oil comprising one or more of oregano oil, lemongrass oil, garlic oil, cinnamon oil, *eucalyptus* oil, clove oil, rosemary oil, thyme oil, paprika oil, juniper oil, ginger oil, lavender oil, lemon oil, or peppermint oil.

In particular embodiments, the feed supplement comprises an ionophore comprising one or more of monensin, lasalocid, salinomycin, or laidlomycin.

In particular embodiments, the feed supplement comprises a probiotic comprising one or more of a methane oxidizing bacteria, a propionic acid producing bacteria, an acetic acid producing bacteria, or a butyric acid producing bacteria.

In particular embodiments, the feed supplement comprises a prebiotic comprising one or more of inulin, pectin, or chitosan.

In particular embodiments, the organohalide salt has a formula $(X_3C—)_aY+$, where X is a halide selected from bromine, chlorine, or iodine; and Y is an inorganic cation, when a=1, 2, 3, the Y is a monovalent, a divalent, a trivalent inorganic cation respectively.

In particular embodiments, the organohalide salt is has the formula;

$(Br_3C—)Na+$, or $(Br_3C—)K+$

In particular embodiments, the organohalide is a haloform selected from a group consisting of bromoform, chloroform, derivatives thereof, and combinations thereof.

In particular embodiments, the carrier is an oil, a wax, a microparticle, a microsphere, a microcapsule, or a nanoparticle, and wherein the methanogenesis inhibitor is encapsulated in the carrier.

In particular embodiments, the carrier further comprises an excipient.

In particular embodiments, the haloform is present in the feed supplement at a concentration from approximately 10% w/w to approximately 30% w/w.

In particular embodiments, the haloform and the carrier are present in a ratio from approximately 0.1:1 to approximately 100:1.

In particular embodiments, the substrate is an algae, and wherein the methanogenesis inhibitor is an exogenous methanogenesis inhibitor not derived from the algae.

In particular embodiments, the substrate is an algae, wherein the algae is a Rhodophyta (red algae), a Phacophyta (Brown algae), a Chlorophyta (Green algae) or a combination thereof.

In particular embodiments, the substrate is an algae, wherein the algae is one or more of a *Porphyra* spp, a *Gracilaria* spp, a *Undaria pinnatifida*, a *Saccharina latissima*, a *Laminaria digitata*, a *Alaria esculenta*, a *Sargassum fusiforme*, a *Ulva* spp, a *Monostroma* spp, *Asparagopsis armada*, or *Asparagopsis taxiformis*.

In particular embodiments, the substrate is an algae, wherein the algae is selected from *Ascophyllum nodosum, Laminaria digitata, Ulva* sp., *Codium* sp., and mixtures thereof.

In particular embodiments, the binder is a coating agent, a caking agent, or a combination thereof.

In particular embodiments, the binder is a gum, an oil, a fat, a wax, a lipid, a protein, a polysaccharide, a sugar, molasses, cane syrup, high fructose corn syrup, or a combination thereof.

In particular embodiments, the feed supplement further comprises a flavor masking agent and/or an odor masking agent.

In particular embodiments, the flavor masking agent and the odor masking agent independently comprise oregano, molasses, distiller's grain, rolled oats, or a combination thereof.

In particular embodiments of the presently disclosed subject matter, there is provided a method of manufacturing a formulation. The method comprises, preparing a mixture comprising at least one methanogenesis inhibitor and encapsulating the mixture within a carrier, wherein the carrier comprises a core comprising the methanogenesis inhibitor.

In particular embodiments, the carrier is an oil and encapsulating the mixture comprising at least one methanogenesis inhibitor comprises, preparing a water phase solution comprising a spray dry powder substrate, preparing an oil phase solution comprising one or more oil solvents, one or more emulsifiers, and the methanogenesis inhibitor, mixing the oil phase solution with the water phase solution to obtain a spray drying stock solution, and spray drying the spray drying stock solution.

In particular embodiments, the spray dry powder substrate comprises one or more of a dextrin, a maltodextrin, or Acrosil® 200 Pharma (colloidal silicon dioxide).

In particular embodiments, the oil is one or more of a vegetable oil, a seed oil, oleic acid, soyabean oil, or corn oil. In particular embodiments, the oil is one or more of oleic acid, soyabean oil, or corn oil.

In particular embodiments, the emulsifier is one or more of anhydrous ethanol, MIGLYOL® 812, propylene glycol, Transcutol® HP, PEG300, Kolliphor® ELP, Kolliphor® RH 40, or Soluplus®. In particular embodiments, the emulsifier is one or more of propylene glycol, Transcutol® HP, PEG300, or Kolliphor® ELP.

In particular embodiments, the carrier is a microparticle granule, wherein encapsulating the mixture comprising at least one methanogenesis inhibitor comprises, preparing an oil phase solution comprising the methanogenesis inhibitor, and one or more emulsifiers; mixing the oil phase solution with an adsorbent to obtain a mixture; and passing the mixture through a sieve to obtain microparticle granules comprising encapsulated methanogenesis inhibitors.

In particular embodiments, the oil is one or more of a vegetable oil, a seed oil, oleic acid, soyabean oil, or corn oil. In particular embodiments, the oil is one or more of oleic acid, soyabean oil, or corn oil.

In particular embodiments, the emulsifier is one or more of anhydrous ethanol, MIGLYOL® 812, propylene glycol, Transcutol® HP, PEG300, Kolliphor® ELP, Kolliphor® RH 40, or Soluplus®. In particular embodiments, the emulsifier is one or more of propylene glycol, Transcutol® HP, PEG300, or Kolliphor® ELP.

In particular embodiments, the propylene glycol, RH40, and Transcutol® are mixed with the oil in an oil to propylene glycol to RH40 to Transcutol® ratio of approximately 20:45:15:20.

In particular embodiments, the adsorbent is Polyplasdone™ XL.

In particular embodiments, the carrier is a microsphere, and wherein encapsulating the mixture comprising at least one methanogenesis inhibitor comprises, preparing a solution of a gelling agent, preparing an oil phase solution comprising an oil and the methanogenesis inhibitor, homogenizing the oil phase solution with the gelling agent to form an emulsion, adding the emulsion dropwise to an aqueous solution to obtain a solution comprising microspheres, stirring the solution comprising microspheres, harvesting the microspheres, and drying the microspheres to obtain microspheres comprising encapsulated methanogenesis inhibitors.

In particular embodiments, the gelling agent is an alginate, a poly(lactic-co-glycolic acid) (PLGA), a pectin, a carrageenan, a gellan, gelatin, an agar, a modified starch, a methyl cellulose, a hydroxypropylmethyl cellulose, salts thereof, derivatives thereof, or analogs thereof. In particular embodiments, the gelling agent is sodium alginate.

In particular embodiments, the aqueous solution comprises calcium chloride.

In particular embodiments, the oil is one or more of a vegetable oil, a seed oil, oleic acid, soyabean oil, or corn oil. In particular embodiments, the oil is one or more of oleic acid, soyabean oil, or corn oil.

In particular embodiments, the carrier is a wax, and wherein encapsulating the mixture comprising at least one methanogenesis inhibitor comprises preparing a solution comprising the methanogenesis inhibitor, melting a wax in a vessel, homogenizing the solution comprising the methanogenesis inhibitor into the molten wax to obtain a homogenate, injecting the homogenate onto a spinning disk of a spin disk atomizer to obtain wax carriers comprising the methanogenesis inhibitor.

In particular embodiments, the vessel and the disk are heated and maintained at a temperature from approximately 5° C. to approximately 15° C. above the melting temperature of the wax.

In particular embodiments, the disk is operated at a disk speed of approximately 4,000 rpm.

In particular embodiments, the wax is selected from the group consisting of carnauba wax, candelilla wax, yellow beeswax, paraffin wax, stearic acid, palm kernel oil flakes, glyceryl tristearate (DYNASAN® 118), and stearyl alcohol.

In particular embodiments, the solution comprising the methanogenesis inhibitor further comprises an oil.

In particular embodiments, the oil comprises one or more of a vegetable oil, a seed oil, oleic acid, soyabean oil, or corn oil. In particular embodiments, the oil is one or more of oleic acid, soyabean oil, or corn oil.

In particular embodiments, the oil and methanogenesis inhibitor are in a ratio of approximately 60:40 v/v, or approximately 50:50 v/v, or approximately 0:100 v/v.

In particular embodiments, the methanogenesis inhibitor is present in the formulation in an amount from approximately 4.21% w/w to approximately 8.44% w/w.

In particular embodiments, the formulation when stored for approximately 1 day to approximately 30 days at ambient temperature, exposed to air, has a reduction in methanogenesis inhibitor content by less than approximately 90% w/w to less than approximately 1% w/w.

In particular embodiments, the formulation when stored for approximately 1 day to approximately 3 days at ambient temperature, exposed to air, has a reduction in methanogenesis inhibitor content by less than approximately 30% w/w to less than approximately 10% w/w.

In particular embodiments, the formulation when stored for 20 hours at room temperature has a reduction in methanogenesis inhibitor content by less than approximately 20% w/w to less than approximately 5% w/w.

In particular embodiments of the presently disclosed subject matter, there is provided a method of manufacturing a feed supplement. The method comprises, preparing a formulation comprising at least one methanogenesis inhibitor, contacting the formulation with a substrate and a binder to obtain a mixture and dry mixing the mixture.

In particular embodiments, the method of manufacturing a feed supplement further comprises, contacting the formulation with an additive comprising, an essential oil, an antibiotic, an ionophore, a saponin, a tannin, a terpene, 3-Nitrooxypropanol, propylene glycol, fumaric acid, a green tea extract, a grape pomace, a Mootral™, an Agolin™, a Biochar, a dried yeast, a probiotic (direct feed microbials), a fiber, a prebiotic, or a combination thereof.

In particular embodiments, the method of manufacturing a feed supplement further comprises, contacting the formulation with an essential oil comprising one or more of oregano oil, lemongrass oil, garlic oil, cinnamon oil, *eucalyptus* oil, clove oil, rosemary oil, thyme oil, paprika oil, juniper oil, ginger oil, lavender oil, lemon oil, or peppermint oil.

In particular embodiments, the method of manufacturing a feed supplement further comprises, contacting the formulation with an ionophore comprising one or more of monensin, lasalocid, salinomycin, or laidlomycin.

In particular embodiments, the method of manufacturing a feed supplement further comprises, contacting the formulation with a probiotic comprising one or more of a methane oxidizing bacteria, a propionic acid producing bacteria, an acetic acid producing bacteria, or a butyric acid producing bacteria.

In particular embodiments, the method of manufacturing a feed supplement further comprises, contacting the formulation with a prebiotic comprising one or more of inulin, pectin, or chitosan.

In particular embodiments, the method of manufacturing a feed supplement further comprises contacting the formulation with a flavor masking agent and/or an odor masking agent.

In particular embodiments, the method of manufacturing a feed supplement further comprises contacting the formulation with a flavor masking agent and/or an odor masking agent which independently comprise oregano, molasses, distiller's grain, rolled oats, or a combination thereof.

In particular embodiments, the method of manufacturing a feed supplement comprises contacting with a binder, which is a gum, an oil, a fat, a wax, a lipid, a protein, a polysaccharide, a sugar, molasses, cane syrup, high fructose corn syrup, or a combination thereof.

In particular embodiments, the feed supplement manufactured by the method disclosed herein has a reduction in methanogenesis inhibitor content by less than approximately 20% w/w to less than approximately 5% w/w when stored for 20 hours at room temperature.

In particular embodiments of the presently disclosed subject matter, there is disclosed, use of a feed supplement for reducing methane production in a ruminant animal, wherein use of the feed supplement comprises administering the feed supplement to the ruminant animal, wherein the feed supplement comprises, a formulation comprising at least one methanogenesis inhibitor encapsulated in a biologically acceptable carrier, a substrate, and a binder, wherein use of the feed supplement reduces methane production by the ruminant animal from below approximately 70 L/day to below approximately 2 L/day.

In particular embodiments, the composition of the feed supplement including the methanogenesis inhibitors, carriers, substrate, binders, and additives are as disclosed herein.

In particular embodiments of the presently disclosed subject matter, there is provided a kit for reducing methane production in a ruminant animal. The kit comprises a formulation comprising at least one methanogenesis inhibitor encapsulated in a biologically acceptable carrier and instructions for providing the formulation to the ruminant animal.

In particular embodiments, the composition of the formulation including but not limited to the methanogenesis inhibitors, the carriers, the adsorbent, the oil, the emulsifiers, the gelling agents, and the excipient are as disclosed herein.

In particular embodiments of the presently disclosed subject matter, there is provided a kit for an enteric methane-reducing feed supplement for a ruminant animal. The kit comprises a formulation comprising at least one methanogenesis inhibitor encapsulated in a biologically acceptable carrier, a substrate, a binder, and instructions for making the methane reducing feed supplement.

In particular embodiments, the composition of the feed supplement including but not limited to the methanogenesis inhibitors, the carriers, the additives, the substrates, the oil, the emulsifiers, the gelling agents, the adsorbent, and the excipient are as disclosed herein.

In particular embodiments of the presently disclosed subject matter, there is provided a method of reducing methane production. The method comprises administering to a ruminant animal a formulation comprising at least one methanogenesis inhibitor encapsulated in a biologically acceptable carrier, or a feed supplement comprising the formulation, a substrate, and a binder.

In particular embodiments, the formulation is administered to the ruminant animal after mixing with a ruminant animal feed.

In particular embodiments, the formulation is administered to the ruminant animal orally, or parenterally.

In particular embodiments, the feed supplement is administered to the ruminant animal after mixing with a ruminant animal feed.

In particular embodiments, the feed supplement is administered to the ruminant animal orally.

In particular embodiments, the formulation or the feed supplement is administered to the ruminant animal once daily, twice daily, or thrice daily.

In particular embodiments, the formulation or the feed supplement is administered to the ruminant animal daily, once a week, or twice a week. For example, in one embodiment, the formulation or the feed supplement is administered to the ruminant animal once daily for five days. In a particular embodiment, the formulation or the feed supplement is administered to the ruminant anima once daily for 7 days.

In particular embodiments, the formulation or the feed supplement is administered to the ruminant animal ad libitum.

In particular embodiments, the feed supplement is mixed with a ruminant feed that is provided to the ruminant animal ad libitum.

In particular embodiments of the presently disclosed subject matter, there is provided a method of assessing efficacy of a feed supplement in reducing methane production in ruminant animals. The method comprises, providing an amount of a test feed supplement to a first cohort of ruminant animals, obtaining a test sample of gases from the ruminant animals, assessing an amount of methane in the gases in the test sample and comparing the amount of methane present in the test sample with a control value, wherein an amount of methane in the test sample compared with the control value provides assessment of an efficacy of the amount of test feed supplement in reducing methane production.

In particular embodiments, in this method, a lower amount of methane in the test sample compared to the control value indicates that the test feed supplement is efficient in reducing methane production.

In particular embodiments, in the method, the test feed supplement comprises bromoform, and wherein the amount of methane in the test sample is from approximately 30% lower to approximately 95% lower compared to the control value.

In particular embodiments, in this method, the first cohort of ruminant animals comprises dairy cattle, and wherein the amount of methane in the test sample is from approximately 10% lower to approximately 60% lower compared to the control value. In particular embodiments, in this method, the first cohort of ruminant animals comprises dairy cattle, and wherein the amount of methane in the test sample is from approximately 10% lower to approximately 30% lower compared to the control value.

In particular embodiments, in this method, the first cohort of ruminant animals comprises beef cattle, and wherein the amount of methane in the test sample is from approximately 25% lower to approximately 95% lower compared to the control value.

In particular embodiments, in this method, an equal or higher amount of methane in the test sample compared with the control value indicates a need for increasing the amount of the test feed supplement to the animals and repeating the obtaining, the assessing, and the comparing steps.

In particular embodiments, the method further comprises providing the amount of a control feed supplement to a second cohort of ruminant animals, obtaining a control sample of gases from the second cohort of ruminant animals, and assessing an amount of methane in the present in the control sample, wherein an amount of methane in the control sample provides the control value.

In particular embodiments, in this method, the feed supplement is administered to the ruminant animals after mixing with a ruminant animal feed.

In particular embodiments, in this method, the feed supplement is administered to the ruminant animal once daily, twice daily, or thrice daily.

In particular embodiments, the feed supplement is administered to the ruminant animal daily, once a week, or twice a week.

In particular embodiments, in this method, increasing the amount of test feed supplement comprises, providing a higher amount of the feed supplement, or providing the feed supplement at a higher frequency, or a combination thereof.

In particular embodiments, the method further comprises obtaining a test biological sample from each of the first cohort of ruminant animals and measuring the concentrations of free fatty acids in the test biological sample, wherein a lower acetate to propionate ratio in the test biological sample compared to a control value indicates an improved feed efficiency In particular embodiments, the method further comprises obtaining a control biological sample from each of a second cohort of ruminant animals and measuring the concentrations of fatty acids in the control biological sample, wherein a ratio of acetate to propionate in the control biological sample provides the control value.

In particular embodiments, in this method, the biological sample is blood or a ruminal fluid sample.

In particular embodiments, in this method, the fatty acid is a volatile fatty acid.

In particular embodiments of the presently disclosed subject matter, there is provided an in vitro method of assessing an efficacy of a formulation or a feed supplement in reducing methane production. The method comprises, obtaining a ruminal fluid sample from a ruminant animal, incubating in a vessel, the ruminal fluid sample with a formulation comprising at least one methanogenesis inhibitor encapsulated in a biologically acceptable carrier, or a feed supplement comprising the formulation, a substrate, and a binder, obtaining a gas sample from the vessel, assessing an amount of methane in the gas sample, repeating the obtaining and assessing steps at a plurality of time intervals, and calculating a rate of methane produced in the vessel. A decrease in the rate of methane produced from approximately 10% to approximately 99% indicates efficacy of the formulation or the feed supplement in reducing methane production.

In particular embodiments, the method further comprises obtaining a test ruminal fluid sample at a plurality of intervals, measuring an amount of one or more fatty acids in the test ruminal fluid sample, and determining the efficacy of the formulation or the feed supplement in improving feed efficiency.

In particular embodiments, in this method, the one or more fatty acids are volatile fatty acids (VFA).

In particular embodiments, in this method, determining comprises calculating a rate of acetate produced and a rate of propionate produced in the ruminal sample, wherein a decrease in the rate of acetate produced and an increase in the rate of propionate produced indicates efficacy of the formulation or the feed supplement in improving feed efficiency.

In particular embodiments, in this method, determining comprises calculating a ratio of acetate to propionate, wherein a decrease in the ratio of acetate:propionate indicates efficacy of the formulation or the feed supplement in improving feed efficiency.

In particular embodiments of the presently disclosed subject matter, there is provided a slaughtered meat product from a ruminant animal. The meat product has; (1) a residual iodine level below approximately 50 mg/kg. (2) a residual bromoform level below approximately 0.05 ppm, and (3) the meat product having an improved feed efficiency from approximately 1% to approximately 12%; and is produced by a process comprising, administering to the ruminant animal a formulation comprising at least one methanogenesis inhibitor encapsulated in a biologically acceptable carrier; or a feed supplement comprising the formulation, a substrate, and a binder; wherein the formulation or feed supplement decreases methane production and/or increases propionate production in the ruminant animal, thereby improving feed efficiency; and harvesting the slaughtered meat product from the ruminant animal, wherein the feed efficiency at the time of slaughter is improved from approximately 1% to approximately 12%.

In particular embodiments, the ruminant animal has an average daily weight gain from approximately 0.1% to approximately 21% compared to ruminant animals not administered the formulation or feed supplement.

In particular embodiments, the feed efficiency is based on a ratio of an average daily weight of the feed supplement to an average daily weight gain of the ruminant animal, and wherein the improved feed efficiency is based on an increase in feed efficiency compared to ruminant animals that are not administered the formulation or feed supplement.

In particular embodiments of the presently disclosed subject matter, there is provided a dairy milk product from a lactating ruminant animal. The milk product has; (1) a residual iodine level below approximately 50 mg/kg. (2) a residual bromoform level below approximately 0.05 ppm, and (3) the milk product having an improved feed efficiency from approximately 1% to approximately 12%, and is produced by a process comprising, administering to a lactating ruminant animal a formulation comprising at least one methanogenesis inhibitor encapsulated in a biologically acceptable carrier; or a feed supplement comprising the formulation, a substrate, and a binder; wherein the formulation or feed supplement decreases methane production and/or increases propionate production in the lactating ruminant animal, thereby improving feed efficiency; and harvesting the milk product from the ruminant animal, wherein the feed efficiency at the time of milking is improved from approximately 1% to approximately 12%.

In particular embodiments, the ruminant animal has an average daily weight gain from approximately 0.1% to approximately 21% compared to ruminant animals not administered the formulation or feed supplement.

In particular embodiments, the ruminant animal provides approximately 22% to approximately 31% more milk compared to ruminant animals not administered the formulation or feed supplement.

In particular embodiments, the ruminant animal provides approximately 10% to approximately 21% more milk compared to ruminant animals not administered the formulation or feed supplement.

In particular embodiments, the ruminant animal provides approximately 5% to approximately 10% more milk compared to ruminant animals not administered the formulation or feed supplement.

In particular embodiments, the feed efficiency is obtained by dividing the amount of energy-corrected milk produced by the dry matter intake (DMI), and wherein the improved feed efficiency is based on an increase in feed efficiency compared to ruminant animals that are not administered the formulation or feed supplement.

In particular embodiments of the presently disclosed subject matter, there is provided a wool product from a ruminant animal. The wool product has; (1) a residual bromoform level below approximately 0.05 ppm, and (2) the wool product having an improved feed efficiency from approximately 1% to approximately 12%, and is produced by a process comprising, administering to the ruminant animal a formulation comprising at least one methanogenesis inhibitor encapsulated in a biologically acceptable carrier; or a feed supplement comprising the formulation, a substrate, and a binder; wherein the formulation or feed supplement decreases methane production and/or increases propionate production in the ruminant animal, thereby feed efficiency; and harvesting the wool product from the ruminant animal, wherein the feed efficiency at the time of wool harvesting is from approximately 1% to approximately 12%.

In particular embodiments, the ruminant animal has an average daily weight gain from approximately 0.1% to approximately 21% compared to ruminant animals not administered the formulation or feed supplement.

In particular embodiments, the ruminant animal provides approximately 22% to approximately 31% more wool compared to ruminant animals not administered the formulation or e feed supplement.

In particular embodiments, the ruminant animal provides approximately 10% to approximately 21% more wool compared to ruminant animals not administered the formulation or feed supplement.

In particular embodiments, the ruminant animal provides approximately 5% to approximately 10% more wool compared to ruminant animals not administered the formulation or feed supplement.

In particular embodiments, the efficiency of wool production is obtained by dividing the amount of wool produced by the dry matter intake (DMI), and wherein the improved feed efficiency is based on an increase in feed efficiency compared to ruminant animals that are not administered the formulation or feed supplement.

The embodiments disclosed herein are only examples, and the scope of this disclosure is not limited to them. Particular embodiments may include all, some, or none of the molecules, compositions, components, elements, features, functions, operations, or steps of the embodiments disclosed herein. Embodiments according to the invention are in particular disclosed in the attached claims directed to a method or a composition, wherein any feature mentioned in one claim category, e.g. method, can be claimed in another claim category, e.g. composition, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 12 illustrates an example method for an in vitro method of assessing an efficacy of a formulation or a feed supplement in reducing methane production.

FIG. 13 illustrates an example method of assessing efficacy of a feed supplement in reducing methane production in ruminant animals.

FIG. 15 shows an exemplary table illustrating yield and particle size analysis for bromoform encapsulated in wax-based carriers prepared by spinning disk atomization.

FIG. 17 shows an exemplary table illustrating ingredients in Sea-Gains.

DESCRIPTION OF EXAMPLE EMBODIMENTS

Figure 1:
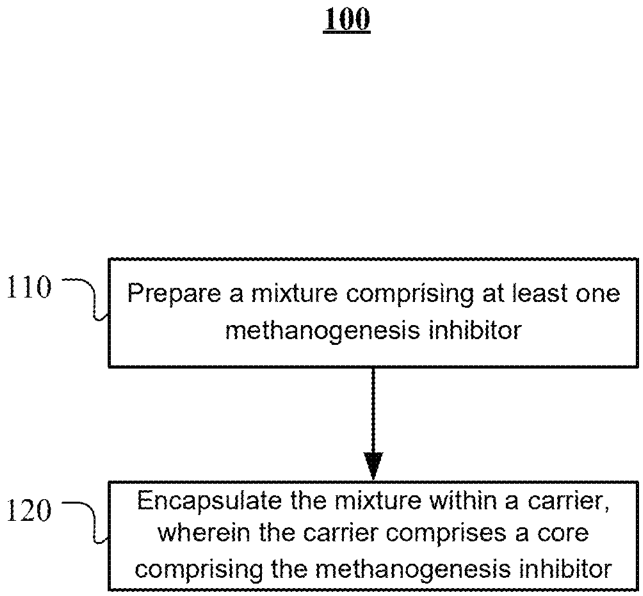
FIG. 1 illustrates an example method for manufacturing a formulation.

The presently disclosed subject matter provides compositions that reduce enteric methane emissions in ruminant animals, methods of making compositions that reduce enteric methane emissions, and methods of reducing enteric methane emissions. For clarity of description, and not by way of limitation, the description here is divided into the following subsections:

1. Definitions
2. Formulations and Feed Supplements
3. Manufacture of Formulations and Feed Supplements
4. Methods of Reducing Enteric Methane Emissions
5. Examples
6. Miscellaneous
7. Bibliography

1. DEFINITIONS

As used herein, the following terms have the meanings ascribed to them below, unless specified otherwise. Abbreviations used herein have their conventional meaning within the chemical and biological arts.

As used in the specification and the appended claims, the singular forms "a", "an" and "the" include plural referents unless the context clearly dietates otherwise. Thus, for example, a reference to "a compound" includes mixtures of compounds.

The recitation herein of numerical ranges by endpoints is intended to include all numbers subsumed within that range. For example, a recitation of 1 to 5 includes 1, 1.5, 2, 2.75, 3, 3.80, 4, 4.32, and 5.

As used herein, the terms "about" or "approximately" means within an acceptable error range for the particular value as determined by one of ordinary skill in the art, which will depend in part on how the value is measured or determined, i.e., the limitations of the measurement system. For example, "approximately" can mean within 3 or more than 3 standard deviations, per the practice in the art. Alternatively, "approximately" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

The expression "and/or" where used herein is to be taken as specific disclosure of each of the two specified features or components with or without the other.

As used herein, the terms "administered" or "administering" can mean any suitable route, e.g., oral route or parenteral route.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of," and "consisting essentially of," the embodiments or elements presented herein, whether explicitly set forth or not.

The term "dosage" is intended to encompass a formulation expressed in terms of total amounts for a given timeframe, for example, as % weight/g dry matter intake (% w/g DMI), % w/kg DMI, μg/kg/hr, μg/kg/day, mg/kg/day, or mg/kg/hr. The dosage is the amount of an ingredient administered in accordance with a particular dosage regimen. A "dose" is an amount of an agent administered to a mammal in a unit volume or mass, e.g., an absolute unit dose expressed in mg of the agent. The dose depends on the concentration of the agent in the formulation, e.g., in moles per liter (M), mass per volume (m/v), or mass per mass (m/m). The two terms are closely related, as a particular dosage results from the regimen of administration of a dose or doses of the formulation. The particular meaning, in any case, will be apparent from the context.

The term "effective amount," as used herein, refers to the amount of active agent sufficient to treat, prevent, or manage a disease. Further, a therapeutically effective amount with respect to the second targeting probe of the disclosure can mean the amount of active agent alone or in combination with other therapies that provide a therapeutic benefit in the treatment or management of the disease, which can include a decrease in the severity of disease symptoms, an increase in frequency and duration of disease symptom-free periods, or a prevention of impairment or disability due to the disease affliction. The term can encompass an amount that improves overall therapy, reduces, or avoids unwanted effects, or enhances the therapeutic efficacy of or synergies with another therapeutic agent.

The term "ratio" or "ratios" as used herein when referring to relative amounts of two or more agents refers to relative amounts of these agents not limited to mole ratios (e.g., mole/mole), weight ratios (e.g. w/w, g/g, g/kg, % w/w,% g/g. % g/kg), volume ratios (v/v, e.g., L/L), or weight/volume (w/v. e.g., g/L, mg/mL).

Use of the terms macroalga, macroalgae, algae, alga, seaweed, and kelp are used interchangeably herein to refer to one or more macroalgae. Macroalgae comprise a huge number of very diverse live organisms, possibly surpassing 25,000 species (Santos et al., 2015 Food Chemistry, 183, 122-128, the entire contents of which are incorporated herein by reference), of macroscopic, multicellular, and marine algae (Hurd et al. 2014). They belong to three different and relatively unrelated eukaryotic lineages corresponding to taxonomically distant groups, usually termed brown (Phaeophyceae), red (Rhodophyceae) and green (Chlorophyceae) macroalgae. Brown algae contain a distinct chlorophyll composition (types a and c) and carotenoids (mainly fucoxanthin, which renders these macroalgae brown). Red algae, besides chlorophylls and carotenoids, are rich in phycobilins. Green algae have chlorophylls a and b, as well as carotenoids, in the chloroplasts (Pereira, et al. 2016), the entire contents of which are incorporated herein by reference). There is a great biological diversity among seaweeds, concerning life cycle and fertilization or morphogenetic strategies. Size is also very different, being some macroalgae up to several meters long and displaying a high level of complexity (Pereira, et al. 2016).

The term "inorganic halide" refers to halide anions, salts, hypohalites and the like. The term "organic halide" or "organohalide" refers to any compound comprising at least one halide atom bound to at least one carbon atom.

Use of the term "animals" herein is intended to refer to ruminant animals. Ruminant animals are hoofed herbivorous grazing or browsing mammals that are able to acquire nutrients from plant-based food by fermenting it in a specialized stomach prior to digestion, principally through microbial actions.

2. FORMULATIONS AND FEED SUPPLEMENTS

2.1. Formulations Comprising Methanogenesis Inhibitors

In particular embodiments of the presently disclosed subject matter, there is provided a formulation comprising at least one methanogenesis inhibitor and a biologically acceptable carrier, wherein the carrier comprises a core comprising the methanogenesis inhibitor.

2.1.1. Methanogenesis Inhibitors

In particular embodiments, the methanogenesis inhibitor is an organohalide, derivatives thereof, or salts thereof. Organohalides (also referred to as organohalogens) are organic compounds that contain at least one halogen.

In particular embodiments, the organohalide is one or more of a compound of Formula I, Formula II or Formula III, derivatives thereof, or a salts thereof:

Formula I

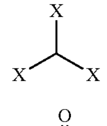

Formula II

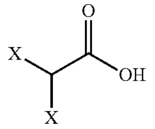

Formula III

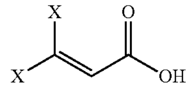

wherein X is selected from Br, I, Cl and H and wherein the organohalide comprises at least one halogen.

In particular embodiments, the organohalide is a C1-C6 alkyl halogen compound. In particular embodiments, the organohalide comprises chlorine, bromine, iodine, or a combination thereof. In particular embodiments, the organohalide is selected from one or more of CH3Cl; CH3Br; CH3I; CH2Cl2; CH2Br2; CH2I2; CHCl3; CHBr3; CHI3; CCl4; CBr4; CH2ClBr; CH2ClI; CH2BrI; CHBr2Cl; CHBrI2; CHBrClI; CHBr2I; CHBrCl2; CH3CH2Br; CH3CH2I; CH3CH2CH2I; CH3(CH2)3I; CH3(CH2)4Br; CH3(CH2)4I; (CH3)2CHI; CH3CH2CH(CH3)I; (CH3)2CHCH2I; BrCH2CH2Br; ClCH═CCl2; or CH3CH2CH2CH2I, derivatives thereof, or a salts thereof. In particular embodiments, the organohalide is a trihalomethane. In particular embodiments, the organohalide is an organobromine compound. For example, in some embodiments, the organohalide is bromoform (CHBr3).

In particular embodiments, the organohalide is one or of a dibromoacetate, a bromochloro acetate, a dibromoacrylate, 2-bromoethanesulfonic acid, salts thereof, or derivatives thereof.

In particular embodiments, the methanogenesis inhibitor is a salt of the organohalide. In particular embodiments, the organohalide salt is a compound of Formula IV:

Formula IV

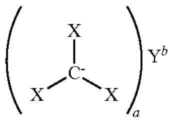

wherein X is selected from Br, I, Cl and H, wherein "a"=1, 2, or 3, and wherein Y is an inorganic monovalent cation (b=+1), an inorganic bivalent cation (b=+2), or an inorganic trivalent cation (b=+3) respectively.

In particular embodiments the organohalide is a sodium salt of the bromoform carbanion of Formula V:

Formula V

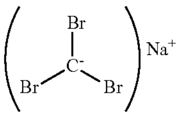

In particular embodiments the organohalide is a potassium salt of the bromoform carbanion of Formula VI:

Formula VI

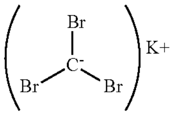

In particular embodiments, the organohalide is a haloform selected from one or more of bromoform, iodoform, chloroform, dibromoacetic c acid, bromochloroacetic acid, bromoiodoacetic acid), dibromochloromethane, dibromoiodomethane (including other variations between Cl, I, Br), or 3,3'dibromoacrylic acid, 2-bromoethanesulfonic acid, derivatives thereof, or a salts thereof.

In particular embodiments, the methanogenesis inhibitors are derived from a biological source. For example, the biological source for organohalides is marine macroalgae. Non-limiting examples of marine macroalgae include, *Asparagopsis armata; Asparagopsis taxiformis; Dictyota* species; *Oedogonium* species; *Ulva* species; and Cladophora patentiramea. In particular embodiments, the organohalide is derived from an organohalide-rich marine macroalgae comprising one or more of *Asparagopsis armata; Asparagopsis taxiformis; Dictyota* species; *Oedogonium* species; *Ulva* species; or Cladophora patentiramea. In alternative embodiments, the organohalide is not derived from a macroalgae. In particular embodiments, the organohalide is an organobromine compound. For example, in some embodiments, the organohalide derived from a macroalgae is bromoform. Table 1 shows bromoform levels in exemplary algae species.

In particular embodiments, the methanogenesis inhibitors are derived from bacteria, fungi, and cyanobacteria. Non-limiting examples of bacteria include *Streptomyces* sp.; and *Zobellia galactanivorans*. Non-limiting examples of fungi include, *Pyricularia oryzae, Curvularia inaequalis, Pyrenophora tritici*-repentis and *Embellisia didymospora*. Non-limiting examples of cyanobacteria include, *Trichodesmium erythraeum, Synechococcus* sp. and *Acaryochloris marina*. In alternative embodiments, the organohalide is not derived from a bacteria, fungi, or cyanobacteria.

TABLE 1

Bromoform Content of Commonly Consumed Algae Species

| Red, Brown or Green | Species with Known Consumption | Bromoform Level | AAFCO Status | References |
|---|---|---|---|---|
| Red | *Rhodymedia palmata* AKA *Palmaria palmata* Gathered in Scotland, Ireland and eaten raw or cooked. | Unknown, but relative Rhodymedia californica contains 47 ng/g | Palmariaceae family included in AAFCO 60.76 | Freedman, 2023 Nørskov et al., 2021 |
| Red | *Chondrus crispus* *Chondrus ocellatus* *Gigartina acicularis* *Gigartina pistillata* *Gigartina radula* *Gigartina stellata* Also known as Irish Moss (*Chondrus*) and False Irish Moss (*Gigartina*)- used to produce carrageenan | *Gigartina stellata* 4.1-26 ng/g *Chondrus crispus* 0-1.3 ng/g | *Chondrus crispus* and *Gigartina stellata* are both in the family Gigartinaceae, which are inluded in AAFCO 60.76 | Abbott et al., 2020 Nørskov et al., 2021 Britannica, 2023 Pizzolla, 2008 |
| Red | *Pterocladia capillacea* | 500 ng/g | Gelidiaceae family is listed in AAFCO 60.76 | Abbott et al., 2020 Carpenter and Liss, 2020 |
| Red | *Asparagopisis taxiformis*, also known as Limu kohu, consumed by peopld in Hawaii | Up to 1256 ng/g per | Bonnemaisoniaceae family is NOT listed in AAFCO | Abbott et al., 2020 |
| Brown | *Saccharina latissima* (also known as *Laminaria Saccharina*) Sugar kelp or sweet kelp is consumed by sheep in Ireland | 0-32 ng/g | Laminariaceae family is listed in AAFCO 60.19 and 60.76 | Abbott et al., 2020 Nørskov et al., 2021 Moneda et al., 2019 Laturnus et al, 2010 NOAA, 2023 Maine Sea Coast Vegetables, 2023 Irish Seaweeds, 2023 |

TABLE 1-continued

Bromoform Content of Commonly Consumed Algae Species

| Red, Brown or Green | Species with Known Consumption | Bromoform Level | AAFCO Status | References |
|---|---|---|---|---|
| Brown | *Laminaria digitata* Known as Horsetail or Kombu. Long history of consumption in Japan and more recently in the US | 0-49 ng/g | Laminariaceae family is listed in AAFCO 60.19 and 60.76 | Abbott et al., 2020 Nørskov et al., 2021 |
| Brown | *Macrosystis pyrifera* Used in Chile to feed abalone | Varied reports from negligible to 125 ng/g | Laminariaceae family is listed in AAFCO 60.19 and 60.76 | Abbott et al., 2020 Nørskov et al., 2021 Camus et al., 2016 Min et al., 2021 Carpenter and Liss, 2000 |
| Green | *Ulva* spp *Monostroma* spp Called Aonori or green laver or sea lettuce | Varied reports from negligible to 150-192 ng/g | Monostromataceae and Ulvaceae are both listed in AAFCO 60.76 | Abbott et al., 2020 Nørskov et al., 2021 Min et al., 2021 Carpenter and Liss, 2000 Roleda and Hisch, 2021 |

In particular embodiments, the methanogenesis inhibitor is produced by a recombinant microorganism. In a non-limiting example, the recombinant microorganism is a recombinant yeast.

In particular embodiments, the methanogenesis inhibitor are exogenous, chemically synthesized compounds. In particular embodiments, the exogenous, chemically synthesized methanogenesis inhibitors are not available from any biological source. In particular embodiments, the exogenous, chemically synthesized methanogenesis inhibitors are organohalides, derivatives or salts of naturally occurring organohalides. In particular embodiments, the exogenous methanogenesis inhibitor is an organobromine compound, for example, bromoform.

In particular embodiments, the at least one methanogenesis inhibitor in the formulation is in a total amount of more than approximately 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1% w/w dry weight.

In particular embodiments, the methanogenesis inhibitor is present in the formulation in an amount from approximately 0.1% w/w to approximately 10% w/w. In particular embodiments, the methanogenesis inhibitor is present in the formulation in an amount from approximately 4.21% w/w to approximately 8.44% w/w. In particular embodiments, the methanogenesis inhibitor is present in the formulation in an amount from approximately 0.22% w/w to approximately 1.3% w/w.

In particular embodiments, the methanogenesis inhibitor is bromoform in an amount of more than approximately 0.1% w/w dry weight. In particular embodiments, the methanogenesis inhibitor is bromoform in an amount of more than approximately 0.2% w/w dry weight. In particular embodiments, the methanogenesis inhibitor is bromoform in an amount of more than approximately 0.3% w/w dry weight. In particular embodiments, the methanogenesis inhibitor is bromoform in an amount of more than approximately 0.4% w/w dry weight. In particular embodiments, the methanogenesis inhibitor is bromoform in an amount of more than approximately 0.5% w/w dry weight. In particular embodiments, the methanogenesis inhibitor is bromoform in an amount of more than approximately 0.6% w/w dry weight. In particular embodiments, the methanogenesis inhibitor is bromoform in an amount of more than approximately 0.7% w/w dry weight. In particular embodiments, the methanogenesis inhibitor is bromoform in an amount of more than approximately 0.8% w/w dry weight. In particular embodiments, the methanogenesis inhibitor is bromoform in an amount of more than approximately 0.9% w/w dry weight. In particular embodiments, the methanogenesis inhibitor is bromoform in an amount of more than approximately 1.0% w/w dry weight. In particular embodiments, the methanogenesis inhibitor is bromoform in an amount of more than approximately 1.1% w/w dry weight. In particular embodiments, the methanogenesis inhibitor is bromoform in an amount of more than approximately 1.2% w/w dry weight. In particular embodiments, the methanogenesis inhibitor is bromoform in an amount of more than approximately 1.3% w/w dry weight. In particular embodiments, the methanogenesis inhibitor is bromoform in an amount of more than approximately 1.4% w/w dry weight. In particular embodiments, the methanogenesis inhibitor is bromoform in an amount of more than approximately 1.5% w/w dry weight. In particular embodiments, the methanogenesis inhibitor is bromoform in an amount of more than approximately 1.6% w/w dry weight. In particular embodiments, the methanogenesis inhibitor is bromoform in an amount of more than approximately 1.7% w/w dry weight.

In particular embodiments, the methanogenesis inhibitor in the formulation is bromoform in an amount within an efficacious range. As an example and not by way of limitation, the methanogenesis inhibitor in the formulation is bromoform in an amount from approximately 1.8% w/w to approximately 1% w/w. As an example and not by way of limitation, the methanogenesis inhibitor in the formulation is bromoform in an amount from approximately 0.8% w/w to approximately 0.2% w/w. As another example and not by way of limitation, the methanogenesis inhibitor in the formulation is bromoform in an amount from approximately 0.8% w/w to approximately 0.4% w/w. As yet another example and not by way of limitation, the methanogenesis inhibitor in the formulation is bromoform in an amount from approximately 0.4% w/w to approximately 0.2% w/w. As yet another example and not by way of limitation, the methanogenesis inhibitor in the formulation is bromoform in an amount from approximately 0.4% w/w to approximately 0.1% w/w. As yet another example and not by way of limitation, the methanogenesis inhibitor in the formulation is bromoform in an amount from approximately 1% w/w to approximately 0.5% w/w.

In particular embodiments, the concentration of methanogenesis inhibitor in the formulation is greater than 100 nM, or greater than 110 nM, or greater than 120 nM, or greater than 130 nM, or greater than 140 nM, or greater than 150 nM.

2.1.2. Carriers

In particular embodiments, the carrier serves as a vehicle that provides stability to the methanogenesis inhibitor by minimizing and/or preventing degradation during storage, and prior to delivery and release of the methanogenesis inhibitor into the rumen of the animal.

Non-limiting examples of carriers include, oils, waxes, microparticles, microspheres, microcapsules, and nanoparticles.

In particular embodiments, the carriers can be adapted for sustained delivery of the methanogenesis inhibitor. Non-limiting examples of sustained delivery carriers include wax-based carriers and poly(lactic-co-glycolic acid) (PLGA)-based carriers. For example, in one non-limiting example, the sustained delivery carrier is a wax-based carrier.

In particular embodiments, the carriers are adapted to deliver a sustained release of the methanogenesis inhibitor from approximately 2 weeks to approximately 6 months. In particular embodiments, the carriers are adapted to deliver a sustained release of the methanogenesis inhibitor from approximately 2 weeks to approximately 4 weeks. In particular embodiments, the carriers are adapted to deliver a sustained release of the methanogenesis inhibitor from approximately 1 month to approximately 2 months. In particular embodiments, the carriers are adapted to deliver a sustained release of the methanogenesis inhibitor from approximately 2 months to approximately 3 months. In particular embodiments, the carriers are adapted to deliver a sustained release of the methanogenesis inhibitor from approximately 3 months to approximately 4 months. In particular embodiments, the carriers are adapted to deliver a sustained release of the methanogenesis inhibitor from approximately 4 months to approximately 5 months. In particular embodiments, the carriers are adapted to deliver a sustained release of the methanogenesis inhibitor from approximately 5 months to approximately 6 months. As an example and not by way of limitation, the carriers are adapted to deliver a sustained release of the methanogenesis inhibitor for at least 2 months. As another example and not by way of limitation, the carriers are adapted to deliver a sustained release of the methanogenesis inhibitor for at least 4 months. As yet another example and not by way of limitation, the carriers are adapted to deliver a sustained release of the methanogenesis inhibitor for approximately 6 months.

In particular embodiments, the carriers are adapted to deliver a sustained release of the methanogenesis inhibitor from approximately 2 weeks to approximately 6 months. In particular embodiments, the carriers are adapted to deliver a sustained release of the methanogenesis inhibitor from approximately 2 weeks to approximately 4 weeks. In particular embodiments, the carriers are adapted to deliver a sustained release of the methanogenesis inhibitor from approximately 1 month to approximately 2 months. In particular embodiments, the carriers are adapted to deliver a sustained release of the methanogenesis inhibitor from approximately 2 months to approximately 3 months. In particular embodiments, the carriers are adapted to deliver a sustained release of the methanogenesis inhibitor from approximately 3 months to approximately 4 months. In particular embodiments, the carriers are adapted to deliver a sustained release of the methanogenesis inhibitor from approximately 4 months to approximately 5 months. In particular embodiments, the carriers are adapted to deliver a sustained release of the methanogenesis inhibitor from approximately 5 months to approximately 6 months. As an example and not by way of limitation, the carriers are adapted to deliver a sustained release of the methanogenesis inhibitor for at least 2 months. As another example and not by way of limitation, the carriers are adapted to deliver a sustained release of the methanogenesis inhibitor for at least 4 months. As yet another example and not by way of limitation, the carriers are adapted to deliver a sustained release of the methanogenesis inhibitor for approximately 6 months.

In particular embodiments the methanogenesis inhibitor and the carrier are in a ratio from approximately 0.1:1 w/w to approximately 100:1 w/w. As an example and not by way of limitation, the methanogenesis inhibitor and the carrier are in a ratio from approximately 1:1 w/w to approximately 1:2 w/w. As another example and not by way of limitation, the methanogenesis inhibitor and the carrier are in a ratio from approximately 1:2 w/w to approximately 1:3 w/w. As yet another example and not by way of limitation, the methanogenesis inhibitor and the carrier are in a ratio from approximately 1:3 w/w to approximately 1:4 w/w. As yet another example and not by way of limitation, the methanogenesis inhibitor and the carrier are in a ratio from approximately 1:4 w/w to approximately 1:5 w/w. As yet another example and not by way of limitation, the methanogenesis inhibitor and the carrier are in a ratio from approximately 1:0 w/w to approximately 2:1 w/w. As yet another example and not by way of limitation, the methanogenesis inhibitor and the carrier are in a ratio from approximately 0.5:0 w/w to approximately 1:1 w/w.

In particular embodiments the carrier further comprises one or more excipients. Non-limiting examples of excipients include, silicon dioxide, a maltodextrin, a starch, N-CREAMER® 2000, CAPSUL® TA, HI-CAP® 100, N-LOK® 1930, N-Zorbit™ 2144, or N-Zorbit™ M.

In particular embodiments, the formulation of the presently disclosed subject matter is used in combination with other methane-reducing, quality and quantity enhancing components as disclosed in A. Cieslak, M. Szumacher-Strabel, A. Stochmal and W. Oleszek, Ruminant (2013), 7:s2, pp 253-265 & The Animal Consortium 2013, doi: 10.1017/S1751731113000852, which is incorporated herein in its entirety.

2.1.3. Administration

In particular embodiments, the formulation comprising the methanogenesis inhibitor can be administered to the ruminant animal via oral route.

In particular embodiments, oral administration of the formulation is achieved by mixing the formulation with a feed supplement that is added to the diet of the animals.

In particular embodiments, the formulation is administered as a pill or capsule delivered using a bolus gun or a Dosatron®. In particular embodiments, oral administration of the formulation in a liquid form is achieved by 'drenching' where small volumes of liquid are administered into the back of the mouth with a 'drenching gun'.

In particular embodiments, the formulation comprising the methanogenesis inhibitor is administered via parenteral route. Non-limiting examples of parenteral administration include intravenous, intramuscular, subcutaneous, intraperitoneal, intramammary, and topical routes.

In particular embodiments, parenteral administration is as an implant. Non-limiting of such implants include compressed tablets and dispersed matrix systems in which the formulation or feed supplement is uniformly dispersed within a polymer.

2.1.4. Stability of the Methanogenesis Inhibitor in the Formulation

In particular embodiments, the formulation comprises bromoform as the methanogenesis inhibitor, the oil is vegetable oil (Crisco), and the carrier is alginate microspheres, wherein the bromoform encapsulated alginate microspheres are stored for 4 hours in open atmosphere at room temperature, wherein the bromoform content in the formulation is reduced by less than approximately 45% w/w.

In particular embodiments, the formulation comprises bromoform as the methanogenesis inhibitor, the oil is vegetable oil (Crisco), and the carrier is a spray dried powder comprising dextrin and the formulation is stored for at least 20 hours in open atmosphere at room temperature, and the bromoform content in the formulation is reduced by less than approximately 5% w/w.

In particular embodiments, the formulation comprises bromoform as the methanogenesis inhibitor, the oil is vegetable oil (Crisco), the substrate is a kelp substrate, and the carrier is a spray dried powder comprising dextrin, and the formulation is stored for at least 20 hours in open atmosphere at room temperature, and the bromoform content in the formulation is reduced by less than approximately 5% w/w.

In particular embodiments, the formulation comprises bromoform as the methanogenesis inhibitor, the oil is vegetable oil (Crisco), the substrate is a kelp substrate, the carrier is a spray dried powder comprising dextrin, the formulation is coated with a vegetable oil (Crisco) and stored for at least 20 hours in open atmosphere at room temperature, and the bromoform content is reduced by less than approximately 17% w/w.

In particular embodiments, the formulation comprises bromoform as the methanogenesis inhibitor, the oil is vegetable oil (Crisco), the substrate is a kelp substrate, the carrier is a spray dried powder comprising dextrin, and the formulation is coated with a molasses and the formulation is stored for at least 20 hours in the open atmosphere at room temperature, and the bromoform content in the formulation is reduced by less than approximately 5% w/w.

In particular embodiments, the formulation comprises bromoform as the methanogenesis inhibitor, an oil-bromoform mixture is mixed with tapioca maltodextrin excipient powder, the substrate is a kelp substrate, the formulation is coated with a vegetable oil (Crisco) and the formulation is stored for at least 16 hours in open atmosphere at room temperature, and the bromoform content in the formulation is reduced by approximately 62% w/w.

In particular embodiments, the formulation comprises bromoform as the methanogenesis inhibitor, an oil-bromoform mixture is mixed with tapioca maltodextrin excipient powder, the substrate is a kelp substrate, the formulation is coated with a molasses and the formulation is stored for at least 16 hours in open atmosphere at room temperature, and the bromoform content in the formulation is reduced by less than approximately 5% w/w.

In particular embodiments, the formulation comprises bromoform as the methanogenesis inhibitor, which when stored from approximately 1 day to approximately 30 days at ambient temperature has a reduction in bromoform content by less than approximately 90% w/w to less than approximately 1% w/w. In particular embodiments, the formulation comprises bromoform as the methanogenesis inhibitor, which when stored from approximately 1 day to approximately 3 days at ambient temperature has a reduction in bromoform content by less than approximately 30% w/w to less than approximately 10% w/w.

2.1.5. Kits

In particular embodiments of the presently disclosed subject matter, there is provided a kit for reducing methane production in a ruminant animal comprising a formulation comprising at least one methanogenesis inhibitor encapsulated in a biologically acceptable carrier and instructions for providing the formulation to the ruminant animal.

In particular embodiments, the formulation in its various embodiments are described above. In particular embodiments, the formulation comprises bromoform as the methanogenesis inhibitor and an oil carrier. In particular embodiments, the formulation comprises bromoform as the methanogenesis inhibitor and a microparticle granule carrier. In particular embodiments, the formulation comprises bromoform as the methanogenesis inhibitor and a wax based carrier, which is suitable for sustained delivery of the formulation. In particular embodiments, the formulation comprises bromoform as the methanogenesis inhibitor and a microsphere carrier.

In particular embodiments, routes, and methods for administering the formulation to the ruminant animals are described in Section 2.1.3

In particular embodiments, the formulation is distributed for use in bags or super sacks.

2.2. Enteric Methane Reducing Feed Supplements

In particular embodiments of the presently disclosed subject matter, there is provided a feed supplement comprising; a formulation comprising at least one methanogenesis inhibitor encapsulated in a biologically acceptable carrier; a substrate; and a binder.

In particular embodiments, the feed supplement comprises the formulation in its various embodiments as described in Section 2.1.

In particular embodiments, the feed supplement comprises the methanogenesis inhibitor in an amount from approximately 10% w/w to approximately 30% w/w by dry weight.

In particular embodiments, the feed supplement for beef cattle, dairy cattle and other ruminant animals comprises a minimum of 1.5% of the methanogenesis inhibitor by dry weight. In particular embodiments, the feed supplement for beef cattle, dairy cattle and other ruminant animals comprises a minimum of 1.0% of the methanogenesis inhibitor by dry weight. In particular embodiments, the feed supplement for beef cattle, dairy cattle and other ruminant animals comprises a minimum of 0.9% of the methanogenesis inhibitor by dry weight. In particular embodiments, the feed supplement for beef cattle, dairy cattle and other ruminant animals comprises a minimum of 0.8% of the methanogenesis inhibitor by dry weight. In particular embodiments, the feed supplement for beef cattle, dairy cattle and other ruminant animals comprises a minimum of 0.7% of the methanogenesis inhibitor by dry weight. In particular embodiments, the feed supplement for beef cattle, dairy cattle and other ruminant animals comprises a minimum of 0.6% of the methanogenesis inhibitor by dry weight. In particular embodiments, the feed supplement for beef cattle, dairy cattle and other ruminant animals comprises a minimum of 0.5% of the methanogenesis inhibitor by dry weight.

2.2.1. Substrates

In particular embodiments, the feed supplement comprises a substrate. The feed supplement is not limited by the substrate and one can use any substrate having desirable properties according to its intended use, and/or that is commercially available, and/or has additional environmental benefits.

In particular embodiments, the substrate is a macroalga substrate including all alga and alga derived products suitable for animal consumption and any combinations thereof.

In particular embodiments, the alga substrate comprises an alga selected those described in Pereira, et al. 2016 Edible seaweeds of the world. CRC Press (Taylor and Francis Group) the entire contents of which are incorporated herein by reference.

In particular embodiments, the alga substrate comprises an alga selected from a Rhodophyta (red algae), a Phaeophyta (Brown algae), a Chlorophyta (Green algae), or a combination thereof.

In particular embodiments, the alga substrate comprises an alga selected from one or more of a *Porphyra* spp, a *Gracilaria* spp, a *Laminaria* sp., a *Fucus* sp., *Chondrus crispus*, an *Ulva* sp., a *Monostroma* spp, a *Codium* sp. a *Sargassum* sp., a *Ascophyllum nodosum*, a *Palmaria palmata*, a *Undaria pinnatifida*, a *Saccharina latissima*, a *Laminaria digitata*, an *Alaria esculenta*, a *Sargassum fusiforme, Asparagopsis armada*, or *Asparagopsis taxiformis.*

In particular embodiments, the alga substrate comprises an alga selected from *Ascophyllum nodosum, Laminaria digitata, Ulva* sp., *Codium* sp., and mixtures thereof.

In particular embodiments, the alga substrate comprises an alga selected from one or more of the following categories and algal lineages: Euglenophyte, Chrysophyta, Pyrrophyta, Chlorophyta, Rhodophyta, Paeophyta, or anthophyta.

In particular embodiments, the alga substrate comprises an alga selected from one or more of *Ascophyllum nodosum, Asparagopsis taxiformis, Alaria esculenta, Fucus vesiculosus, Palmaria palmata, Chondrus crispus, Laminaria hyperborea, Laminaria digitata, Saccharina latissima, Porphyra umbilicalis, Pyropia yezoensis, Ulva fenestrata, Ulva lactuca, Ulva fasciata*, and *Macrocystis pyrifera* and mixtures thereof.

In particular embodiments, the alga substrate comprises a brown algae of family Laminariaceae.

In particular embodiments, the alga substrate comprises an alga selected from genus *Arthrothamnus, Cymathere, Laminaria, Macrocystis, Nereocystis, Pelagophycus, Postelsia, Pseudolessonia, Saccharina*, and Streptophyllopsi and mixtures thereof.

In particular embodiments, the alga substrate comprises an alga selected from *Laminaria hyperborea, Ascophyllum nodosum, Laminaria digitata* and mixtures thereof.

In particular embodiments, the alga substrate comprises an alga selected from a red algae in the family *Gracilaria*. In particular embodiments, the alga substrate is selected from *Asparagopsis armata, Asparagopsis taxiformis, Dictyota* spp (e.g. *Dictyota* bartayresii), *Oedogonium* spp, *Ulva* spp, C. patentiramea and mixtures thereof. In certain of these embodiments, the bromoform content of the red alga is less than 0.5% bromoform w/w of dry weight.

In particular embodiments, the alga substrate comprises an alga selected from *Laminaria* sp., *Fucus* sp., *Ascophyllum nodosum, Chondrus crispus, Porphyra* sp., *Ulva* sp., *Sargassum* sp., *Gracilaria* sp. and *Palmaria palmata, Undaria pinnatifida* and mixtures thereof.

In particular embodiments, the alga substrate comprises an alga selected from genus Acrosiphonia, *Alaria, Laminaria*, Mastocarpus, *Palmaria, Porphyra, Ulva* and mixtures thereof.

In particular embodiments, the alga substrate comprises an alga selected from *Ascophyllum nodosum, Laminaria* sp., e.g., *Laminaria digitata, Ulva* sp., *Codium* sp., and mixtures thereof.

In particular embodiments, the alga substrate comprises a derivative (i.e., product derived from) of alga. In particular embodiments, the alga substrate is an alginate product.

In particular embodiments, the alga substrate comprises commercial alginates produced from *Laminaria hyperborea, Macrocystis pyrifera, Laminaria digitata, Ascophyllum nodosum, Laminaria japónica, Eclonia maxima, Lessonia nigrescens, Durvillea antarctica* and *Sargassum* sp.

In particular embodiments, the methanogenesis inhibitor is from an exogenous synthetic source and not derived from the substrate. In particular embodiments, the methanogenesis inhibitor is from an exogenous synthetic source and not derived from any biological source.

In particular embodiments, the methanogenesis inhibitor content of the substrate is less than 10%, 9%, 8%, 7%, 6%, 5%, 4%, 3%, 2%, 1%, 0.5%, 04%, 0.3%, 0.2%, 0.1%, 0.09%, 0.08%. 0.07%, or 0.06% w/w of substrate dry weight. In particular embodiments, the methanogenesis inhibitor is bromoform present at less than 2% w/w of substrate dry weight. In particular embodiments, the methanogenesis inhibitor is bromoform present at less than 1% w/w of substrate dry weight. In particular embodiments, the methanogenesis inhibitor is bromoform present at less than 0.5% w/w of substrate dry weight. In particular embodiments, the methanogenesis inhibitor is bromoform present at less than 0.4% w/w of substrate dry weight. In particular embodiments, the methanogenesis inhibitor is bromoform present at less than 0.3% w/w of substrate dry weight. In particular embodiments, the methanogenesis inhibitor is bromoform present at less than 0.2% w/w of substrate dry weight.

2.2.2. Binders

In particular embodiments, the binder is a coating agent or a caking agent. One or more than one binder can be used in the feed supplement. Non-limiting examples of binders include a gum, an oil, a fat, a wax, a lipid, a protein, a polysaccharide, a sugar, molasses, cane syrup, high fructose corn syrup, or a combination thereof.

In one aspect of the presently disclosed subject matter, it was discovered that viscous edible coatings enhance retention of methanogenesis inhibitor in the final dry product. Non-limiting examples of such edible coatings include sweet syrups known in the art as molasses, cane syrup, high fructose corn syrup, and edible fats and waxes for example, shortening, bees wax, and edible oils. A combination of these coatings can also be used.

In particular embodiments the feed supplement comprises a viscous edible coating in a minimal amount sufficient to coat the substrate.

In particular embodiments, the viscous edible coating is present in an amount sufficient to reduce loss of the methanogenesis inhibitor. In particular embodiments the methanogenesis inhibitor is bromoform, wherein the viscous edible coating keeps bromoform loss at less than approximately 50%, 40%, 30%, 20%, 10% or 5% of the original bromoform concentration (w/w). In particular embodiments, the bromoform loss is less than 30% of the original bromoform concentration (w/w). In particular embodiments, the bromoform loss is less than 20% of the original bromoform concentration (w/w). In particular embodiments, the bromoform loss is less than 10% of the original bromoform concentration (w/w).

In particular embodiments the viscous edible coating is in an amount of at least 5%, 10%, 15%, 20%, 25%, 30%, 35%, 40%, 45%, 50% or 55% by weight of the feed supplement or within a range defined by any two of the preceding percentages. For example, in some embodiments, the feed supplement comprises a viscous edible coating in an amount from approximately 20-50% by weight of the feed supplement. In particular embodiments the feed supplement. comprises a viscous edible coating in an amount from approximately 25-50% by weight of the feed supplement. In particular embodiments the feed supplement. comprises a viscous edible coating in an amount from approximately 30-50% by weight of the feed supplement. In particular embodiments the feed supplement comprises a viscous edible coating in an amount from approximately 35-50% by weight of the feed supplement. In particular embodiments the feed supplement comprises a viscous edible coating in an amount from approximately 40-50% by weight of the feed supplement. In particular embodiments the feed supplement comprises a viscous edible coating in an amount from approximately 20-40% by weight of the feed supplement. In particular embodiments the feed supplement comprises a viscous edible coating in an amount from approximately 25-40% by weight of the feed supplement. In particular embodiments the feed supplement comprises a viscous edible coating in an amount from approximately 30-40% by weight of the feed supplement. In particular embodiments the feed supplement comprises a viscous edible coating in an amount from approximately 15-30% by weight of the feed supplement. In particular embodiments the feed supplement comprises a viscous edible coating in an amount from approximately 20-30% by weight of the feed supplement.

In particular embodiments, the feed supplement comprises an alga substrate, one or more methanogenesis inhibitors and a coating. In particular embodiments, the feed supplement comprises an alga substrate, bromoform and molasses. In particular embodiments, the feed supplement comprises an alga substrate, at least 0.8% bromoform by weight and between approximately 45-55% by weight molasses.

2.2.3 Additives

In particular embodiments, the feed supplement further comprises one or more additives. Additives are known to enhance cattle performance and can therefore complement the benefits of methanogenesis inhibitors in reducing enteric methane emissions. Non-limiting examples of such additives include, an essential oil, an antibiotic, an ionophore, a saponin, a tannin, a terpene, 3-Nitrooxypropanol, propylene glycol, fumaric acid, a green tea extract, a grape pomace, a garlic and citrus extract (a Mootral™), an Agolin™, a Biochar a dried yeast, a probiotic (direct feed microbials), a fiber, or a prebiotic. A combination of these can also be used.

In particular embodiments, the feed supplement comprises one or more essential oils to improve cattle performance, thus complementing the benefits of formulations and supplements comprising the methanogenesis inhibitors disclosed herein. Non-limiting examples essential oils include oregano oil, lemongrass oil, garlic oil, cinnamon oil, *eucalyptus* oil, clove oil, rosemary oil, thyme oil, paprika oil, juniper oil, ginger oil, lavender oil, and peppermint oil.

In particular embodiments, the feed supplement can comprise one or more ionophores. Ionophores benefit animal metabolism by improving efficiency of energy metabolism and also have antimicrobial properties, thus complementing the benefits of formulations and supplements comprising the methanogenesis inhibitors disclosed herein. Non-limiting examples of such ionophores include monensin, lasalocid, salinomycin, and laidlomycin.

In particular embodiments, the feed supplement can comprise one or more direct-feed microbials (probiotics). Probiotics are known to improve overall health, improve milk production, and/or feed efficiency and therefore complement the formulations and supplements disclosed herein. Non-limiting examples of probiotics include one or more of a methane oxidizing bacteria, a propionic acid producing bacteria, an acetic acid producing bacteria, or a butyric acid producing bacteria.

In particular embodiments, the feed supplement can comprise one or more prebiotic additives. Prebiotics are a group of additives that promote a healthy gut microbiome in ruminant animals and therefore complement the formulations and supplements disclosed herein. Non-limiting examples of prebiotics include inulin, pectin, and chitosan.

In particular embodiments, the additives include one or more vitamins, minerals, antibiotics, growth stimulants and combinations thereof. In particular embodiments, the vitamin is one or more of vitamin A, vitamin D, vitamin E, vitamin K, thiamine, riboflavin, pyridoxine, cyanocobalamin, carotenoids (e.g. betacarotene, zeaxanthin, lutein, lycopene among others), niacin, folic acid, pantothenic acid, biotin, vitamin C, choline, or inositol, salts thereof, or derivatives thereof. In particular embodiments, the mineral is one or more of calcium, phosphorous, magnesium, iron, zinc, manganese, copper, cobalt, boron, iodine, sodium, potassium, molybdenum, selenium, chromium, fluorine, or chloride. For example, in one embodiment, the feed supplement comprises calcium, trace mineral premix and vitamins A, D and E premix.

In particular embodiments, the feed supplement comprises the additives in an amount from approximately 0.001% w to approximately 25% w. In particular embodiments, the feed supplement comprises the additives in an amount from approximately 0.01% w to approximately 15% w. In particular embodiments, the feed supplement comprises the additives in an amount from approximately 0.1% w to approximately 5% w.

In particular embodiments, the feed supplement according to the presently disclosed subject matter has one or more of the following additional components (in percent by dry weight of the feed supplement); approximately 1-50% molasses, approximately 1-50% starch (e.g., potato starch, pea starch, corn starch, among others), Ameri-Bond® (2X), Nutraflex® plus, approximately 1-10% oral parasite control, approximately 1-50% edible oil, (e.g. olive oil, corn oil, avocado oil, among others), approximately 1-5% mineral (e.g., NaCl, KCl), approximately 1-5% Calcium, Magnesium, Phosphorous, Potassium, Sodium, Sulfur, Vitamin A (stabilized form), vitamin D, vitamin E, Aluminum, approximately 1-100 ppm Chromium, cobalt, Copper, iodine, Iron, Manganese, Molybdenum, Nickel, Selenium, Zinc, approximately 1-50% feed substrate (e.g., Bahiagrass Pasture, Bermudagrass Pasture, Bermudagrass Hay, Fescue Pasture, Fescue Hay, Corn, Corn Silage, Corn Gluten Feed, Cottonseed Meal, Whole Cottonseed, Soyhulls, Soybean Meal, Citrus Pulp), and approximately 1-15% probiotics, antibiotics, or a mixture of both.

In particular embodiments, the feed supplement further comprises flavor masking agents to make the feed supplement palatable for the animal. Non-limiting examples of flavor masking agents include one or more of oregano, molasses, distiller's grain, or rolled oats.

In particular embodiments, the feed supplement further comprises odor masking agents to make the feed supplement palatable for the animal. Non-limiting examples of odor masking agents include one or more of oregano, molasses, distiller's grain, or rolled oats.

In particular embodiments, the feed supplement of the presently disclosed subject matter is used in combination with other methane-reducing, quality and quantity enhancing components as disclosed in A. Cieslak, M. Szumacher-Strabel, A. Stochmal and W. Oleszek, Ruminant (2013), 7:s2, pp 253-265 & The Animal Consortium 2013, doi: 10.1017/S1751731113000852, which is incorporated herein in its entirety.

2.2.4. Ruminant Feed

The three main types of ruminant feed include roughages, concentrates and mixed feeds. In general, roughages contain a higher percentage of crude fiber and a lower percentage of digestible nutrients than concentrates. For example, roughages can be defined as containing equal to or greater than 20% w crude fiber and equal to or less than 60% w total digestible nutrients. Roughages can include, for example, dry roughages (e.g., hay, straw, artificially dehydrated forages containing at least 90% w dry matter), silages (formed from green forages such as grass, alfalfa, sorghum, and corn and preserved in a silo at dry matter contents of 20 to 50%), and pastures (e.g., green growing pastures providing forage that has a high water content and generally less than 30% dry matter). The two basic types of roughages include grasses and legumes. Grasses are generally higher in fiber and dry matter than legumes. Legumes are generally higher in proteins, metabolizable energy, vitamins, and minerals. Concentrates contain a relatively lower percentage of crude fiber and a higher percentage of digestible nutrients than roughages. For example, concentrates can be defined as containing less than 20% w crude fiber and greater than 60% w total digestible nutrients. Non-limiting examples of concentrates are energy-rich grains and molasses. For example, corn, wheat, oats, barley, and milo (sorghum grain) are energy-rich grains, containing approximately 70 to 80% w total digestible nutrients.

In particular embodiments, the ruminant feed comprises from approximately 0.0001% w to approximately 10% w of the feed supplement provided in the present disclosure, based on the total dry weight of the ruminant feed. In particular embodiments, the ruminant feed comprises from approximately 0.3% w to approximately 10% w of feed supplement provided in the present disclosure, based on the total dry weight of the ruminant feed. In particular embodiments, the ruminant feed comprises from approximately 0.5% w of the feed supplement provided in the present disclosure.

In particular embodiments, the formulation is administered to the ruminant animal after mixing with a ruminant animal feed. In particular embodiments, the formulation is mixed using a micro mixer or manually and feed. The feed supplement may be administered to the ruminant animal orally. As an example and not by way of limitation, the feed supplement may be sprayed onto the grass in ranging pastures and consumed by the ruminant animal. As another example and not by way of limitation, the formulation is topdressed on dry feed. As yet another example and not by way of limitation, the formulation administered as a bolus application. As yet another example and not by way of limitation, the feed supplement may be added to water in water dosing machines used by the ruminant animals. In particular embodiments, the feed supplement is mixed with one or more of salt licks, or molasses for consumption by the ruminant animals.

2.2.5. Stability of the Methanogenesis Inhibitor in the Feed Supplement

In particular embodiments, the amount of the methanogenesis inhibitor in the feed supplement after 5 hours when left open to the atmosphere and maintained at room temperature is at least 60% w/w, 62% w/w, 64% w/w, 66% w/w, 68% w/w, 70% w/w, 72% w/w, 74% w/w, 76% w/w, 78% w/w, 80% w/w, 82% w/w, 84% w/w, 86% w/w, 88% w/w, 90% w/w, 92% w/w, 94% w/w, 96% w/w, 98% w/w, 99% w/w or 100% w/w of the original concentration. In particular embodiments, the amount of the methanogenesis inhibitor present after 5 hours when left open to the atmosphere and maintained at room temperature is at least 80% w/w.

In particular embodiments, the amount of the methanogenesis inhibitor in the feed supplement stored below 32° F. in a vacuum sealed bag for up to 180 days is reduced by approximately 5% w/w, 10% w/w, 12% w/w, 14% w/w, 16% w/w, 18% w/w, 20% w/w, 22% w/w, 24% w/w, or 26% w/w. In particular embodiments the amount of the methanogenesis inhibitor present in the feed supplement after being stored below 32° F. in a vacuum sealed bag for up to 180 days is reduced by less than 20% w/w.

In particular embodiments, the rate of change in methanogenesis inhibitor concentration (w/w per day) in the feed supplement maintained in an open atmosphere at room temperature is 0.1 or less. In particular embodiments, the rate of change in methanogenesis inhibitor concentration is 0.09 or less. In particular embodiments, the rate of change in methanogenesis inhibitor concentration is 0.08 or less. In particular embodiments, the rate of change in methanogenesis inhibitor concentration is 0.07 or less. In particular embodiments, the rate of change in methanogenesis inhibitor concentration is 0.06 or less. In particular embodiments, the rate of change in methanogenesis inhibitor concentration is 0.05 or less. In particular embodiments, the rate of change in methanogenesis inhibitor concentration is 0.05 or less. In particular embodiments, the rate of change in methanogenesis inhibitor concentration is 0.03 or less. In particular embodiments, the rate of change in methanogenesis inhibitor concentration is 0.02 or less. In particular embodiments, the rate of change in methanogenesis inhibitor concentration is 0.01 or less.

In particular embodiments, the formulation, substrate, and binder are distributed for use in independent bags or super sacks. In particular embodiments, the formulation, substrate, and binder are distributed for use under refrigeration. In particular embodiments, the formulation, substrate, and binder are distributed for use under conditions that avoid exposure to moisture. n particular embodiments, the formulation, substrate, and binder are distributed for use under conditions that avoid exposure to direct sunlight.

2.2.6. Kits

In particular embodiments of the presently disclosed subject matter, there is provided a kit for an enteric methane reducing feed supplement for a ruminant animal comprising a formulation comprising at least one methanogenesis inhibitor encapsulated in a biologically acceptable carrier; a substrate; a binder; and instructions for making the methane-reducing feed supplement.

In particular embodiments, the feed supplement in its various embodiments are described above in Section 2.2. In particular embodiments, the feed supplement comprises one or more substrates which are described in Section 2.2.1. In particular embodiments, the feed supplement comprises one or more binders which are described in Section 2.2.2. In particular embodiments, the feed supplement comprises one or more additives, and/or flavor masking agents and/or odor masking agents which are described in Section 2.2.3.

In particular embodiments, the feed supplement is distributed for use in bags or super sacks.

2.3. Control of Iodine Levels

Milk iodine levels are directly correlated with iodine intake in dairy cows, with approximately 2% of consumed iodine being directly passed into the milk. If cows exceed their daily iodine intake significantly, iodine levels in milk can exceed the recommended levels for human consumption. Similarly, iodine levels in meat from cattle fed a diet including red marine algae at 0.5% of organic matter daily are elevated relative to cattle not fed red marine algae. Thus, one aspect of the disclosed subject matter is the provision of a feed supplement comprising an effective amount of a methanogenesis inhibitor (e.g. bromoform), which is sufficient to reduce enteric methane emissions while keeping the levels of iodine in the animal's blood, meat, and milk below that required by industry standards.

In particular embodiments, the alga substrate has an iodine level sufficient to produce a feed supplement in which a ratio of the methanogenesis inhibitor (mg/g) to the iodine (ppm) is greater than approximately 150, thus reducing risk of iodine contamination.

In particular embodiments, the alga substrate has an iodine content of less than 0.1, 0.09, 0.08, 0.07, 0.06, 0.05, 0.04, 0.03, 0.02, or 0.01% w/w dry weight. In particular embodiments, the alga substrate has an iodine content of less than 0.145% w/w dry weight.

In particular embodiments, the feed supplement has an iodine to bromoform ratio of less than 0.1, 0.09, 0.08, 0.07, 0.06, 0.05, 0.04, 0.03, 0.02, 0.012 or 0.01 w/w. In particular embodiments, the feed supplement has an iodine to bromoform ratio of less than 0.04, 0.03, 0.02, 0.012 or 0.01 w/w. In particular embodiments, the feed supplement has an iodine to bromoform ratio of less than 0.012.

2.4. Improvement of Metabolic Efficiency

Also disclosed herein are methods of administration of the formulation and feed supplements of the presently disclosed subject matter, which are suitable for administration to ruminant animals to improve one or more of metabolic efficiency, reduction in enteric methane emissions, or increase of valuable ruminant products not limited to meat, milk, wool, leather, fat, and fibers.

2.5. Products from Ruminant Animals

In particular embodiments of the presently disclosed subject matter, there is provided a slaughtered meat product produced from the ruminant animal fed on a diet comprising the formulation or the food supplement in the presently disclosed subject matter.

In particular embodiments of the presently disclosed subject matter, there is provided a dairy milk product produced from the ruminant animal fed on a diet comprising the formulation or the food supplement in the presently disclosed subject matter.

In particular embodiments of the presently disclosed subject matter, there is provided a wool product produced from the ruminant animal fed on a diet comprising the formulation or the food supplement in the presently disclosed subject matter.

In any of these embodiments, the formulation in its various embodiments are described above in Section 2.1. In particular embodiments, the formulation comprises bromoform as the methanogenesis inhibitor and an oil carrier. In particular embodiments, the formulation comprises bromoform as the methanogenesis inhibitor and a microparticle granule carrier. In particular embodiments, the formulation comprises bromoform as the methanogenesis inhibitor and a wax based carrier. In particular embodiments, the formulation comprises bromoform as the methanogenesis inhibitor and a microsphere carrier. Also in this embodiment, routes, and methods for administering the formulation to the ruminant animals are described above in Section 2.3

In any of these embodiments, the feed supplement in its various embodiments are described above in Section 2.2. In particular embodiments, the feed supplement comprises one or more substrates which are described in Section 2.2.1. In particular embodiments, the feed supplement comprises one or more binders which are described in Section 2.2.2. In particular embodiments, the feed supplement comprises one or more additives, and/or flavor masking agents and/or odor masking agents which are described in Section 2.2.3.

In any of these embodiments, the formulation or the feed supplement decreases methane production and/or increases propionate production in the ruminant animal, thereby improving animal metabolism, animal productivity, thereby economically benefiting the farmer by improving feed efficiency.

In any of these embodiments, the meat product is characterized by a feed efficiency from approximately 0.1% to approximately 12%.

In particular embodiments (e.g. meat products), the feed efficiency is calculated as a ratio of an average daily weight of the feed supplement to an average daily weight gain of the ruminant animal.

In particular embodiments (e.g. dairy cows), the feed efficiency is calculated by dividing the amount of energy-corrected milk produced by the DMI.

In particular embodiments (e.g. wool), the feed efficiency is calculated by dividing the amount of wool produced by the DMI.

In particular embodiments, the wool product has more fatty acids, lipids, or lanolin compared to wool from ruminant animals not administered the formulation or feed supplement of the presently disclosed subject matter. In particular embodiments ruminant animals administered the formulation or feed supplement had a fatty acid, lipid, or lanolin content that is from approximately 0.1% to approximately 5% more than wool from ruminant animals not administered the formulation or feed supplement.

In any of these embodiments, the amount of iodine in the final meat product is below the toxicity levels recognized in the food industry. As an example and not by way of limitation, the amount of iodine in the final meat product is from approximately 8 mcg to approximately 25 mcg/100 g.

In any of these embodiments, the amount of methanogenesis inhibitors (e.g., bromoform) in the final meat product is below approximately 0.05 ppm.

2.5.1. Feed Efficiency

In particular embodiments improved feed efficiency is based on an increase in feed efficiency compared to ruminant animals that are not administered the formulation or feed supplement.

In particular embodiments, the ruminant animals receiving the formulation or the feed supplement in the presently disclosed subject matter gain approximately 0.1%. 0.2%, 0.5%, 1%, 2%, 3%, 4%, 5%, 6%, 7%, 8%, 9%, 10% or 11% more weight than ruminant animals not receiving the formulation or the feed supplement. This weight gain difference can be an average weight at slaughter or at other times in the growth cycle. In particular embodiments, the ruminant animals receiving the formulation or the feed supplement in the presently disclosed subject matter gain approximately 12%, 13%, 14%, 15%, 16%, 17%, 18%, 19%, 20% or 21% more weight than ruminant animals not receiving the formulation or the feed supplement. This weight gain difference can be average weight at slaughter or at other times in the growth cycle.

In particular embodiments, the ruminant animals receiving the formulation or the feed supplement in the presently disclosed subject matter grow approximately 0.1%, 0.5%, 1%, 2%, 3%, 4%, 5%, 6%, 7%, 8%, 9%, 10% or 11% faster than ruminant animals not receiving the formulation or the feed supplement. This weight gain difference can be an average daily weight gain. In particular embodiments, the ruminant animals receiving the formulation or the feed supplement in the presently disclosed subject matter grow approximately 12%, 13%, 14%, 15%, 16%, 17%, 18%, 19%, 20% or 21% faster than ruminant animals not receiving the formulation or the feed supplement. This weight gain difference can be an average daily weight gain.

In particular embodiments, ruminant animals receiving the formulation or the feed supplement in the presently disclosed subject matter exhale more hydrogen than ruminant animals not receiving the formulation or the feed supplement. In particular embodiments, the ruminant animals receiving the formulation or the feed supplement in the presently disclosed subject matter exhale approximately 10% to 20%, 21% to 30%, 31% to 40%, 41% to 50%, 51% to 60%, 61% to 70%, 71% to 80%, 81% to 90%, 91% to 99% or 100% more hydrogen than ruminant animals not receiving the formulation or the feed supplement. In particular embodiments, the ruminant animals receiving the formulation or the feed supplement in the presently disclosed subject matter exhale approximately 1%, 2%, 3%, 4%, 5%, 6%, 7%, 8%, 9%, 10% or 11% more hydrogen than ruminant animals not receiving the formulation or the feed supplement. In particular embodiments, the ruminant animals receiving the formulation or the feed supplement in the presently disclosed subject matter exhale no less than approximately 1%, 2%, 3%, 4%, 5%, 6%, 7%, 8%, 9%, 10% or 11% of hydrogen than ruminant animals not receiving the formulation or the feed supplement. In particular embodiments, the ruminant animals receiving the formulation or the feed supplement in the presently disclosed subject matter exhale no less than approximately 10% to 20%, 21% to 30%, 31% to 40%, 41% to 50%, 51% to 60%, 61% to 70%, 71% to 80%, 81% to 90%, 91% to 99% or 100% of hydrogen than ruminant animals fed a control diet without the feed supplement.

In particular embodiments, the present disclosed subject matter provides for selection of alga substrates and addition of methanogenesis inhibitors for achieving ruminant feed supplements with a ratio of the concentration of methanogenesis inhibitors (mg/g) to iodine (ppm) of greater than approximately 150:1, thus allowing the inclusion of the feed supplement to the feed at lower levels, e.g., between approximately 10 g/day and approximately 60 g/day, therefore minimizing odor and the over-supplementation of iodine while maintaining the beneficial effects of reduced methane generation, faster growth, higher final body mass, fatty acid content quality, manure quality, leather quality, meat quality, wool quality, and milk quality.

In particular embodiments, the inclusion rate is approximately 10, 15, 20, 25, 30, 35, 40, 45, 50, 55, or 60 g/day on a particular day. In particular embodiments, the inclusion rate is approximately 10, 15, 20, 25, 30, 35, 40, 45, 50, 55, or 60 g/day averaged over 2, 3, 4, 5, 6, or 7-day period. In particular embodiments the inclusion rate is approximately 40 g/day approximately every 48 h.

When a ratio of methanogenesis inhibitors to iodine is referred to, the methanogenesis inhibitors include iodine containing compounds, but not elemental iodine.

In particular embodiments, the expression "inorganic iodine" means iodide anions, salts, hypoiodites and the like. In particular embodiments, the expression "organic iodine" refers to any compound comprising at least one iodine atom bound to at least one carbon atom.

2.5.2. Increased Meat Production

In particular embodiments, the ruminant animals receiving the formulation or the feed supplement in the presently disclosed subject matter provide approximately 22%, 23%, 24%, 25%, 26%, 27%, 28%, 29%, 30% or 31% more meat than ruminant animals fed a control diet without the feed supplement.

In particular embodiments, the ruminant animals receiving the formulation or the feed supplement in the presently disclosed subject matter provide approximately 0.1%, 0.2%, 0.5%, 1%, 2%, 3%, 4%, 5%, 6%, 7%, 8%, 9%, 10%, 11%, 12%, 13%, 14%, 15%, 16%, 17%, 18%, 19%, 20% or 21% more meat than ruminant animals not receiving the formulation or the feed supplement. In particular embodiments, the ruminant animals receiving the formulation or the feed supplement in the presently disclosed subject provide an amount of meat within a range of any two of the preceding percentages compared to ruminant animals not receiving the formulation or the feed supplement.

2.5.3. Increased Milk Production

In particular embodiments, the ruminant animals receiving the formulation or the feed supplement in the presently disclosed subject matter provide approximately 22%, 23%, 24%, 25%, 26%, 27%, 28%, 29%, 30% or 31% more milk than ruminant animals fed a control diet without the feed supplement.

In particular embodiments, the ruminant animals receiving the formulation or the feed supplement in the presently disclosed subject matter provide approximately 0.05%, 0.1%, 0.2%, 0.5%, 1%, 2%, 3%, 4%, 5%, 6%, 7%, 8%, 9%, 10%, 11%, 12%, 13%, 14%, 15%, 16%, 17%, 18%, 19%, 20% or 21% more milk than ruminant animals not receiving the formulation or the feed supplement. In particular embodiments, the ruminant animals receiving the formulation or the feed supplement in the presently disclosed subject provide an amount of milk within a range of any two of the preceding percentages compared to ruminant animals not receiving the formulation or the feed supplement.

2.5.4. Increased Wool Production

In particular embodiments, the ruminant animals receiving the formulation or the feed supplement in the presently disclosed subject matter provide approximately 0.1%, 0.2%, 0.5%, 1%, 2%, 3%, 4%, 5%, 6%, 7%, 8%, 9%, 10%, 11%, 12%, 13%, 14%, 15%, 16%, 17%, 18%, 19%, 20% or 21% more wool than ruminant animals not receiving the formulation or the feed supplement. In particular embodiments, the ruminant animals receiving the formulation or the feed supplement in the presently disclosed subject provide an amount of wool within a range of any two of the preceding percentages compared to ruminant animals not receiving the formulation or the feed supplement.

2.6. Dosing and Schedules

In some certain embodiments, the formulations and feed supplements provided herein when administered to the ruminant animals at certain effective doses of amount, typically administered daily, provides a surprising economic benefit through improved metabolic efficiency, and reduction of emitted methane for the increase of valuable ruminant products not limited to meat, milk, wool, leather, fat, and fibers.

The formulations, feed supplements and methods described herein can for example, reduce methane production and/or emissions by at least 10% (compared to methane production and/or emission in ruminant animals that were not administered the formulation or the feed supplement). For example, the formulation or the feed supplement can reduce methane production and/or emissions by at least 10%, or at least 15%, or at least 25%, or at least 30%, or at least 35%, or at least 40% or at least 45%, or at least 50%, or at least 60%, or at least 70%, or at least 80%. The formulation or the feed supplement described herein can, for example, reduce methane production and/or emissions by up to 100%. For example, the formulation or the feed supplement can reduce methane production and/or emissions by up to approximately 99%, or up to approximately 98%, or up to approximately 97%, or up to approximately 96%, or up to approximately 95%, or up to approximately 90%, or up to approximately 85%, or up to approximately 80%, or up to approximately 75%, or up to approximately 70%. Methane emission can be measured according to any method known in the art such as those described in the examples sections herein. This can, for example, be measured by the Hohenheim gas test or by using a manometer.

In particular embodiments, the presently disclosed subject matter provides for a method of reducing methane production from ruminant animals by at least 70% by supplementing the food rations of such ruminant animals by at least 0.6% of their DMI with the formulations or the feed supplements provided herein exhibiting a bromoform content of more than approximately 2.5, 2.4, 2.3, 2.2, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1% w/w dry weight.

In particular embodiments, the presently disclosed subject matter provides for a method of reducing methane production from ruminant animals by at least 70% by supplementing the food rations of such ruminant animals with the formulations, or the feed supplements in the presently disclosed subject matter exhibiting an iodine content of less than 0.1, 0.09, 0.08, 0.07, 0.06, 0.05, 0.04, 0.03, 0.02 or 0.01% w/w In particular embodiments, the presently disclosed subject matter provides for a method of reducing methane production from ruminant animals by at least 70% by supplementing the food rations of such ruminant animals with the formulations, or the feed supplements in the presently disclosed subject matter exhibiting an iodine to bromoform ratio of less than 0.1, 0.09, 0.08, 0.07, 0.06, 0.05, 0.04, 0.03, 0.02, 0.012 or 0.01.

In particular embodiments, the presently disclosed subject matter provides for a method of reducing methane emissions from ruminant animals by at least 80% by supplementing the food rations of such ruminant animals with the formulations, or the feed supplements in the presently disclosed subject matter exhibiting a bromoform content of more than 2.5, 2.4, 2.3, 2.2, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1% w/w dry weight.

In particular embodiments, the presently disclosed subject matter provides for a method of reducing methane emissions from ruminant animals by at least 80% by supplementing the food rations of such ruminant animals with the formulations, or the feed supplements in the presently disclosed subject matter exhibiting an iodine content of less than 0.1, 0.09, 0.08, 0.07, 0.06, 0.05, 0.04, 0.03, 0.02 or 0.01% w/w In particular embodiments, the presently disclosed subject matter provides for a method of reducing methane emissions from ruminant animals by at least 80% by supplementing the food rations of such ruminant animals with the formulations, or the feed supplements in the presently disclosed subject matter exhibiting an iodine to bromoform ratio of less than 0.1, 0.09, 0.08, 0.07, 0.06, 0.05, 0.04, 0.03, 0.02, 0.012 or 0.01. In certain embodiments, the formulations, or the feed supplements in the presently disclosed subject matter exhibiting an iodine to bromoform ratio of less than 0.04, 0.03, 0.02, 0.012 or 0.01.

In particular embodiments, the presently disclosed subject matter provides for a method of reducing methane production from ruminant animals by at least 80% by supplementing the food rations of such ruminant animals with the formulations, or the feed supplements in the presently disclosed subject matter such that the ruminant consumes less than 50 mg of iodine per 1 kg of dry matter intake.

In particular embodiments, the presently disclosed subject matter provides for a method of reducing methane production from ruminant animals by at least 80% by supplementing the food rations of such ruminant animals with the formulations, or the feed supplements in the presently disclosed subject matter such that the ruminant consumes less than 40 mg of iodine per 1 kg of dry matter intake.

In particular embodiments, the presently disclosed subject matter provides for a method of reducing methane production from ruminant animals by at least 80% by supplementing the food rations of such ruminant animals with the formulations, or the feed supplements in the presently disclosed subject matter such that the ruminant consumes less than 30 mg of iodine per 1 kg of dry matter intake.

In particular embodiments, the presently disclosed subject matter provides for a method of reducing methane production from ruminant animals by at least 80% by supplementing the food rations of such ruminant animals with the formulations, or the feed supplements in the presently disclosed subject matter such that the ruminant consumes less than 20 mg of iodine per 1 kg of dry matter intake.

In particular embodiments, the presently disclosed subject matter provides for a method of reducing methane production from ruminant animals by at least 80% by supplementing the food rations of such ruminant animals with the formulations, or the feed supplements in the presently disclosed subject matter such that the ruminant consumes less than 10 mg of iodine per 1 kg of dry matter intake.

In particular embodiments, the presently disclosed subject matter provides for a method of reducing methane production from ruminant animals by at least 80% by supplementing the food rations of such ruminant animals with the formulations, or the feed supplements in the presently disclosed subject matter such that the ruminant consumes less than 5 mg of iodine per 1 kg of dry matter intake.

In particular embodiments, the presently disclosed subject matter provides for a method of reducing methane production from ruminant animals by at least 80% by supplementing the food rations of such ruminant animals with the formulations, or the feed supplements in the presently disclosed subject matter such that the ruminant consumes less than 4 mg of iodine per 1 kg of dry matter intake.

In particular embodiments, the presently disclosed subject matter provides for a method of reducing methane emissions from ruminant animals by at least 80% by supplementing the food rations of such ruminant animals with the formulations, or the feed supplements in the presently disclosed subject matter such that the ruminant consumes less than 3 mg of iodine per 1 kg of dry matter intake.

In particular embodiments, intermittent feeding is where the variation in feeding is done on a daily or weekly timescale. For example, in one embodiment, the ruminant animals are fed/administered the formulations, or the feed supplements provided herein in the morning tot Total Mixed Ration (TMR) but not the evening, or on weekdays but not weekends. This could yield a number of the benefits above, for example reducing labor. Note that, though the actual feeding with the formulations, or the feed supplements in the presently disclosed subject matter is done on sub-week timescales, this is likely part of a feeding regimen lasting a couple weeks or more.

In particular embodiments, intermittent feeding is where the variation in feeding is done on a period of longer than a week. For example, in one embodiment, the ruminant animals are fed/administered with the formulations, or the feed supplements provided herein during lactation but not during pregnancy for dairy cows or removing beef steers from the formulations or the feed supplement regimen two weeks before harvest.

In particular embodiments, feeding ruminant animals a higher dose of the formulations or feed supplements provided herein at the beginning of the dosing period, tapering to a lower dose towards the end of the dosing period. This could be useful, for example, to "kickstart" the benefits of the formulations or the feed supplements in the presently disclosed subject matter.

In particular embodiments, feeding ruminant animals a lower dose of the formulations, or the feed supplements in the presently disclosed subject matter at the beginning of the dosing period, increasing to a higher dose at the end of the dosing period. This could be useful, for example, to maintain or elongate the benefits of the formulations or the feed supplements in the presently disclosed subject matter.

In particular embodiments, the presently disclosed subject matter is used to alter the dose of the formulations or the feed supplement based on the concentration of the active ingredient (e.g., bromoform) within the formulations or the feed supplement.

In particular embodiments, the increase of efficacy of the amount of methane emissions reduced per gram of the provided formulations or feed supplement is at least 5%, 10%, 20%, 30%, 40%, 50%, 75%, 100%, 150%, 200% or greater than 200%.

In particular embodiments, a time varying dose of formulation or feed supplement is a supplementation schedule describing the regularly occurring intervals and amounts of feeding an *Asparagopsis Taxiformis* like composition. In particular embodiments, the formulations or the feed supplement is administered once every 48 h. In still another embodiment, the formulations or the feed supplement is administered every 72 h.

In particular embodiments, a time varying dose of the formulations or the feed supplement is a supplementation schedule describing the supplementation time window and dose of the formulations or the feed supplement based on discrete events such as reproductive status or time to market, or other such events that would limit the amount of iodine or halogenated organic materials allowable in the animal product or animal.

In particular embodiments, the time varying dose supplementation schedule time window is adjusted to comport with ruminant feed regulations or consumer perception.

In yet another aspect, the formulations or the feed supplement compositions of the present technology is used to supplement feedlot ruminant animals on finishing diets at a daily supplementation rate of less than 200 g/day, less than approximately 150 g/day, less than approximately 100 g/day, or approximately or less than approximately 50 g/day of the algal biomass described here for ruminant animals on finishing diets.

Also disclosed herein is a method of inhibiting one or more methanogens comprising administering the formulation or the feed supplement as described herein to a ruminant animal. In particular embodiments, the compositions and combinations disclosed herein can be used to reduce one or more methanogens. Non-limiting examples of such methanogens are, *Methanobacterium formicicum, Methanobacterium bryantii, Methanobrevibacter ruminantium, Methanobrevibacter millerae, Methanobrevibacter olleyae, Methanomicrobium mobile, Methanoculleus olentangyi, Methanosarcina barkeri, Methanobrevibacter boviskoreani, Methanobacterium beijingense, Methanoculleus marisnigri, Methanoculleus bourgensis, Methanosarcina mazei, Methanobrevibacter gottschalkii, Methanobrevibacter thaueri, Methanobrevibacter smithii, Methanosphaera stadtmanae, Methanobrevibacter woesei, Methanobrevibacter wolinii.*

Also disclosed herein is a method of improving the metabolic efficiency of a ruminant, the method comprising administering the composition or the ruminant feed according to the embodiments disclosed herein to a ruminant animal. The improvement in metabolic efficiency can result in an increased yield of ruminant products, for example, one or more of meat, fat, wool (i.e., fibers) and milk. Thus, the present composition or method can improve the meat and/or fat and/or wool and/or milk production of a ruminant animal.

The composition, ruminant feed and methods described herein can, for example, increase milk and/or meat and/or wool production by at least 20% (compared to milk and/or meat and/or fat and/or wool production if the composition or ruminant feed was not consumed). For example, the composition or ruminant feed can increase milk and/or meat and/or fat and/or wool production by at least 25%, or at least 30%, or at least 35%, or at least 40%, or at least 45%, or at least 50%. The composition or ruminant feed described herein can, for example, increase milk and/or meat and/or fat and/or wool production by up to 100%. For example, the composition or ruminant feed can increase milk and/or meat and/or fat and/or wool production by up to approximately 95%, or up to approximately 90%, or up to approximately 85%, or up to approximately 80%, or up to approximately 75%, or up to approximately 70%. This is measured, for example, by volume of milk produced per day or by weight of ruminant or by weight of wool and/or fat and/or meat produced.

The composition and ruminant feed described herein can, for example, increase efficiency of milk and/or meat and/or wool production by at least 20% (compared to the efficiency of milk and/or meat and/or fat and/or wool production if the composition or ruminant feed was not consumed). For example, the composition or ruminant feed described herein can increase efficiency of milk and/or meat and/or fat and/or wool production by at least 25%, or at least 30%, or at least 35%, or at least 40%, or at least 45%, or at least 50%. The composition or ruminant feed described herein can, for example, increase efficiency of milk and/or meat and/or fat and/or wool production by up to 100%. For example, the composition or ruminant feed described herein can increase efficiency of milk and/or meat and/or fat and/or wool production by up to approximately 95%, or up to approximately 90%, or up to approximately 85% or up to approximately 80%, or up to approximately 75%, or up to approximately 70%. Efficiency relates to the degree to which a particular biological process (e.g. milk, meat, fat, wool production) takes place per unit of nutrition consumed. This is measured, for example, by change in volume of milk produced per day or weight of ruminant or weight of wool or fat divided by the total nutrients consumed by the ruminant. The composition or ruminant feed described herein can, for example, increase nutrient availability by at least 20% (compared to milk and/or meat and/or fat and/or wool production if the composition or ruminant feed was not consumed). For example, the composition or ruminant feed described herein can increase nutrient availability by at least 25%, or at least 30%, or at least 35%, or at least 40%, or at least 45%, or at least 50%. The composition or ruminant feed described herein can, for example, increase nutrient availability by up to 100%. For example, the composition or ruminant feed described herein can increase nutrient availability by up to approximately 95%, or up to approximately 90%, or up to approximately 85%, or up to approximately 80%, or up to approximately 75%, or up to approximately 70%. Nutrient availability refers to the amounts of nutrients that are available to the ruminant to be used for biological/metabolic functions.

In particular embodiments of the present disclosure, the feed supplement is administered at a rate to supply at least 0.2%, 0.25%, 0.3%, 0.35%, 0.40%, 0.45%, 0.50%, or 0.55% percent of a daily dry matter intake (DMI) by the ruminant animal. In particular embodiments, the feed supplement is administered at a rate to supply approximately 0.05% to approximately 2.5% of a daily dry matter intake (DMI) by the ruminant animal. In certain embodiments of the present disclosure, ruminant animal feed is administered at a rate to supply approximately 0.2%, 0.25%, 0.3%, 0.35%, 0.40%, 0.45%, 0.50%, or 0.55% of a daily dry matter intake (DMI) by the ruminant animal. In certain embodiments, of the present disclosure, ruminant animal feed is administered at a rate to supply approximately 0.40%, 0.45%, 0.50%, or 0.55% percent of a daily dry matter intake (DMI) by the ruminant animal.

In general, ruminant animals have different supplementation rates depending on whether they are being raised for dairy or meat, are grazed solely on pasture, solely on grain, or on transition diets. Particularly, the methods and supplementation rates and methods described herein consider the amount of neutral dietary fiber.

In particular embodiments, the formulation or the feed supplement is administered to the ruminant animal once daily, twice daily, or thrice daily.

In particular embodiments, the formulation or the feed supplement is administered to the ruminant animal daily, once a week, or twice a week.

In particular embodiments, the feed supplement is mixed with a ruminant feed that is provided to the ruminant animal ad libitum.

3. MANUFACTURE OF FORMULATIONS AND FEED SUPPLEMENTS

3.1. Manufacture of Formulations Comprising Methanogenesis Inhibitors

In particular embodiments of the presently disclosed subject matter, there is provided a method of manufacturing a formulation comprising, preparing a mixture comprising at least one methanogenesis inhibitor; and encapsulating the mixture within a carrier, wherein the carrier comprises a core comprising the methanogenesis inhibitor.

FIG. 1 illustrates an example method 100 for manufacturing a formulation. The method may begin at step 110, where a mixture comprising at least one methanogenesis inhibitor is prepared. At step 120 the mixture is encapsulated within a carrier, where the carrier comprises a core comprising the methanogenesis inhibitor. Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for manufacturing a formulation including the particular steps of the method of FIG. 1, this disclosure contemplates any suitable method for manufacturing a formulation including any suitable steps, which may include all, some, or none of the steps of the method of FIG. 1, where appropriate. Furthermore, although this disclosure describes and illustrates particular compositions for carrying out particular steps of the method of FIG. 1, this disclosure contemplates any suitable compositions for carrying out any suitable steps of the method of FIG. 1.

In particular embodiments formulations comprising oil-based carriers are manufactured by a method comprising preparing a water phase solution comprising a spray dry powder substrate; preparing an oil phase solution comprising one or more oil solvents, one or more emulsifiers and the methanogenesis inhibitor; mixing the oil phase solution with the water phase solution to obtain a spray drying stock solution; and spray drying the spray drying stock solution.

In particular embodiments, preparing the water phase solution comprises the use of ultrasonication to dissolve the spray dry powder substrate with the aqueous phase. In particular embodiments, preparing the water phase solution comprises the application of heat to dissolve the spray dry powder substrate with the aqueous phase. In particular embodiments, preparing the water phase solution comprises the application of both ultrasonication and heat to dissolve the spray dry powder substrate with the aqueous phase.

In particular embodiments, preparing the oil phase solution comprises the use of ultrasonication to mix the methanogenesis with the oil and the emulsifier. In particular embodiments, preparing the oil phase solution comprises the application of heat to mix the methanogenesis with the oil and the emulsifier. In particular embodiments, preparing the oil phase solution comprises the application of both ultrasonication and heat to mix the methanogenesis with the oil and the emulsifier.

In particular embodiments, the spray drying is performed at inlet air temperature from approximately 110° C. to approximately 120° C. In particular embodiments, the spray drying is performed at inlet air temperature from approximately 100° C. to approximately 110° C.

In particular embodiments, the spray drying is performed at outlet air temperature from approximately 55° C. to approximately 63° C. In particular embodiments, the spray drying is performed at outlet air temperature from approximately 47° C. to approximately 58° C.

In particular embodiments, the spray drying employs a spray nozzle having an aperture of approximately 0.7 mm.

In particular embodiments, the spray drying is performed at a nozzle air flow rate of approximately 35 mm/min.

In particular embodiments, the spray drying is performed at a pump speed setting from approximately 15% to approximately 20%.

In particular embodiments, the spray drying is performed at an aspirator setting from approximately 95% to approximately 100%.

Figure 2:
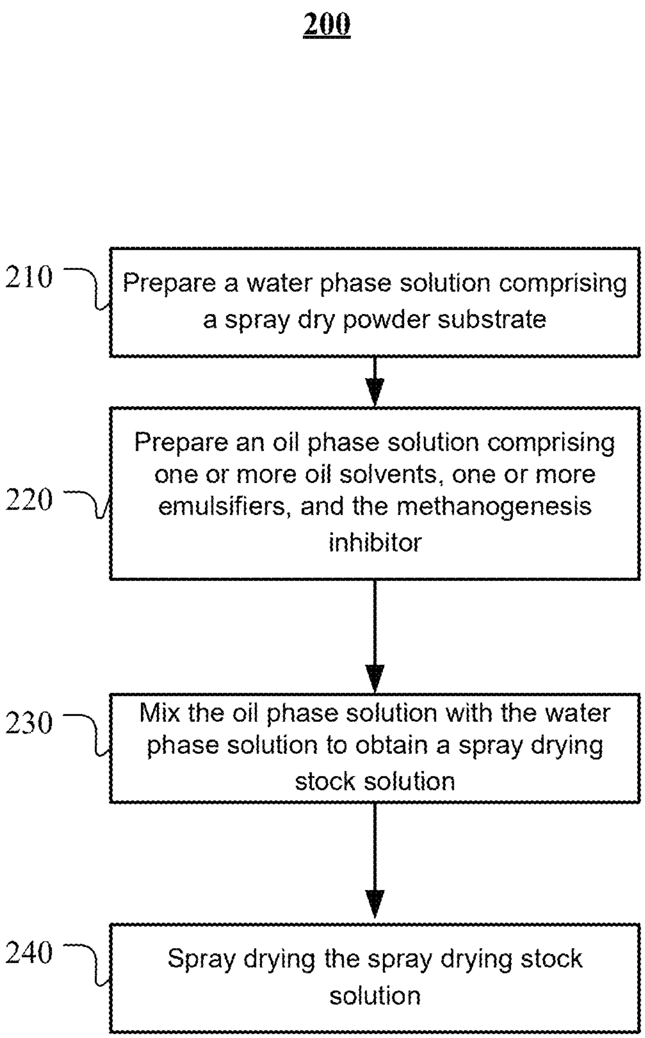
FIG. 2 illustrates an example method for manufacturing a bromoform encapsulated oil-based carrier.

FIG. 2 illustrates an example method 200 for manufacturing a bromoform encapsulated oil-based carrier. The method may begin at step 210, where a water phase solution comprising a spray dry powder substrate is prepared. At step 220, an oil phase solution comprising one or more oil solvents, one or more emulsifiers, and the methanogenesis inhibitor is prepared. At step 230, the oil phase solution is mixed with the water phase solution to obtain a spray drying stock solution. At step 240, the spray drying stock solution is spray dried to obtain the oil-based carrier encapsulated with the bromoform. Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for manufacturing a bromoform encapsulated oil-based carrier including the particular steps of the method of FIG. 2, this disclosure contemplates any suitable method for manufacturing a bromoform encapsulated oil-based carrier including any suitable steps, which may include all, some, or none of the steps of the method of FIG. 2, where appropriate. Furthermore, although this disclosure describes and illustrates particular compositions for carrying out particular steps of the method of FIG. 2, this disclosure contemplates any suitable compositions for carrying out any suitable steps of the method of FIG. 2.

In particular embodiments, the water phase solution comprises a spray dry powder substrate. Non-limiting examples of spray dry powder substrates include a dextrin, a maltodextrin, and Acrosil® 200 Pharma (colloidal silicon dioxide). A combination of spray dry powder substrates can also be used.

In particular embodiments one or more spray dry powder substrates can be present in different proportions in the water phase solution. For example, in one embodiment the water phase solution comprises 20% w/v maltodextrin and 1% w/v Acrosil® 200 Pharma. In particular embodiments, the water phase solution comprises 20% w/v maltodextrin and 2% w/v Acrosil® 200 Pharma.

In particular embodiments, exemplary oils include but are not limited to a vegetable oil, a seed oil, oleic acid, soyabean oil, and corn oil. One or more oils can also be used. For example, in some embodiments, the oil comprises one or more of an oleic acid, soyabean oil, or corn oil. In particular embodiments, the oil is oleic acid.

In particular embodiments, the oil phase solution comprises one or more emulsifiers. Non-limiting examples of such emulsifiers include anhydrous ethanol, MIGLYOL® 812, propylene glycol, Transcutol® HP, PEG300, Kolliphor® ELP, Kolliphor® RH 40 and Soluplus®. For example, in some embodiments, the emulsifier is one or more of propylene glycol. Transcutol® HP, PEG300, or Kolliphor® ELP. In particular embodiments, a combination of propylene glycol, Transcutol® HP and Kolliphor® RH 40 are used as emulsifiers.

In particular embodiments the oil phase solution can comprise the oils and the emulsifiers at any suitable ratio that enables formation of an emulsion when mixing the water phase and the oil phase solutions. For example, in one embodiment, the oil phase solution comprises oleic acid, propylene glycol, Kolliphor® RH 40 and Transcutol® HP in a 20:45:15:20 v/v ratio.

In particular embodiments, the concentration of the methanogenesis inhibitor in the oil phase solution is from approximately 10% w/w to approximately 50% w/w. In particular embodiments, the concentration of the methanogenesis inhibitor in the oil phase solution is from approximately 10% w/w to approximately 20% w/w. In particular embodiments, the concentration of the methanogenesis inhibitor in the oil phase solution is from approximately 20% w/w to approximately 30% w/w. In particular embodiments, the concentration of the methanogenesis inhibitor in the oil phase solution is from approximately 30% w/w to approximately 40% w/w. In particular embodiments, the concentration of the methanogenesis inhibitor in the oil phase solution is from approximately 40% w/w to approximately 50% w/w. In particular embodiments, the methanogenesis inhibitor is bromoform, which is present in the oil phase solution at a concentration of approximately 40% w/w.

In particular embodiments, the concentration of the methanogenesis inhibitor in the oil phase solution is from approximately 30% w/w to approximately 75% w/w. In particular embodiments, the concentration of the methanogenesis inhibitor in the oil phase solution is from approximately 30% to approximately 40% w/w. In particular embodiments, the concentration of the methanogenesis inhibitor in the oil phase solution is from approximately 40% to approximately 50% w/w. In particular embodiments, the concentration of the methanogenesis inhibitor in the oil phase solution is from approximately 50% to approximately 60% w/w. In particular embodiments, the concentration of the methanogenesis inhibitor in the oil phase solution is from approximately 60% to approximately 75% w/w. For example in one embodiment, the methanogenesis inhibitor is bromoform, which is present in the oil phase solution at a concentration of approximately 71%. In particular embodiments, the methanogenesis inhibitor is bromoform, which is present in the oil phase solution at a concentration of approximately 45%. In particular embodiments, the methanogenesis inhibitor is bromoform, which is present in the oil phase solution at a concentration of approximately 36%.

In particular embodiments, the oil phase solution and the water phase solution are mixed in a ratio of approximately 1:5 v/v to 1:10 v/v. In particular embodiments, the oil phase solution and the water phase solution are mixed in a ratio of approximately 1:5 v/v to 1:6 v/v. In particular embodiments, the oil phase solution and the water phase solution are mixed in a ratio of approximately 1:6 v/v to 1:7 v/v. In particular embodiments, the oil phase solution and the water phase solution are mixed in a ratio of approximately 1:7 v/v to 1:8 v/v. In particular embodiments, the oil phase solution and the water phase solution are mixed in a ratio of approximately 1:8 v/v to 1:9 v/v. In particular embodiments, the oil phase solution and the water phase solution are mixed in a ratio of approximately 1:9 v/v to 1:10 v/v. For example, in one embodiment, the oil phase solution and the water phase solution are mixed in a ratio of approximately 1:7. In particular embodiments, the oil phase solution and the water phase solution are mixed in a ratio of approximately 1:10.

Also in this embodiment, formulations comprising a microparticle granule carriers are manufactured by a method comprising preparing an oil phase solution comprising the methanogenesis inhibitor, and one or more emulsifiers; mixing the oil phase solution with an adsorbent to obtain a mixture; and passing the mixture through a sieve to obtain microparticle granules comprising encapsulated methanogenesis inhibitors.

In particular embodiments, preparing the oil phase solution comprises the use of ultrasonication to mix the methanogenesis with the oil and the emulsifier. In particular embodiments, preparing the oil phase solution comprises the application of heat to mix the methanogenesis with the oil and the emulsifier. In particular embodiments, preparing the oil phase solution comprises the application of both ultrasonication and heat to mix the methanogenesis with the oil and the emulsifier.

In particular embodiments, the oil phase solution is mixed with the adsorbent whereby the various components of the oil phase solution are adsorbed to the adsorbent.

In particular embodiments, the oil phase solution is mixed and ground to enable even adsorption of the various components of the oil phase solution to the adsorbent.

In particular embodiments, after mixing and/or grinding, the adsorbent is passed through a sieve to obtain microparticle granules comprising encapsulated methanogenesis inhibitors. In particular embodiments, the sieve has a mesh size from approximately ⅜ to approximately 200, which corresponds to a size from approximately 9500 microns to approximately 75 microns. In particular embodiments, the sieve has a mesh size from approximately 4 to approximately 10, which corresponds to a size from approximately 4760 microns to approximately 2000 microns. In particular embodiments, the sieve has a mesh size from approximately 10 to approximately 25, which corresponds to a size from approximately 2000 microns to approximately 707 microns. In particular embodiments, the sieve has a mesh size from approximately 25 to approximately 50, which corresponds to a size from approximately 700 microns to approximately 297 microns. In particular embodiments, the sieve has a mesh size from approximately 50 to approximately 70, which corresponds to a size from approximately 297 microns to approximately 210 microns. In particular embodiments, the sieve has a mesh size from approximately 70 to approximately 100, which corresponds to a size from approximately 210 microns to approximately 149 microns. In particular embodiments, the sieve has a mesh size from approximately 100 to approximately 140, which corresponds to a size from approximately 149 microns to approximately 105 microns. In particular embodiments, the sieve has a mesh size from approximately 140 to approximately 200, which corresponds to a size from approximately 105 microns to approximately 74 microns. As an example and not by way of limitation, the sieve has a mesh size of approximately 40 which enables exclusion of microparticles having a size greater than approximately 400 microns.

Figure 3:
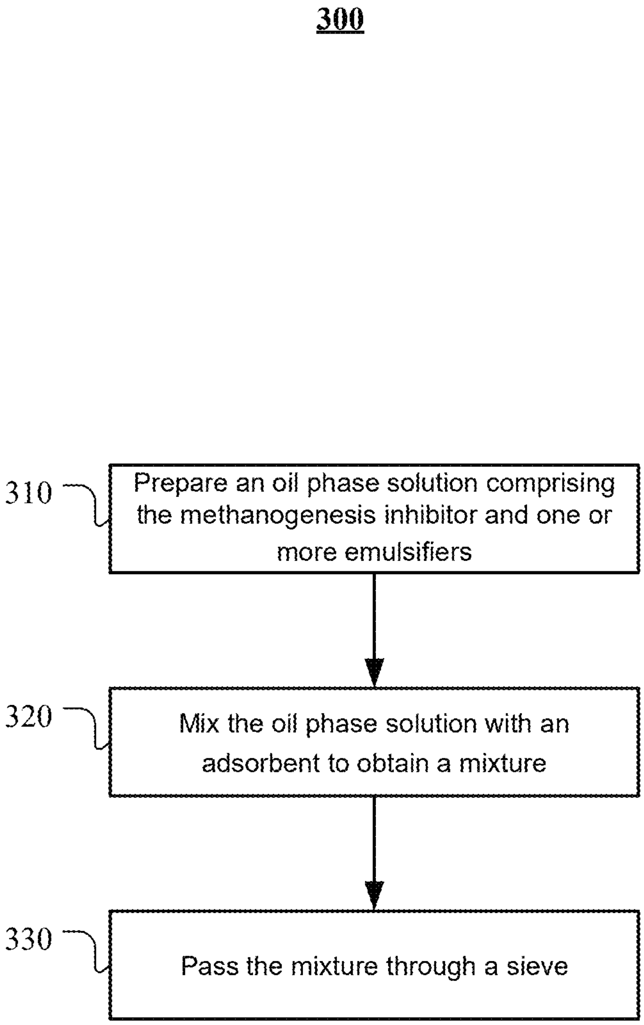
FIG. 3 illustrates an example method for manufacturing a bromoform encapsulated microparticle granule carrier.

FIG. 3 illustrates an example method 300 for manufacturing a bromoform encapsulated microparticle granule carrier. The method may begin at step 310, where an oil phase solution comprising one or more oil solvents, one or more emulsifiers, and the methanogenesis inhibitor is prepared. At step 320, the oil phase solution is mixed with an adsorbent to obtain a mixture. At step 330, the mixture is passed through a sieve to obtain microparticle granules comprising encapsulated methanogenesis inhibitors. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for manufacturing a bromoform encapsulated microparticle granule carrier including the particular steps of the method of FIG. 3, this disclosure contemplates any suitable method for manufacturing a bromoform encapsulated microparticle granule carrier including any suitable steps, which may include all, some, or none of the steps of the method of FIG. 3, where appropriate. Furthermore, although this disclosure describes and illustrates particular compositions for carrying out particular steps of the method of FIG. 3, this disclosure contemplates any suitable compositions for carrying out any suitable steps of the method of FIG. 3.

In particular embodiments, exemplary oils include but are not limited to a vegetable oil, a seed oil, oleic acid, soyabean oil, and corn oil. One or more oils can also be used. For example, in some embodiments, the oil comprises one or more of an oleic acid, soyabean oil, or corn oil. In particular embodiments, the oil is oleic acid.

In particular embodiments, the oil phase solution comprises one or more emulsifiers. Non-limiting examples of such emulsifiers include anhydrous ethanol, MIGLYOL® 812, propylene glycol, Transcutol® HP, PEG300, Kolliphor® ELP, Kolliphor® RH 40 and Soluplus®. For example, in some embodiments, the emulsifier is one or more of propylene glycol, Transcutol® HP, PEG300, or Kolliphor® ELP. In particular embodiments, a combination of propylene glycol, Transcutol® HP and Kolliphor® RH 40 are used as emulsifiers.

In particular embodiments the oil phase solution can comprise the oils and the emulsifiers at any suitable ratio that enables formation of an emulsion when mixing the water phase and the oil phase solutions. For example, in one embodiment, the oil phase solution comprises oleic acid, propylene glycol, Kolliphor® RH 40 and Transcutol® HP in a 20:45:15:20 v/v ratio.

In particular embodiments the method comprises mixing the oil phase solution with an adsorbent. A non-limiting example of an adsorbents is Polyplasdone™ XL.

In particular embodiments the oil phase solution is mixed with the adsorbent at an oil phase: adsorbent ratio from approximately 0.1:1 w/w to approximately 0.5:1 w/w. In particular embodiments the oil phase solution is mixed with the adsorbent at an oil phase: adsorbent ratio from approximately 0.1:1 w/w to approximately 0.2:1 w/w. In particular embodiments the oil phase solution is mixed with the adsorbent at an oil phase: adsorbent ratio from approximately 0.2:1 w/w to approximately 0.3:1 w/w. In particular embodiments the oil phase solution is mixed with the adsorbent at an oil phase: adsorbent ratio from approximately 0.3:1 w/w to approximately 0.4:1 w/w. In particular embodiments the oil phase solution is mixed with the adsorbent at an oil phase: adsorbent ratio from approximately 0.4:1 w/w to approximately 0.5:1 w/w. For example, in some embodiments, the adsorbent is Polyplasdone™ XL, which is mixed with the oil phase solution at an oil phase:

Polyplasdone™ XL ratio of approximately 0.25 w/w. In particular embodiments, the Polyplasdone™ XL is mixed with the oil phase solution at an oil phase: Polyplasdone™ XL ratio of approximately 0.38 w/w.

Also, in some embodiments, the oil/adsorbent mixture is passed through to obtain the microparticle granule carriers with the encapsulated methanogenesis inhibitor. In particular embodiments, the sieve is a 40-mesh sieve.

Also, in some embodiments, the methanogenesis inhibitor-encapsulated microparticle granule carriers can be filled into capsule shells for oral administration to animals. In particular embodiments, the capsule shell is made of hydroxypropyl methylcellulose (HPMC) and has a filling capacity of approximately 400 mg.

Also in this embodiment, formulations comprising a microsphere carrier are manufactured by a method comprising preparing a solution of a gelling agent; preparing an oil phase solution comprising an oil and the methanogenesis inhibitor; homogenizing the oil phase solution with the gelling agent to form an emulsion; mixing the emulsion dropwise with an aqueous solution to obtain a solution comprising microspheres; filtering the solution to harvest the microspheres; and drying the microspheres to obtain microspheres comprising encapsulated methanogenesis inhibitors.

Figure 4:
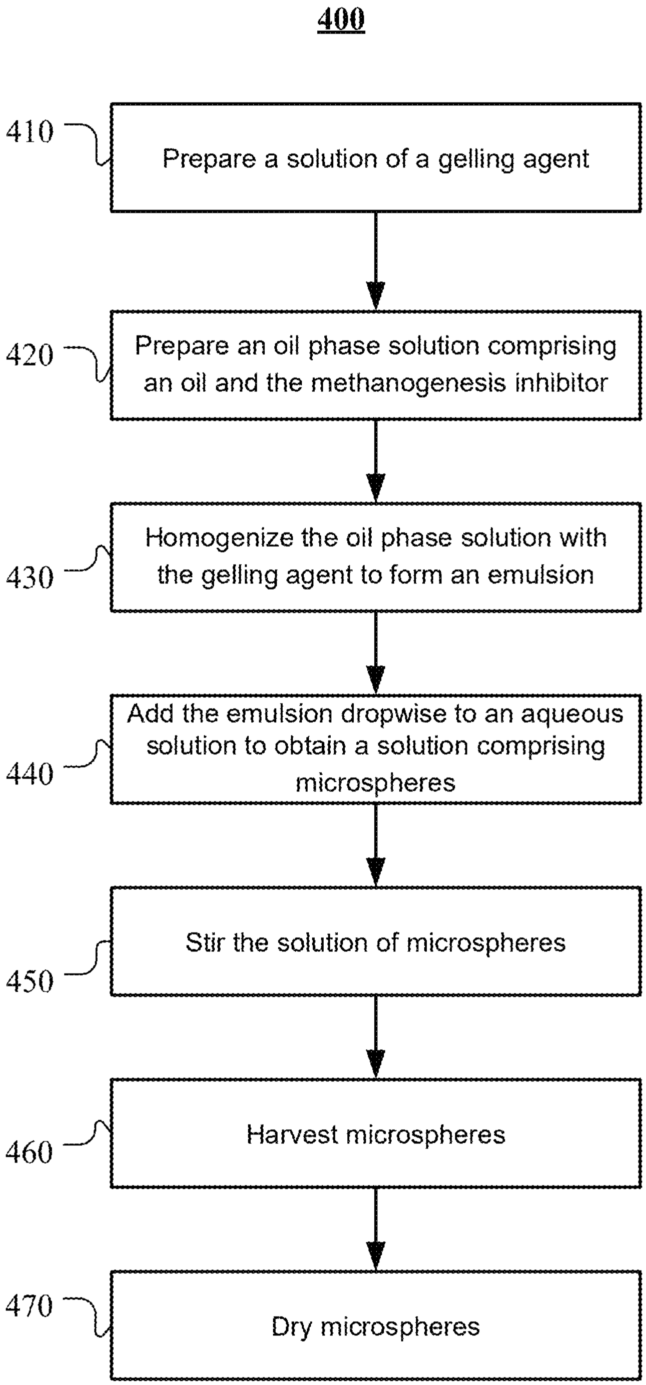
FIG. 4 illustrates an example method for manufacturing a bromoform encapsulated microsphere carrier.

FIG. 4 illustrates an example method 400 for manufacturing a bromoform encapsulated microsphere carrier. The method may begin at step 410, where a solution of a gelling agent is prepared. At step 420, an oil phase solution comprising an oil and the methanogenesis inhibitor is prepared. At step 430, the oil phase solution and the gelling agent are homogenized to form an emulsion. At step 440, the emulsion is added dropwise to an aqueous solution to obtain a solution comprising microspheres. At step 450, the microsphere solution is stirred. At step 460, the microspheres are harvested. At step 470, the microspheres are dried. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for manufacturing a bromoform encapsulated microsphere carrier including the particular steps of the method of FIG. 4, this disclosure contemplates any suitable method for manufacturing a bromoform encapsulated microsphere carrier including any suitable steps, which may include all, some, or none of the steps of the method of FIG. 4, where appropriate. Furthermore, although this disclosure describes and illustrates particular compositions for carrying out particular steps of the method of FIG. 4, this disclosure contemplates any suitable compositions for carrying out any suitable steps of the method of FIG. 4.

In particular embodiments, a solution of the gelling agent (thickening agent) is prepared by stirring into an aqueous solution. In particular embodiments, the aqueous solution is water that is not buffered. In particular embodiments, the aqueous solution is water buffered to a pH from approximately pH 6 to approximately pH 8. Non-limiting examples of gelling agents include a pectin, a carrageenan, a gellan, gelatin, an agar, a modified starch, a methyl cellulose, a hydroxypropylmethyl cellulose, xanthan gum, Gellan gum, Arrowroot, Isabgol, Guar gum, salts thereof, derivatives thereof and analogs thereof.

In particular embodiments, the gelling agent is present in the aqueous solution in a total amount from approximately 0.5% w/v to approximately 2% w/v. In particular embodiments, the gelling agent is present in the aqueous solution in a total amount from approximately 0.5% w/v to approximately 0.75% w/v. In particular embodiments, the gelling agent is present in the aqueous solution in a total amount from approximately 0.75% w/v to approximately 1% w/v. In particular embodiments, the gelling agent is present in the aqueous solution in a total amount from approximately 1% w/v to approximately 1.25% w/v. In particular embodiments, the gelling agent is present in the aqueous solution in a total amount from approximately 1.25% w/v to approximately 1.5% w/v. In particular embodiments, the gelling agent is present in the aqueous solution in a total amount from approximately 1.5% w/v to approximately 1.75% w/v. In particular embodiments, the gelling agent is present in the aqueous solution in a total amount from approximately 1.75% w/v to approximately 2% w/v. The gelling solution can be prepared by dissolving in the aqueous solution at a suitable temperature and for a suitable time that ensures completely dissolution. For example, in one embodiment, the gelling agent is sodium alginate prepared as a 1% w/v aqueous solution by stirring overnight at 35° C.

In particular embodiments, the oil phase solution comprises the methanogenesis inhibitor. Non-limiting examples of oils include vegetable oil, a seed oil, oleic acid, soyabean oil, and corn oil. A combination of oils can also be used. For example, in some embodiments, the oil comprises one or more of an oleic acid, soyabean oil, or corn oil. In particular embodiments, the oil is vegetable oil (Crisco).

In particular embodiments, the concentration of the methanogenesis inhibitor in the oil phase solution is approximately 2.5% w/v to approximately 25% w/v. In particular embodiments, the concentration of the methanogenesis inhibitor in the oil phase solution is approximately 2.5% w/v to approximately 5% w/v. In particular embodiments, the concentration of the methanogenesis inhibitor in the oil phase solution is approximately 5% w/v to approximately 7.5% w/v. In particular embodiments, the concentration of the methanogenesis inhibitor in the oil phase solution is approximately 7.5% w/v to approximately 10% w/v. In particular embodiments, the concentration of the methanogenesis inhibitor in the oil phase solution is approximately 10% w/v to approximately 15% w/v. In particular embodiments, the concentration of the methanogenesis inhibitor in the oil phase solution is approximately 15% w/v to approximately 20% w/v. In particular embodiments, the concentration of the methanogenesis inhibitor in the oil phase solution is approximately 20% w/v to approximately 25% w/v.

In particular embodiments, the oil phase and solution of the gelling agent (aqueous phase) are homogenized to form an emulsion. In particular embodiments, the oil phase is mixed with the aqueous phase in an amount from approximately 1% v/v to approximately 10% v/v, which determines the concentration of the methanogenesis inhibitor in the final microsphere carrier formulation. In particular embodiments, the oil phase is mixed with the aqueous phase in an amount from approximately 1% v/v to approximately 2% v/v. In particular embodiments, the oil phase is mixed with the aqueous phase in an amount from approximately 2% v/v to approximately 3% v/v. In particular embodiments, the oil phase is mixed with the aqueous phase in an amount from approximately 3% v/v to approximately 4% v/v. In particular embodiments, the oil phase is mixed with the aqueous phase in an amount from approximately 4% v/v to approximately 5% v/v. In particular embodiments, the oil phase is mixed with the aqueous phase in an amount from approximately 5% v/v to approximately 6% v/v. In particular embodiments, the oil phase is mixed with the aqueous phase in an amount from approximately 6% v/v to approximately 7% v/v. In particular embodiments, the oil phase is mixed with the aqueous phase in an amount from approximately 7% v/v to approximately 8% v/v. In particular embodiments, the oil phase is mixed with the aqueous phase in an amount from approximately 8% v/v to approximately 9% v/v. In particular embodiments, the oil phase is mixed with the aqueous phase in an amount from approximately 9% v/v to approximately 10% v/v.

In particular embodiments, the emulsion is added dropwise to an aqueous solution to allow microsphere formation. In particular embodiments, the emulsion is added dropwise to an aqueous solution of calcium chloride (forward) to allow microsphere formation. In particular embodiments the calcium chloride is in an amount from approximately 2% w/v to approximately 10% w/v. In particular embodiments, the gelling agent is sodium alginate, the oil is vegetable oil (Crisco) and the aqueous solution of calcium chloride is an approximately 10% w/v solution.

In particular embodiments the solution comprising the microspheres is stirred at room temperature for approximately 10 min to approximately 30 min.

In particular embodiments, the microspheres are harvested from the solution. In particular embodiments, harvesting of the microspheres is done by filtration. In particular embodiments, harvesting is by centrifugation. For example, in one embodiment, the gelling agent is sodium alginate, the oil is vegetable oil (Crisco), the calcium chloride is approximately 10% w/v, and the resulting alginate microsphere carriers are harvested by filtration.

In particular embodiments, the concentration of the methanogenesis inhibitor in the microsphere carrier is approximately 0.5% w/w to approximately 4% w/w. In particular embodiments, the concentration of the methanogenesis inhibitor in the microsphere carrier is approximately 0.5% w/w to approximately 1% w/w. In particular embodiments, the concentration of the methanogenesis inhibitor in the microsphere carrier is approximately 1% w/w to approximately 2% w/w. In particular embodiments, the concentration of the methanogenesis inhibitor in the microsphere carrier is approximately 2% w/w to approximately 3% w/w. In particular embodiments, the concentration of the methanogenesis inhibitor in the microsphere carrier is approximately 3% w/w to approximately 4% w/w. For example, in one embodiment, the methanogenesis inhibitor is bromoform which is encapsulated in the microsphere carrier at approximately 1.8% w/w.

In particular embodiments bromoform encapsulated microsphere carriers can be prepared using a microfluidics formulation process, a feed batch process, or a continuous flow process.

Also in this embodiment, formulations comprising a wax based carrier are manufactured by a method comprising preparing an oil phase solution comprising the methanogenesis inhibitor; melting placing a wax in a vessel; mixing the oil phase solution with the molten wax; and homogenizing the solution comprising the methanogenesis inhibitor into the molten wax.

Figure 5:
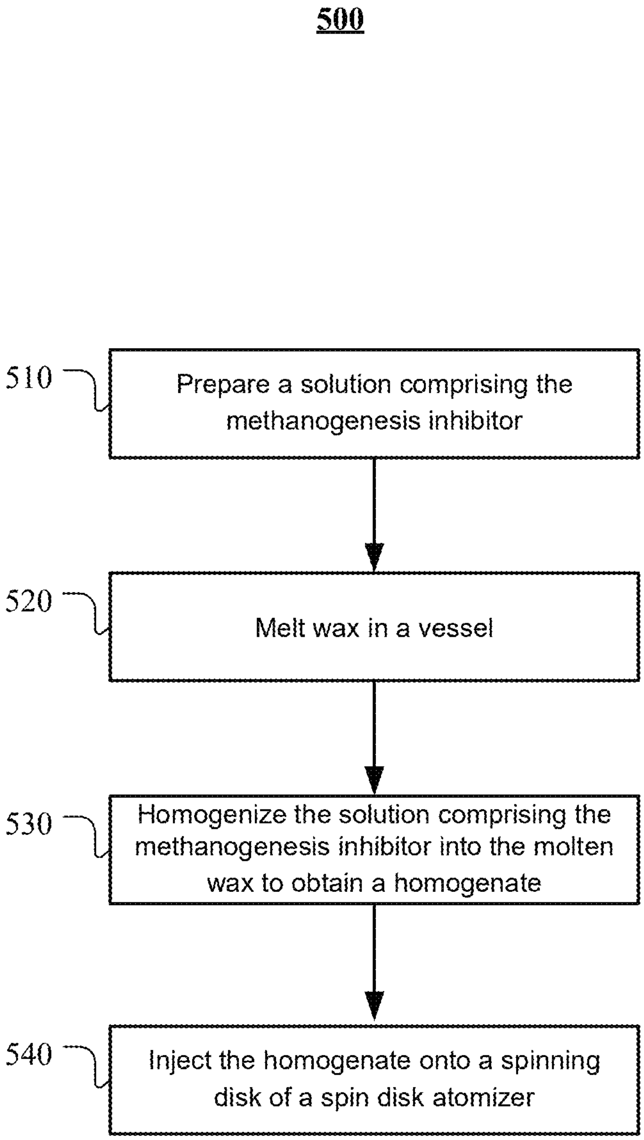
FIG. 5 illustrates an example method for manufacturing a bromoform encapsulated wax carriers.

FIG. 5 illustrates an example method 500 for manufacturing a bromoform encapsulated wax carriers. The method may begin at step 510, where a solution comprising the methanogenesis inhibitor is prepared. At step 520, wax is melted in a vessel. At step 530, the solution comprising the methanogenesis inhibitor is with the molten wax to obtain a homogenate. At step 540, the homogenate is injected onto a spinning disk of a spin disk atomizer. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for manufacturing a bromoform encapsulated wax carriers, including the particular steps of the method of FIG. 5, this disclosure contemplates any suitable method for manufacturing for manufacturing a bromoform encapsulated wax carriers including any suitable steps, which may include all, some, or none of the steps of the method of FIG. 5, where appropriate. Furthermore, although this disclosure describes and illustrates particular compositions for carrying out particular steps of the method of FIG. 5, this disclosure contemplates any suitable compositions for carrying out any suitable steps of the method of FIG. 5.

In particular embodiments, the solution comprising the methanogenesis inhibitor further comprises one or more oils. Non-limiting examples of oils include a vegetable oil, a seed oil, oleic acid, soyabean oil, and corn oil. For example, in some embodiments, the oil is soyabean oil.

In particular embodiments, the methanogenesis inhibitor is used as such without any oil (methanogenesis inhibitor: oil, 1:0 w/w). In particular embodiments, the methanogenesis inhibitor is mixed into the oil in ratios from approximately 2:1 w/w (methanogenesis inhibitor:oil) to approximately 0.25:1 w/w (methanogenesis inhibitor:oil). In particular embodiments, the methanogenesis inhibitor is mixed into the oil in ratios from approximately 2:1 w/w to approximately 1.5:1 w/w. In particular embodiments, the methanogenesis inhibitor is mixed into the oil in ratios from approximately 1.5:1 w/w to approximately 1:1 w/w. In particular embodiments, the methanogenesis inhibitor is mixed into the oil in ratios from approximately 1:1 w/w to approximately 0.5:1 w/w. In particular embodiments, the methanogenesis inhibitor is mixed into the oil in ratios from approximately 0.5:1 w/w to approximately 0.25:1 w/w. For example, in particular embodiments, the methanogenesis inhibitor is bromoform mixed with the oil in a 1:1 w/w ratio. In particular embodiments, the methanogenesis inhibitor is bromoform mixed with the oil in a 2:3 w/w ratio. In particular embodiments, the methanogenesis inhibitor is bromoform mixed with the oil in a 1.5:1 w/w ratio.

In particular embodiments, the wax is a food grade wax. In particular embodiments the wax has an emulsion particle size of <200 μm. In particular embodiments the wax is selected based on its ability to enable approximately 20% to approximately 30% loading of the methanogenesis inhibitor. Exemplary waxes that can be used in this method include, but are not limited to carnauba wax, candelilla wax, yellow beeswax, paraffin wax, stearic acid, palm kernel oil flakes, glyceryl tristearate (DYNASAN® 118), and stearyl alcohol.

In particular embodiments, the wax is melted in a vessel (reservoir) heated and maintained at a temperature that higher than the melting temperature of the wax. In particular embodiments, the wax is melted in a vessel (reservoir) maintained at a temperature that is from approximately 5° C. to approximately 15° C. above the wax melting temperature. In particular embodiments, the wax is melted in a vessel (reservoir) maintained at a temperature that is approximately 5° C. above the wax melting temperature.

In particular embodiments, the wax and the solution comprising the methanogenesis inhibitor are mixed in a ratio from approximately 1:1 w/w (wax:solution) to approximately 7:1 w/w (wax:solution).

In particular embodiments, the wax is Carnauba wax, the methanogenesis inhibitor is bromoform, wherein Carnauba wax:bromoform is approximately 7:1 w/w. In particular embodiments, the wax is DYNASAN® 118, the methanogenesis inhibitor is bromoform, wherein DYNASAN® 118: bromoform is approximately 7:1 w/w. In particular embodiments, the wax is stearic acid, the methanogenesis inhibitor is bromoform, wherein stearic acid:bromoform is approximately 7:1 w/w. In particular embodiments, the wax is beeswax, the methanogenesis inhibitor is bromoform, wherein beeswax:bromoform is approximately 7:1 w/w. In particular embodiments, the wax is paraffin wax, the methanogenesis inhibitor is bromoform, wherein paraffin wax: bromoform is approximately 7:1 w/w.

In particular embodiments, the wax is Carnauba wax, the methanogenesis inhibitor is bromoform, and the oil is soyabean oil wherein Carnauba wax:bromoform:soyabean oil is approximately 3.8:0.67:1 w/w. In particular embodiments, the wax is DYNASAN® 118, the methanogenesis inhibitor is bromoform, and the oil is soyabean oil wherein DYNASAN® 118:bromoform:soyabean oil is approximately 3.8: 0.67:1 w/w. In particular embodiments, the wax is stearic acid, the methanogenesis inhibitor is bromoform, and the oil is soyabean oil wherein stearic acid:bromoform:soyabean oil is approximately 3.8:0.67:1 w/w. In particular embodiments, the wax is beeswax, the methanogenesis inhibitor is bromoform, and the oil is soyabean oil wherein beeswax: bromoform:soyabean oil is approximately 3.8:0.67:1 w/w. In particular embodiments, the wax is paraffin wax, the methanogenesis inhibitor is bromoform, and the oil is soyabean oil wherein paraffin wax:bromoform:soyabean oil is approximately 3.8:0.67:1 w/w.

In particular embodiments, the solution comprising the methanogenesis inhibitor is incorporated into the molten wax by homogenization to obtain a homogenate. In particular embodiments, homogenization is performed until no phase separation is observed between the wax phase and the solution phase. An exemplary non-limiting parameter for homogenization is approximately 10,000 rpm for approximately 15 s.

In particular embodiments, the homogenate is injected into a spin disk atomizer to obtain wax carriers comprising the methanogenesis inhibitor. In particular embodiments, during injection, the disk of the spin disk atomizer is rotated at a disk speed from approximately 4,000 rpm to approximately 30,000 rpm which enables the formation of wax particle carriers having a particle size between approximately 30 μm and approximately 3000 μm. As an example and not by way of limitation, the disk of the spin disk atomizer is rotated at a disk speed approximately 4,000 rpm, which enables the formation of wax particle carriers having a particle size between approximately 100 μm and approximately 150 μm.

3.2. Manufacture of Feed Supplements Comprising Methanogenesis Inhibitors

In particular embodiments of the presently disclosed subject matter, there is provided a method of preparing a feed supplement comprising; preparing a formulation comprising at least one methanogenesis inhibitor; contacting the formulation with a substrate and a binder to obtain a mixture; and dry mixing the mixture.

In particular embodiments, the formulation in its various embodiments are described above in Section 2.1. In particular embodiments, the formulation comprises bromoform as the methanogenesis inhibitor and an oil carrier. In particular embodiments, the formulation comprises bromoform as the methanogenesis inhibitor and a microparticle granule carrier. In particular embodiments, the formulation comprises bromoform as the methanogenesis inhibitor and a wax based carrier. In particular embodiments, the formulation comprises bromoform as the methanogenesis inhibitor and a microsphere carrier.

In particular embodiments, the substrate in its various embodiments are described above in Section 2.2.1. In particular embodiments, the substrate is an algae. In particular embodiments the methanogenesis inhibitor is bromoform and the algae is not a source of the methanogenesis inhibitor.

In particular embodiments, the binder in its various embodiments are described above in Section 2.2.2. In particular embodiments, the methanogenesis inhibitor is bromoform and the binder is molasses.

Figure 6:
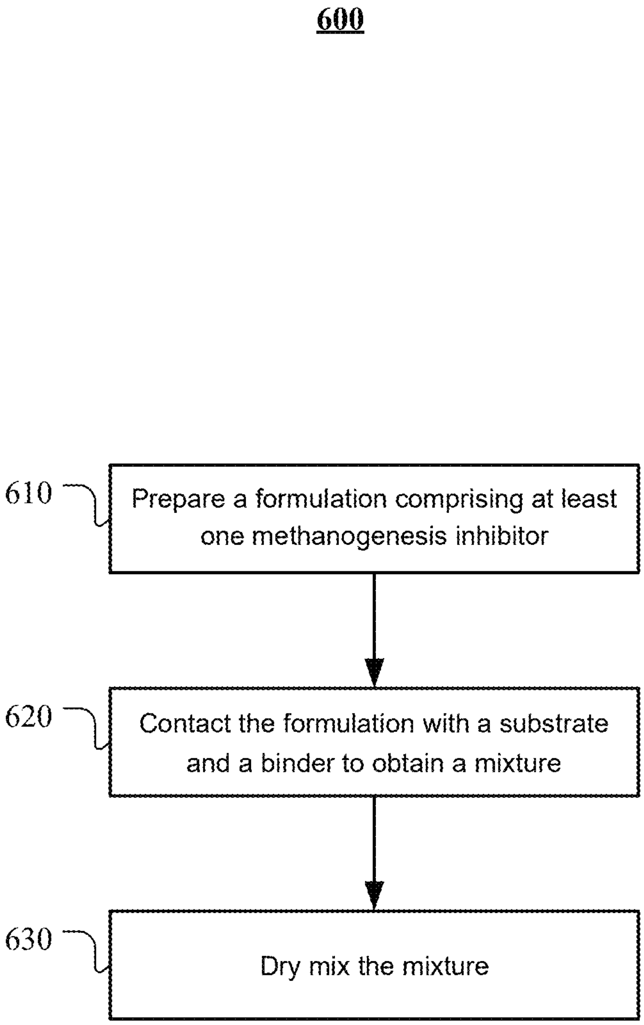
FIG. 6 illustrates an example method for manufacturing a feed supplement.

FIG. 6 illustrates an example method 600 for manufacturing a feed supplement. The method may begin at step 610, where a formulation comprising at least one methanogenesis inhibitor is prepared. Non-limiting exemplary methods for making the formulation are disclosed in methods 100, 200, 300, 400, and 500, which are illustrated in FIGS. 1-5, respectively. At step 620, the formulation is contacted with a substrate and a binder to obtain a mixture. At step 630, the mixture is dry mixed to obtain the feed supplement. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for manufacturing a feed supplement including the particular steps of the method of FIG. 6, this disclosure contemplates any suitable method for manufacturing a feed supplement including any suitable steps, which may include all, some, or none of the steps of the method of FIG. 6, where appropriate. Furthermore, although this disclosure describes and illustrates particular compositions for carrying out particular steps of the method of FIG. 6, this disclosure contemplates any suitable compositions for carrying out any suitable steps of the method of FIG. 6.

In particular embodiments, the method further comprises contacting the formulation with an additive prior to contacting with a substrate. In particular embodiments, the additive in its various embodiments are described above in Section 2.2.3. In particular embodiments, the methanogenesis inhibitor is bromoform and the additive is an essential oil, an antibiotic, an ionophore, a saponin, a tannin, a terpene, 3-Nitrooxypropanol, propylene glycol, fumaric acid, a green tea extract, a grape pomace, a Mootral™, an Agolin™, a Biochar, a dried yeast, a probiotic (direct feed microbials), a fiber, a prebiotic, or a combination thereof.

In particular embodiments, the method further comprises contacting the formulation with a flavor masking agent. In particular embodiments, the methanogenesis inhibitor is bromoform and the flavor masking agent is molasses, distiller's grain, rolled oats, or oregano.

In particular embodiments, the method further comprises contacting the formulation with an odor masking agent. In particular embodiments, the methanogenesis inhibitor is bromoform and the odor masking agent is molasses, distiller's grain, rolled oats, or oregano.

In particular embodiments, the additives, flavor masking agents and odor masking agents in their various embodiments are described above in Section 2.2.4.

3.3. Other Embodiments

In particular embodiments, the formulations or the feed supplements described herein is made by combining one or more methanogenesis inhibitor with an algal substrate. According to the present disclosure, a person of skill in the art can select an alga substrate based on economic parameters or based on preferred ruminant feed properties such as nutrition content, iodine levels, and/or amount of methanogenesis inhibitor to apply to the substrate to produce a feed that enables significant reduction in enteric methane emissions as described below in Section 4, while ensuring that products derived from these ruminant animals (e.g., meat, milk, wool, leather) have iodine levels below the mandated threshold values.

In particular embodiments, The composition is prepared in a dry solid form, for example, powder form, and subject to further processing steps depending on the types of intended finished products. The methods can further comprise a forming step, wherein the mixture is moulded, pressed, spray dried or otherwise formed into a shape (e.g., bar, ball, pellet, clusters, tablet, licks), with dimensions and/or textures suitable for consumption by the ruminant animals described herein.

In particular embodiments, the methods can comprise housing the formulation, feed supplement and/or the ruminant feed prepared from such, in a specific delivery device such as a syringe. For example, in one non-limiting embodiment the method comprises manufacturing a bolus tablet comprising the disclosed formulations and/or feed supplement, which is intended to stay in the stomach of the ruminant.

In particular embodiments, the components disclosed herein are combined in suitable amounts to obtain desired quantities of each component. For example, each component is combined by mixing or blending. For example, the one or more methanogenesis inhibitor and one or more organosulfur compound(s) and one or more polyphenol compound(s) is combined with a ruminant feed by placing the one or more methanogenesis inhibitor and one or more organosulfur compound(s) and one or more polyphenol compound(s) on top of the ruminant feed (top-dressing).

In particular embodiments, a method for incorporating the methanogenesis inhibitor into a substrate comprises soaking the substrate in a solution containing the methanogenesis inhibitor and subsequently freeze-drying. In particular embodiments, a methods for incorporating the methanogenesis inhibitor into a substrate comprises coating substrate and the methanogenesis inhibitor with an external compound. (e.g. molasses, wax, or oil). In particular embodiments, a methods for incorporating the methanogenesis inhibitor into a substrate comprises applying the methanogenesis inhibitor as a solid salt to the substrate in dry form. In particular embodiments, a methods for incorporating the methanogenesis inhibitor into a substrate comprises delivering the methanogenesis inhibitor as a non-bioactive precursor that reacts with the rumen environment to become the methanogenesis inhibitor of the presently disclosed subject matter. In particular embodiments, a methods for incorporating the methanogenesis inhibitor into a substrate comprises manual injection of the methanogenesis inhibitor into a hydrated or a dehydrated substrate. In particular embodiments, the method comprises obtaining a substrate and contacting the substrate with a fluid comprising one or more methanogenesis inhibitor, and an edible viscous material. In particular embodiments, the substrate, fluid comprising one or more methanogenesis inhibitor and a viscous substrate are all combined and mixed until homogenous. In particular embodiments, the method comprises obtaining a substrate, contacting the substrate with a fluid comprising bromoform and a molasses, and mixing until homogeneous, followed by lyophilizing the produced mixture.

In particular embodiments, additives including additional desired materials are added to the substrate/methanogenesis inhibitor mixture during the manufacture.

In particular embodiments, the method further comprises lyophilizing the produced mixture until dry. In particular embodiments, the lyophilizing occurs at approximately −50° C. or less. In particular embodiments, the lyophilizing occurs for at least an hour, or at least 2 hours. In particular embodiments, the lyophilizing occurs for approximately least 2 hours.

3.4. Manufacture of Products from Ruminant Animals

In particular embodiments, there is provided a slaughtered meat product from a ruminant animal, the meat product having (1) a residual iodine level below approximately 50 mg/kg. (2) a residual bromoform level below approximately 0.05 ppm, and (3) the meat product having an improved feed efficiency from approximately 1% to approximately 12%; the meat product being produced by a process comprising the steps of, administering to the ruminant animal, a formulation comprising at least one methanogenesis inhibitor encapsulated in a biologically acceptable carrier; or a feed supplement comprising the formulation, a substrate, and a binder; wherein the formulation or feed supplement decreases methane production and/or increases propionate production in the ruminant animal, thereby improving feed efficiency; and harvesting the slaughtered meat product from the ruminant animal, wherein the feed efficiency at the time of slaughter is improved from approximately 1% to approximately 12%.

Figure 7:
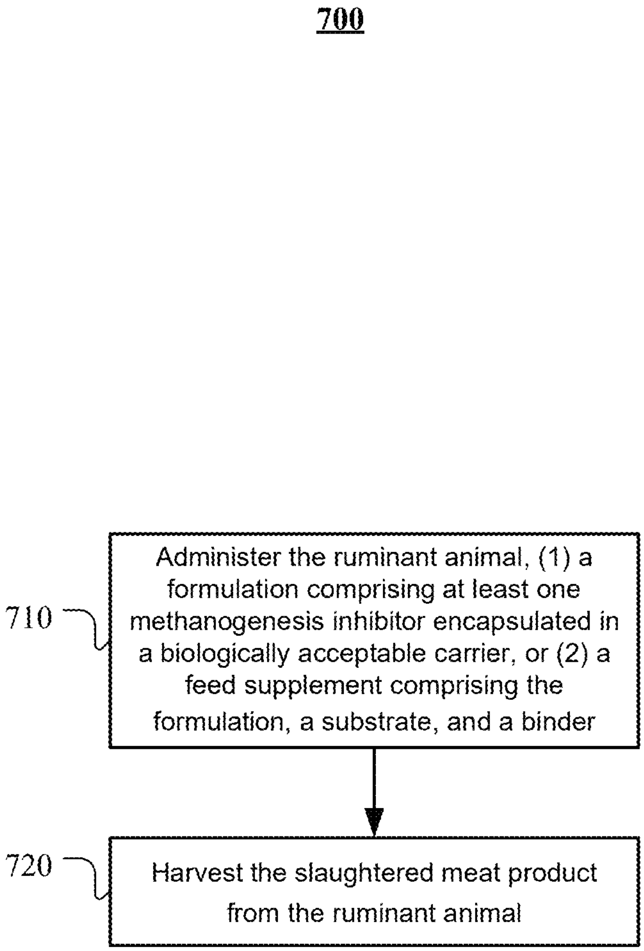
FIG. 7 illustrates a product by process for a slaughtered meat product from a ruminant animal.

FIG. 7 illustrates a product by process 700 for a slaughtered meat product from a ruminant animal. The slaughtered meat product has a residual iodine level below approximately 50 mg/kg, a residual bromoform level below approximately 0.05 ppm, and an improved feed efficiency from approximately 1% to approximately 12% The process may begin at step 710 where the ruminant animal is administered (1) a formulation comprising at least one methanogenesis inhibitor encapsulated in a biologically acceptable carrier, or (2) a feed supplement comprising the formulation, a substrate, and a binder, wherein the formulation or feed supplement decreases methane production and/or increases propionate production in the ruminant animal, thereby improving feed efficiency. In step 720, the slaughtered meat product is harvested from the ruminant animal, wherein the feed efficiency at the time of slaughter is improved from approximately 1% to approximately 12%. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example of a process for a slaughtered meat product including the particular steps of the method of FIG. 7, this disclosure contemplates any suitable process for a slaughtered meat product including any suitable steps, which may include all, some, or none of the steps of the method of FIG. 7, where appropriate. Furthermore, although this disclosure describes and illustrates particular compositions for carrying out particular steps of the method of FIG. 7, this disclosure contemplates any suitable compositions for carrying out any suitable steps of the method of FIG. 7.

In particular embodiments, there is provided a dairy milk product from a ruminant animal, the meat product having (1) a residual iodine level below approximately 50 mg/kg. (2) a residual bromoform level below approximately 0.05 ppm, and (3) the meat product having an improved feed efficiency from approximately 1% to approximately 12%; the meat product being produced by a process comprising the steps of, administering to the ruminant animal, a formulation comprising at least one methanogenesis inhibitor encapsulated in a biologically acceptable carrier; or a feed supplement comprising the formulation, a substrate, and a binder; wherein the formulation or feed supplement decreases methane production and/or increases propionate production in the ruminant animal, thereby improving feed efficiency; and harvesting the dairy milk product from the ruminant animal, wherein the feed efficiency at the time of slaughter is improved from approximately 1% to approximately 12%.

Figure 8:
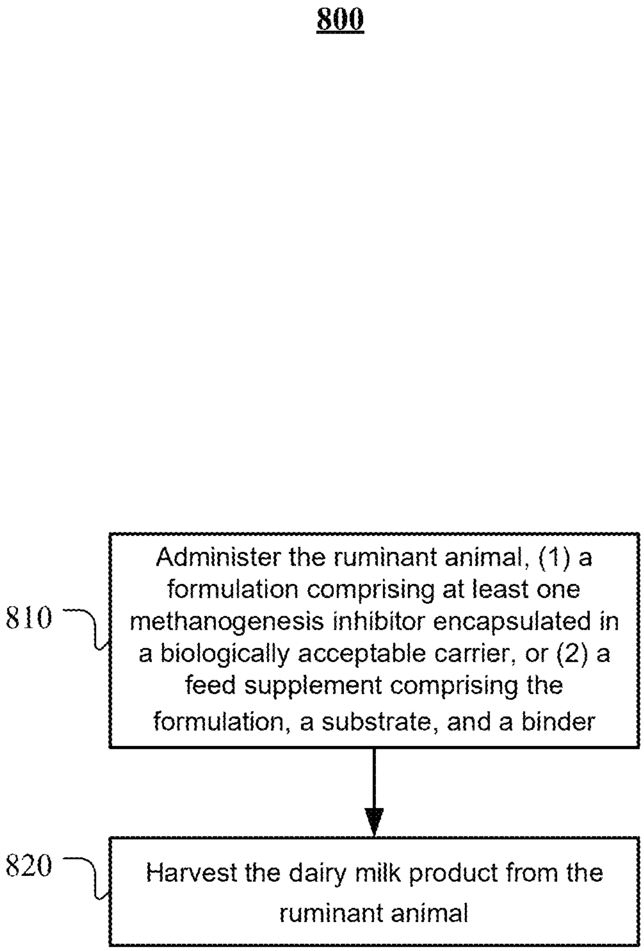
FIG. 8 illustrates a product by process for a dairy milk product from a ruminant animal.

FIG. 8 illustrates a product by process 800 for a dairy milk product from a ruminant animal. The dairy milk product has a residual iodine level below approximately 50 mg/kg, a residual bromoform level below approximately 0.05 ppm, and an improved feed efficiency from approximately 1% to approximately 12% The process may begin at step 810 where the ruminant animal is administered (1) a formulation comprising at least one methanogenesis inhibitor encapsulated in a biologically acceptable carrier, or (2) a feed supplement comprising the formulation, a substrate, and a binder, wherein the formulation or feed supplement decreases methane production and/or increases propionate production in the ruminant animal, thereby improving feed efficiency. In step 820, the dairy milk product is harvested from the ruminant animal, wherein the feed efficiency at the time of slaughter is improved from approximately 1% to approximately 12%. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example of a process for a dairy milk product including the particular steps of the method of FIG. 8, this disclosure contemplates any suitable process for a dairy milk product including any suitable steps, which may include all, some, or none of the steps of the method of FIG. 8, where appropriate. Furthermore, although this disclosure describes and illustrates particular compositions for carrying out particular steps of the method of FIG. 8, this disclosure contemplates any suitable compositions for carrying out any suitable steps of the method of FIG. 8.

In particular embodiments, there is provided a wool product from a ruminant animal, the meat product having (1) a residual iodine level below approximately 50 mg/kg. (2) a residual bromoform level below approximately 0.05 ppm, and (3) the meat product having an improved feed efficiency from approximately 1% to approximately 12%; the meat product being produced by a process comprising the steps of, administering to the ruminant animal, a formulation comprising at least one methanogenesis inhibitor encapsulated in a biologically acceptable carrier; or a feed supplement comprising the formulation, a substrate, and a binder; wherein the formulation or feed supplement decreases methane production and/or increases propionate production in the ruminant animal, thereby improving feed efficiency; and harvesting the wool product from the ruminant animal, wherein the feed efficiency at the time of slaughter is improved from approximately 1% to approximately 12%.

Figure 9:
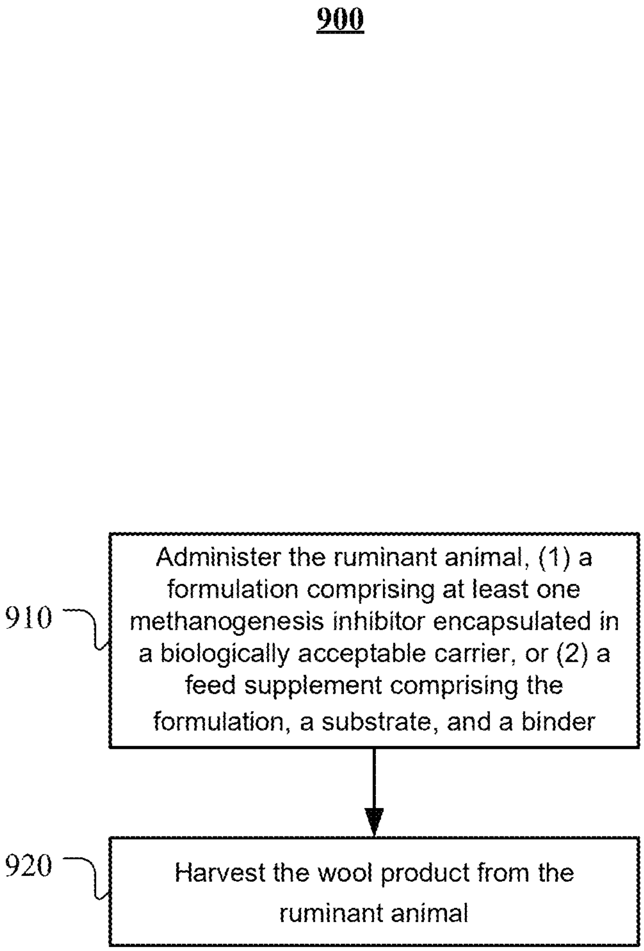
FIG. 9 illustrates a product by process for a wool product from a ruminant animal.

FIG. 9 illustrates a product by process 900 for a wool product from a ruminant animal. The wool product has a residual iodine level below approximately 50 mg/kg, a residual bromoform level below approximately 0.05 ppm, and an improved feed efficiency from approximately 1% to approximately 12% The process may begin at step 910 where the ruminant animal is administered (1) a formulation comprising at least one methanogenesis inhibitor encapsulated in a biologically acceptable carrier, or (2) a feed supplement comprising the formulation, a substrate, and a binder, wherein the formulation or feed supplement decreases methane production and/or increases propionate production in the ruminant animal, thereby improving feed efficiency. In step 920, the wool product is harvested from the ruminant animal, wherein the feed efficiency at the time of slaughter is improved from approximately 1% to approximately 12%. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example of a process for a wool product including the particular steps of the method of FIG. 9, this disclosure contemplates any suitable process for a wool product including any suitable steps, which may include all, some, or none of the steps of the method of FIG. 9, where appropriate. Furthermore, although this disclosure describes and illustrates particular compositions for carrying out particular steps of the method of FIG. 9, this disclosure contemplates any suitable compositions for carrying out any suitable steps of the method of FIG. 9.

In any of these embodiments, the formulation in its various embodiments are described above in Section 2.1. In particular embodiments, the formulation comprises bromoform as the methanogenesis inhibitor and an oil carrier. In particular embodiments, the formulation comprises bromoform as the methanogenesis inhibitor and a microparticle granule carrier. In particular embodiments, the formulation comprises bromoform as the methanogenesis inhibitor and a wax based carrier. In particular embodiments, the formulation comprises bromoform as the methanogenesis inhibitor and a microsphere carrier. Also in this embodiment, routes, and methods for administering the formulation to the ruminant animals are described above in Section 2.3

In any of these embodiments, the feed supplement in its various embodiments are described above in Section 2.2. In particular embodiments, the feed supplement comprises one or more substrates which are described in Section 2.2.1. In particular embodiments, the feed supplement comprises one or more binders which are described in Section 2.2.2. In particular embodiments, the feed supplement comprises one or more additives, and/or flavor masking agents and/or odor masking agents which are described in Section 2.2.3.

4. METHODS OF REDUCING ENTERIC METHANE EMISSIONS

The inhibition of methanogenesis occurs by different modes of action including for example, reducing methanogenic processes, by limiting or stopping enzymes involved in methanogenesis, or by reducing methanogenic organisms by limiting their growth or killing them.

In particular embodiments of the presently disclosed subject matter, there is provided an use of a feed supplement for reducing methane production in a ruminant animal The use comprises administering the feed supplement to the ruminant animal, wherein the feed supplement comprises a formulation comprising at least one methanogenesis inhibitor encapsulated in a biologically acceptable carrier, a substrate, and a binder, wherein use of the feed supplement reduces methane production by the ruminant animal from below approximately 70 L/day to below approximately 2 L/day.

In particular embodiments of the presently disclosed subject matter, there is provided a method of reducing methane production comprising; administering to a ruminant animal a formulation comprising at least one methanogenesis inhibitor encapsulated in a biologically acceptable carrier; or a feed supplement comprising the formulation, a substrate, and a binder.

Figure 10:
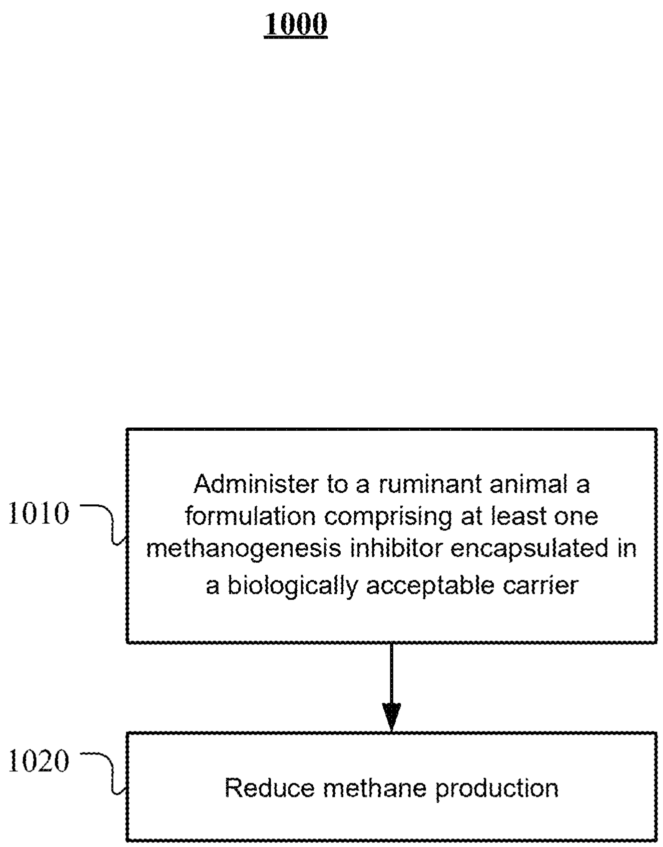
FIG. 10 illustrates an example method for reducing methane production in a ruminant animal.

FIG. 10 illustrates an example method 1000 for reducing methane production in a ruminant animal. The method may begin at step 1010, where the ruminant animal is administered a formulation comprising at least one methanogenesis inhibitor encapsulated in a biologically acceptable carrier. At step 1020, administering the formulation reduces methane production in the ruminant animal. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for reducing methane production in a ruminant animal including the particular steps of the method of FIG. 10, this disclosure contemplates any suitable method for reducing methane production in a ruminant animal including any suitable steps, which may include all, some, or none of the steps of the method of FIG. 10, where appropriate. Furthermore, although this disclosure describes and illustrates particular compositions for carrying out particular steps of the method of FIG. 10, this disclosure contemplates any suitable compositions for carrying out any suitable steps of the method of FIG. 10.

Figure 11:
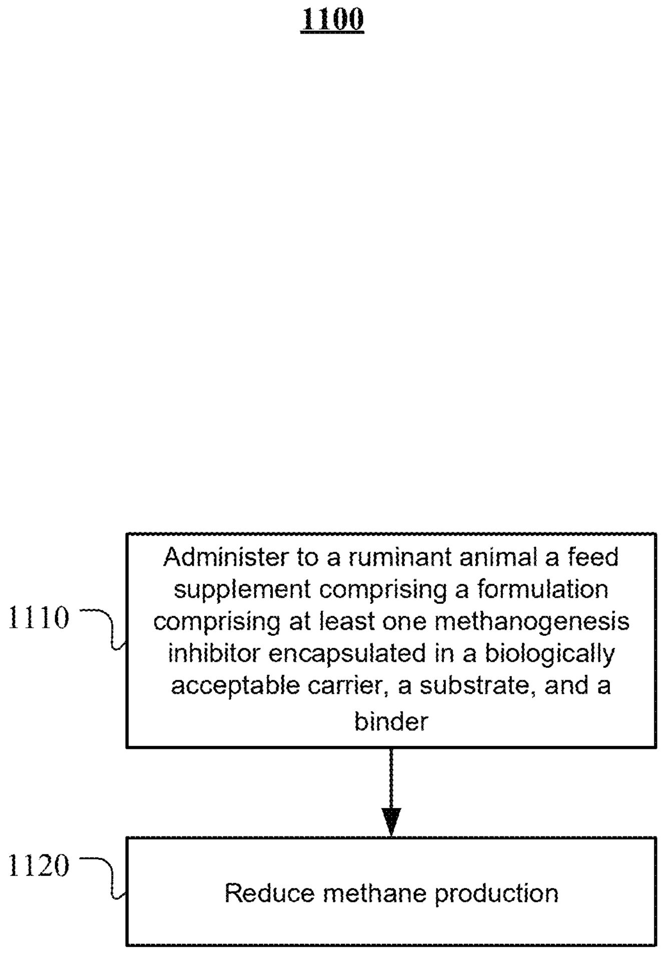
FIG. 11 illustrates another example method for reducing methane production in a ruminant animal.

FIG. 11 illustrates another example method 1100 for reducing methane production in a ruminant animal. The method may begin at step 1110, where the ruminant animal is administered a feed supplement comprising a formulation comprising at least one methanogenesis inhibitor encapsulated in a biologically acceptable carrier. At step 1120, administering the formulation reduces methane production in the ruminant animal. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for reducing methane production in a ruminant animal including the particular steps of the method of FIG. 11, this disclosure contemplates any suitable method for reducing methane production in a ruminant animal including any suitable steps, which may include all, some, or none of the steps of the method of FIG. 11, where appropriate. Furthermore, although this disclosure describes and illustrates particular compositions for carrying out particular steps of the method of FIG. 11, this disclosure contemplates any suitable compositions for carrying out any suitable steps of the method of FIG. 11.

In these embodiment, the feed supplement in its various embodiments are disclosed in Section 2.2. Also, in some embodiments the feed supplement improves efficiency of production of one or more of meat, milk, or wool. Also in some embodiments, the feed supplement improves feed efficiency from approximately 1% to approximately 12%.

In particular embodiments, the feed supplement reduces methane production by the ruminant animal from below approximately 70 L/day to below approximately 35 L/day. In particular embodiments, the feed supplement reduces methane production by the ruminant animal from below approximately 22 L/day to below approximately 5 L/day. In particular embodiments, the feed supplement reduces methane production to below approximately 2.2 L/day of a daily dry matter intake (DMI) by the ruminant animal.

In particular embodiments, the ruminant animal include, but is not limited to cattle, sheep, goat, buffalo, yak, deer, and antelope. In particular embodiments, the ruminant is cattle such as, cattle used for meat production (beef cattle) or cattle used for milk production (dairy cattle). Non-limiting examples of cattle breeds include, Holstein, Holstein Friesian, Jersey, Brangus, Angus, Brahman, Red Angus, Belgian Blue, Highland, Charolais, Belted Galloway, Gelbvich, Dexter, Texas Longhorn, Shorthorn, Droughtmaster, Black Angus, Braford, Montbéliarde, Australian Lowline, Australian Red, Illawarra, Charbray, Belmont Red, Sahiwal, Poll Hereford, Welsh Black Cattle, Red Devon, Red Poll, Salers, Santa Gertrudis, South Devon, Speckle Park, Welsh Black, Aubrac, Blonde D'aquitane, Galloway, Aberdeen, Hereford, Japanese Black, Limousin, Piedmontese, Beef Master, Gelbvich, Simmental, Criollo, Caracue, Canchim, Girolando, Guzera, Indu-Brasil, Brown Swiss, Guernsey, Ayrshire, French Brown, Burlina, Red & White, and Dairy Shorthorn.

In particular embodiments, the formulation in its various embodiments are described above in Section 2.1. In particular embodiments, the formulation comprises bromoform as the methanogenesis inhibitor and an oil carrier. In particular embodiments, the formulation comprises bromoform as the methanogenesis inhibitor and a microparticle granule carrier. In particular embodiments, the formulation comprises bromoform as the methanogenesis inhibitor and a wax based carrier. In particular embodiments, the formulation comprises bromoform as the methanogenesis inhibitor and a microsphere carrier.

In particular embodiments, the feed supplement in its various embodiments are described above in Section 2.2. In particular embodiments, the feed supplement comprises one or more substrates which are described in Section 2.2.1. In particular embodiments, the feed supplement comprises one or more binders which are described in Section 2.2.2. In particular embodiments, the feed supplement comprises one or more additives, and/or flavor masking agents and/or odor masking agents which are described in Section 2.2.3.

In particular embodiments, the substrate in the feed supplement is an algae. In particular embodiments the algae is not a source of the methanogenesis inhibitor. In particular embodiments, the binder in the feed supplement is molasses. In particular embodiments, the additive in the feed supplement is one or more of essential oils, antibiotics, ionophores, saponins, tannins, terpenes, 3-Nitrooxypropanol, propylene glycol, fumaric acid, green tea extract, grape pomace, Mootral™. Agolin™, Biochar, dried yeast, probiotic (direct feed microbials), fiber, or prebiotic. In particular embodiments, the flavor masking agent in the feed supplement is one or more of molasses, distiller's grain, rolled oats, or oregano. In particular embodiments, the odor masking agent in the feed supplement is one or more of molasses, distiller's grain, rolled oats, or oregano.

In particular embodiments, the methanogenesis inhibitor is bromoform and the substrate in the feed supplement is an algae. In particular embodiments, the methanogenesis inhibitor is bromoform and the algae is not a source of the bromoform. In particular embodiments, the methanogenesis inhibitor is bromoform and the binder in the feed supplement is molasses. In particular embodiments, the methanogenesis inhibitor is bromoform and the additive in the feed supplement is one or more of essential oils, antibiotics, ionophores, saponins, tannins, terpenes, 3-Nitrooxypropanol, propylene glycol, fumaric acid, green tea extract, grape pomace, Mootral™, Agolin™, Biochar, dried yeast, probiotic (direct feed microbials), fiber, or prebiotic. In particular embodiments, the methanogenesis inhibitor is bromoform and the flavor masking agent in the feed supplement is one or more of molasses, distiller's grain, rolled oats, or oregano. In particular embodiments, the methanogenesis inhibitor is bromoform and the odor masking agent in the feed supplement is one or more of molasses, distiller's grain, rolled oats, or oregano. In particular embodiments, the methanogenesis inhibitor is bromoform, the substrate is an algae not producing the bromoform, and the binder is molasses. In particular embodiments, the methanogenesis inhibitor is bromoform and inclusion of one or more of molasses, yeast, inulin or fumaric acid complements the effect of bromoform in reducing methane.

In particular embodiments, the formulation is administered via oral route. In particular embodiments, oral administration of the formulation is achieved by mixing the formulation with a feed supplement that is added to the diet of the animals. In particular embodiments, the formulation is administered as a pill or capsule delivered using a bolus gun or a Dosatron®. In particular embodiments, oral administration of the formulation in a liquid form is achieved by 'drenching' where small volumes of liquid are administered into the back of the mouth with a 'drenching gun'.

In particular embodiments, the formulation is administered via parenteral route. Non-limiting examples of parenteral administration include intravenous, intramuscular, subcutaneous, intraperitoneal, intramammary, and topical routes.

In particular embodiments, parenteral administration is as an implant. Non-limiting of such implants include compressed tablets and dispersed matrix systems in which the formulation and/or feed supplement is uniformly dispersed within a polymer.

4.1. Methods for Assessing Efficacy of Enteric Methane Reductions.

4.1.1. In Vitro Assay

In particular embodiments of the presently disclosed subject matter, there is provided an in vitro method of assessing an efficacy of a formulation or a feed supplement in reducing methane production. The method comprises; obtaining a ruminal fluid sample from a ruminant animal; incubating in a vessel, the ruminal fluid sample with a formulation comprising at least one methanogenesis inhibitor encapsulated in a biologically acceptable carrier, or a feed supplement comprising the formulation, a substrate, and a binder; obtaining a gas sample from the vessel; assessing an amount of methane in the gas sample; repeating the obtaining and assessing steps at a plurality of time intervals; and calculating a rate of methane produced in the vessel; wherein a decrease in the rate of methane produced from approximately 10% to approximately 99% indicates efficacy of the formulation or the feed supplement in reducing methane production.

FIG. 12 illustrates an example method 1200 for an in vitro method of assessing an efficacy of a formulation or a feed supplement in reducing methane production. The method may begin at step 1210, where a ruminal fluid sample is obtained from a ruminant animal. At step 1220, the ruminal fluid sample is incubated with, (1) a formulation comprising at least one methanogenesis inhibitor encapsulated in a biologically acceptable carrier, or (2) a feed supplement comprising the formulation, a substrate, and a binder. At step 1230, a gas sample is obtained from the vessel. At step 1240, an amount of methane in the gas sample is assessed. At step 1250, steps 1230 and 1240 at a plurality of time intervals. At step 1260, a rate of methane produced is calculated. In particular embodiments, the method further comprises determining the efficacy of the formulation or the feed supplement in improving feed efficiency, wherein at step 1270, a test ruminal fluid sample is obtained at a plurality of intervals. At step 1280, an amount of one or more fatty acids in the test ruminal fluid sample is measured, and the efficacy of the formulation or the feed supplement in improving feed efficiency is determined. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for an in vitro method of assessing an efficacy of a formulation or a feed supplement in reducing methane production including the particular steps of the method of FIG. 12, this disclosure contemplates any suitable method for an in vitro method of assessing an efficacy of a formulation or a feed supplement in reducing methane production including any suitable steps, which may include all, some, or none of the steps of the method of FIG. 12, where appropriate. Furthermore, although this disclosure describes and illustrates particular compositions for carrying out particular steps of the method of FIG. 12, this disclosure contemplates any suitable compositions for carrying out any suitable steps of the method of FIG. 12.

In particular embodiments, the ruminal fluid is obtained from a ruminally cannulated animal.

In particular embodiments, the ruminal fluid is mixed with either the formulation in its various embodiments as described in Section 2.1, or the feed supplement in its various embodiments as described in Section 2.2. In particular embodiments, the vessel is a fermentation vessel. In particular embodiments, the vessel is fitted with automatic pressure transducers and one or more gas sampling ports.

In particular embodiments, gas production is monitored at approximately 1-minute intervals, approximately 2-minute intervals, approximately 5-minute intervals, approximately 10-minute intervals, approximately 15-minute intervals, approximately 30-minute intervals, or approximately 60-minute intervals.

In particular embodiments, gas production is monitored for a period from approximately 10 h to approximately 72 h. In particular embodiments, gas production is monitored for a period from approximately 10 h to approximately 20 h. In particular embodiments, gas production is monitored for a period from approximately 20 h to approximately 30 h. In particular embodiments, gas production is monitored for a period from approximately 30 h to approximately 40 h. In particular embodiments, gas production is monitored for a period from approximately 40 h to approximately 50 h. In particular embodiments, gas production is monitored at 5-minute intervals for a 48 hour period.

In particular embodiments, assessing the amount of methane in the gas sample is performed using any method suitable for measurement of methane in a gas sample. Non-limiting examples of such methods include one or more of Gas Chromatography-Mass Spectrometry (GC-MS), Fourier Transform Infrared Spectroscopy (FTIR), or by using an MQ-4 methane sensor.

In particular embodiments, the rate of gas production in response to feed degradation in the ruminal fluid is determined using the one-pool exponential model represented by Equation I.

$$P=b(1-e^{-k(t-L)}) \quad (I)$$

where P is the cumulative pressure (psi), b is the maximum pressure (psi), k is the rate of pressure (h−1), t is the time (hours), and L (hours) is a discrete time lag prior to the start of fermentation (h). Gas production data are fitted to the above nonlinear model using GraphPad Prism 6 (GraphPad Software, Inc., La Jolla, CA, USA). In this model, it is assumed that no pressure is produced until the discrete time lag has elapsed. Gas production is then calculated from the vessel pressure corrected from current atmospheric pressure into standard atmospheric pressure (101.325 kPa). This approach yielded total gas production and methane production values.

In particular embodiments, the feed supplement comprised bromoform as the methanogenesis inhibitor, and the substrate was 80% corn substrate or 20% corn substrate, wherein total methane produced was approximately 24% lower with the 20% corn substrate compared to the 80% corn substrate.

In particular embodiments, the feed supplement comprised bromoform as the methanogenesis inhibitor, and the substrate comprised a corn substrate or, a corn substrate with a kelp extract (KE), and inclusion of the KE decreased total methane produced by better than in feed supplements without the KE.

In particular embodiments, the feed supplement comprised bromoform as the methanogenesis inhibitor, and inclusion of kelp extract (KE) in the feed supplement reduced methane production from approximately 25% to approximately 55%.

In particular embodiments, the method further comprises obtaining a test ruminal fluid sample at a plurality of intervals; measuring a concentration of one or more fatty acids in the test ruminal fluid sample; and determining the efficacy of the formulation or the feed supplement in improving feed efficiency.

In particular embodiments, the one or more fatty acids are volatile fatty acids (VFA).

In particular embodiments, the method comprises measuring the fatty acid content in a ruminal fluid sample at the testing interval.

In particular embodiments, determining the efficacy comprises calculating a rate of acetate produced and a rate of propionate produced in the ruminal sample, wherein a decrease in the rate of acetate produced and an increase in the rate of propionate produced indicates efficacy of the formulation or the feed supplement in improving feed efficiency.

In particular embodiments, determining the efficacy comprises calculating a ratio of acetate to propionate, wherein a decrease in the ratio of acetate:propionate indicates efficacy of the formulation or the feed supplement in improving feed efficiency.

In particular embodiments, the feed supplement comprised bromoform as the methanogenesis inhibitor, and the levels of propionate and butyrate in the ruminal fluid were higher when a kelp extract (KE) is included in the feed supplement.

In particular embodiments, the feed supplement comprised bromoform as the methanogenesis inhibitor, and the acetate:propionate ratio decreased when a kelp extract (KE) is included in the feed supplement.

In addition to the reduction in methane there was an increase in the proportion of propionate (acetate:propionate ratio from 2.6 to 1.5.) by inclusion of KE.

In particular embodiments, the methanogenesis inhibitor is bromoform and inclusion of one or more of molasses, yeast, inulin or fumaric acid complements the effect of bromoform in reducing acetate:propionate ratios (that is, increase in propionate).

4.1.2. In Vivo Assay

In particular embodiments, a method includes assessing efficacy of a feed supplement in reducing methane production in ruminant animals. The method comprises providing an amount of a test feed supplement to a first cohort of ruminant animals; obtaining a test sample of gases from the ruminant animals; assessing an amount of methane in the gases in the test sample; and comparing the amount of methane present in the test sample with a control value; wherein an amount of methane in the test sample compared with the control value provides assessment of an efficacy of the amount of test feed supplement in reducing methane production.

In particular embodiments, the feed supplement in its various embodiments are as described in Section 2.2.

In particular embodiments, the feed supplement is administered to the ruminant animal once daily, twice daily, or thrice daily. As an example and not by way of limitation, the feed supplement is administered to the ruminant animal daily, once a week, or twice a week.

In particular embodiments, the feed supplement is mixed with a ruminant feed that is provided to the ruminant animal. As an example and not by way of limitation, the ruminant feed-feed supplement mixture are provided to the animal ad libitum.

In particular embodiments, a lower amount of methane in the test sample compared with the control value indicates that the test feed supplement is efficient in reducing methane production.

In particular embodiments, the test feed supplement comprises bromoform, and the amount of methane in the test sample is from approximately 30% lower to approximately 99% lower compared to the control value.

In particular embodiments, the test feed supplement comprises bromoform, and the amount of methane in the test sample is from approximately 10% lower to approximately 60% lower compared to the control value.

In particular embodiments, the test feed supplement comprises bromoform, and the amount of methane in the test sample is from approximately 25% lower to approximately 99% lower compared to the control value. An equal or higher amount of methane in the test sample compared with the control value indicates a need for increasing the amount of the test feed supplement to the animals and repeating the obtaining, the assessing, and the comparing steps. Furthermore, the method may comprise providing the amount of a control feed supplement to a second cohort of ruminant animals; obtaining a control sample of gases from the second cohort of ruminant animals; and assessing an amount of methane in the present in the control sample; wherein an amount of methane in the control sample provides the control value. Furthermore, the method may comprise obtaining a test biological sample from each of the first cohort of ruminant animals, measuring the concentrations of fatty acids in the test biological sample and calculating a ratio of acetate to propionate in the test biological sample, wherein a lower acetate to propionate ratio in the test biological sample compared to a control value indicates an improved feed efficiency.

In particular embodiments, the method comprises obtaining a control biological sample from each of a second cohort of ruminant animals, measuring the concentrations of fatty acids in the control biological sample and calculating a ratio of acetate to propionate in the control biological sample, wherein a ratio of acetate to propionate in the control biological sample provides the control value. The fatty acid may be a volatile fatty acid (VFA). The test biological sample and the control biological sample are blood or a ruminal fluid sample.

FIG. 13 illustrates an example method 1300 of assessing efficacy of a feed supplement in reducing methane production in ruminant animals. The method may begin at step 1313, where a first cohort of ruminant animals are provided with an amount of a test feed supplement. At step 1320, a test sample of gases is obtained from the ruminant animals. At step 1330, an amount of methane in the gases in the test sample is assessed. At step 1340, the amount of methane present in the test sample is compared with a control value to provide assessment of efficacy of the amount of test feed supplement in reducing methane production. In particular embodiments the method further comprises assessment of improved feed efficiency, wherein at step 1350, a test biological sample is obtained from each of the first cohort of ruminant animals. At step 1360, concentrations of free fatty acids are measured in the test biological sample. At step 1370, a ratio of acetate to propionate is calculated, wherein a lower acetate to propionate ratio in the test biological sample compared to a control value indicates an improved feed efficiency. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method of assessing efficacy of a feed supplement in reducing methane production in ruminant animals. including the particular steps of the method of FIG. 13, this disclosure contemplates any suitable method of assessing efficacy of a feed supplement in reducing methane production in ruminant animals. including any suitable steps, which may include all, some, or none of the steps of the method of FIG. 13, where appropriate. Furthermore, although this disclosure describes and illustrates particular compositions for carrying out particular steps of the method of FIG. 13, this disclosure contemplates any suitable compositions for carrying out any suitable steps of the method of FIG. 13.

Figure 14:
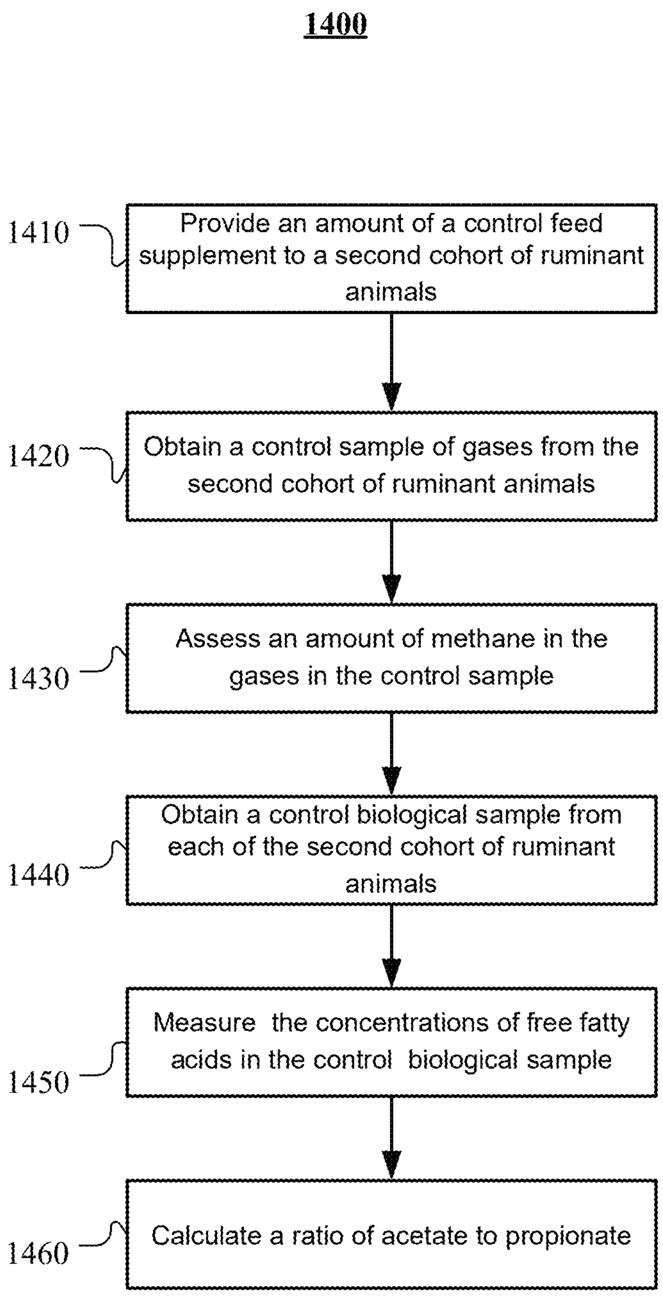
FIG. 14 illustrates an example method of obtaining a control value for the amount of methane produced in ruminant animals not feed the feed supplement of the presently disclosed subject matter.

FIG. 14 illustrates an example method 1400 of obtaining a control value for the amount of methane produced in ruminant animals not feed the feed supplement of the presently disclosed subject matter. The method may begin at step 1410, where a second cohort of ruminant animals are provided with an amount of a control feed supplement. At step 1420, a control sample of gases is obtained from the second cohort of ruminant animals. At step 1430, an amount of methane in the gases in the control sample is assessed, where the amount of methane in the control sample provides the control value. In particular embodiments the method further comprises obtaining a control value for a ratio or acetate to propionate in ruminant animals not feed the feed supplement of the presently disclosed subject matter, wherein at step 1440, a control biological sample is obtained from each of the second cohort of ruminant animals. At step 1450, concentrations of free fatty acids are measured in the control biological sample. At step 1460, a ratio of acetate to propionate is calculated, wherein a ratio of acetate to propionate in the control biological sample provides the control value. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method of obtaining a control value for the amount of methane produced in ruminant animals including the particular steps of the method of FIG. 14, this disclosure contemplates any suitable method of obtaining a control value for the amount of methane produced in ruminant animals including any suitable steps, which may include all, some, or none of the steps of the method of FIG. 14, where appropriate. Furthermore, although this disclosure describes and illustrates particular compositions for carrying out particular steps of the method of FIG. 14, this disclosure contemplates any suitable compositions for carrying out any suitable steps of the method of FIG. 14.

In particular embodiments, the ruminant animals consuming the feed supplemented diet disclosed herein have an acetate to propionate ratio in their rumen at approximately 1%, 2%, 3%, 4%, 5%, 6%, 7%, 8%, 9%, 10% or 11% lower than ruminant animals fed a control diet without the feed supplement.

In particular embodiments, the ruminant animals consuming the feed supplemented diet disclosed herein have an acetate to propionate ratio in their rumen at approximately 12%, 13%, 14%, 15%, 16%, 17%, 18%, 19%, 20% or 21% lower than ruminant animals fed a control diet without the feed supplement.

In particular embodiments, the ruminant animals consuming the feed supplemented diet disclosed herein have an acetate to propionate ratio in their rumen at approximately 110% to 20%, 21% to 30%, 31% 40%, 41% to 50%, 51% to 60%, 61% to 70%, 71% to 80%, 81% to 90%, 91% to 99% or 100% lower than ruminant animals fed a control diet without the feed supplement.

4.2. Methane Reductions

In particular embodiments, the feed supplement comprised bromoform as the methanogenesis inhibitor, and the substrate was 80% corn substrate or 20% corn substrate, wherein total methane produced was approximately 24% lower with the 20% corn substrate compared to the 80% corn substrate.

In particular embodiments, the feed supplement comprised bromoform as the methanogenesis inhibitor, and the substrate comprised a corn substrate or a corn substrate with a kelp extract (KE), wherein inclusion of the KE decreased total methane produced better than in feed supplements without the KE.

In particular embodiments, the ruminant animals are Holstein steers, the feed supplement comprised bromoform as the methanogenesis inhibitor, and the substrate comprised a kelp substrate, wherein inclusion of the kelp substrate decreased total methane produced by approximately 97% to approximately 50% w/w compared to ruminant animals not administered the formulation or the feed supplement (control ruminant animals). in some embodiments, the ruminant animals are Holstein steers, the feed supplement comprised bromoform as the methanogenesis inhibitor, and the substrate comprised a kelp substrate, wherein inclusion of the kelp substrate decreased total methane produced by approximately 97% to approximately 80% w/w compared to control ruminant animals. In particular embodiments, the ruminant animals are Holstein steers, the feed supplement comprised bromoform as the methanogenesis inhibitor, and the substrate comprised a kelp substrate, wherein inclusion of the kelp substrate decreased total methane produced by approximately 80% to approximately 75% w/w compared to control ruminant animals. In particular embodiments, the ruminant animals are Holstein steers, the feed supplement comprised bromoform as the methanogenesis inhibitor, and the substrate comprised a kelp substrate, wherein inclusion of the kelp substrate decreased total methane produced by approximately 75% to approximately 60% w/w compared to control ruminant animals. In particular embodiments, the ruminant animals are Holstein steers, the feed supplement comprised bromoform as the methanogenesis inhibitor, and the substrate comprised a kelp substrate, wherein inclusion of the kelp substrate decreased total methane produced by approximately 60% to approximately 50% w/w compared to control ruminant animals.

In particular embodiments, the ruminant animals are Holstein steers, the feed supplement comprised bromoform as the methanogenesis inhibitor, and the substrate comprised a kelp substrate, wherein inclusion of the kelp substrate decreased total methane produced by at least 97% w/w compared to control ruminant animals. In particular embodiments, the ruminant animals are Holstein steers, the feed supplement comprised bromoform as the methanogenesis inhibitor, and the substrate comprised a kelp substrate, wherein inclusion of the kelp substrate decreased total methane produced by at least 90% w/w compared to control ruminant animals. In particular embodiments, the ruminant animals are Holstein steers, the feed supplement comprised bromoform as the methanogenesis inhibitor, and the substrate comprised a kelp substrate, wherein inclusion of the kelp substrate decreased total methane produced by at least 85% w/w. In particular embodiments, the ruminant animals are Holstein steers, the feed supplement comprised bromoform as the methanogenesis inhibitor, and the substrate comprised a kelp substrate, wherein inclusion of the kelp substrate decreased total methane produced by at least 80% w/w compared to control ruminant animals.

In particular embodiments, the ruminant animals are non-lactating cows, the feed supplement comprised bromoform as the methanogenesis inhibitor, and a kelp supplement, wherein inclusion of the kelp substrate decreased total methane produced by at least 35% w/w compared to control ruminant animals. As an example, and not by way of limitation, inclusion of the kelp substrate decreased total methane produced by at least 60% w/w compared to control ruminant animals. As another example and not by way of limitation, inclusion of the kelp substrate decreased total methane produced by at least 20% w/w compared to control ruminant animals. As yet another example and not by way of limitation, inclusion of the kelp substrate decreased total methane produced by at least 30% w/w compared to control ruminant animals.

In particular embodiments, the ruminant animals are growing steers, the feed supplement is a spray dried powder comprising bromoform as the methanogenesis inhibitor, dextrin, soybean oil, and *Ascophyllum nodosum* kelp, wherein providing the growing steers a low inclusion diet (0.5% DM) decreased total methane produced by at least 50% w/w compared to control ruminant animals.

In particular embodiments, the ruminant animals are dairy cows, the feed supplement decreased total methane produced from approximately 60% to approximately 10%. As an example and not by way of limitation, the feed supplement is a spray dried powder comprising bromoform as the methanogenesis inhibitor, dextrin, soybean oil and kelp, wherein providing the dairy cows a high inclusion diet (1% DM) reduced methane produced from approximately 30% to approximately 10%.

In particular embodiments, the ruminant animals are growing steers, the feed supplement is a spray dried powder comprising bromoform as the methanogenesis inhibitor, dextrin, soybean oil and kelp, wherein providing the growing steers a high inclusion diet (1% DM) showed no detectable methane being released.

In particular embodiments, ruminant animals fed a diet comprising the feed supplement exhaled less methane than ruminant animals fed a diet without the feed supplement (control diet). In particular embodiments, ruminant animals fed diet comprising the feed supplement provided in the present disclosure exhaled approximately 10%, 20%, 30%, 40%, 50%, 60%, 70%, 80%, 90%, 100% or lower methane than ruminant animals fed a diet without the feed supplement (control diet). In particular embodiments, ruminant animals fed diet comprising the feed supplement provided in the present disclosure when compared to ruminant animals fed the control diet showed reductions from approximately 10% to approximately 20%, approximately 20% to approximately 30%, approximately 30% to approximately 40%, approximately 40% to approximately 50%, approximately 50% to approximately 60%, approximately 60% to approximately 70%, approximately 70% to approximately 80%, approximately 80% to approximately 90%, approximately 90% to approximately 99% or approximately 100%.

In particular embodiments, ruminant animals fed diet comprising the feed supplement provided in the present disclosure exhaled approximately 75%, approximately 80%, approximately 85%, approximately 90%, approximately 91%, approximately 92%, approximately 93%, approximately 94%, approximately 95%, approximately 96%, approximately 97%, approximately 98%, or approximately 99% of carbon dioxide than ruminant animals fed the control diet.

5. EXAMPLES

5.1. Example 1. Formulation 1: Microspheres

This study shows an exemplary method for preparing microsphere-encapsulated bromoform.

5.1.1. Preparation of Formulation 1-Ionic Gelation of Bromoform Solution

An aqueous sodium alginate (Modernist Pantry) solution (1.0% w/v) was prepared by stirring at 35° C. overnight. A 0.1M-1M solution of bromoform (Millipore Sigma) in vegetable oil (Crisco) was prepared and added to the sodium alginate solution (1-10% v/v). The resulting solution was emulsified using a SciLogex D500 homogenizer for 5 minutes at 11,000 rpm. The emulsion was added dropwise to an aqueous calcium chloride (Millipore Sigma) solution (10% w/v) through a 0.5 mm diameter syringe needle (forward). The resulting gelling solution comprising the alginate microspheres was stirred at room temperature for ten minutes, filtered out of the solution and rinsed twice with deionized water. The microspheres were then dried for 1 hour at 95° F. in a dehydrator to produce microsphere-encapsulated bromoform.

5.1.2. Stability Studies

An aliquot of microsphere-encapsulated bromoform (test sample) stored in open air or in a 95° F. dehydrator was weighed and placed in a sample tube. A 10 μg/mL internal standard solution of naphthalene in methanol was added to the sample tube at a ratio of 30 μL per mg of the test sample. The alginate spheres were pierced with a metal spatula twenty times to aid in homogenization. The contents of the sample tube were sonicated in a water bath for 3 minutes. The liquid was removed from the sample tube and passed through a 0.2 μM nylon filter into a glass GC-MS vial. Bromoform content was determined by Gas Chromatography/Mass Spectrometry (GC-MS).

5.1.3. GC-MS Protocol

Method 1. An Agilent 7890c gas chromatograph equipped with a Zebron ZB-wax capillary column (30 m×0.25 m×0.25 μm) was used. Pulsed injections with 1 μL, 35 psi in spitless mode with an injection port temperature of 250° C. The GC-MS interface (300° C.) were used with the oven conditions 40° C. for 1 min, ramping at 16° C./min to 250° C. and holding for two minutes with a carrier gas of Helium (2 mL/min). Sample amounts were calculated according to the ratio of peak areas of target over the ratio of the internal standard with reference to standard curves.

Method 2. A Hewlett Packard (HP) 5890 series II gas chromatograph with a polyethylene glycol-coated phase on a polyimide-coated fused silica capillary column (Sol-gel wax, 30 m, 0.25 mm) was used. Injections were 2 μL and performed in the splitless mode (1.5 min) with an inlet pressure of 8 psi. The inlet liner (4 mm, 78.5×6.3 mm) was replaced after 50 samples. The injection port was held at 250° C. and the GC-MS interface at 300° C. The GC was held at 40° C. for 1 min, ramped at 16° C./min to 250° C., then held at this temperature for 2 min. Helium was used as the carrier gas. Mass spectrometry was performed on a HP 5972 Mass Selective Detector (MSD). Ion fragments to be expected include (CHBr2Cl) (molecular ion m/e 208 and M+−129); bromoform (CHBr3) (molecular ion cluster at m/e 250, 252, 254, 256 [1:2:2:1] and M+−173); bromochloroacetic acid (methyl ester) (molecular ion m/e 188 and M+/−129); dibromoacetic acid (DBA) (methyl ester) (molecular ion cluster m/e 230, 232, 234 [1:2:1] and M+/−173); 3,3 dibromoacrylic acid (methyl ester) (molecular ion cluster m/e 242, 244, 246 [1:2:1] and M+/−213.

5.1.4. Results

Table 2 shows exemplary data for changes in bromoform concentrations at 0 h, 1 h, 2 h and 4.5 h for microsphere-encapsulated bromoform stored in open air. Similar results were obtained for the microspheres stored in the 95° F. dehydrator.

5.1.5. Conclusions

Bromoform encapsulated in microspheres using the ionic gelation method are protected from degradation for at least 4 hours in both open air and 95° F. environments.

TABLE 2

Change in CHBr3 concentration over time

| Sample conditions | Time elapsed (h) | Concentration (% w/w) |
|---|---|---|
| Open air | 0 | 1.8375 |
| Open air | 1 | 2.259 |
| Open air | 2 | 3.525 |
| Open air | 4.5 | 1.005 |

5.2. Example 2. Formulation 2: Spray Dried Powder on Kelp Substrate

This study shows an exemplary method for a spray dried powder comprising bromoform on a kelp substrate.

5.2.1. Preparation of Formulation 2—Spray Dried Bromoform Powder

An aqueous solution of yellow dextrin (PyroBuild) in water (33% w/w) was obtained by stirring and heating until the dextrin fully dissolved. A solution of bromoform (Millipore Sigma) in vegetable oil (Crisco) (32% w/w) was emulsified with the dextrin solution for five minutes at 11,000 rpm using a SciLogex D500 homogenizer. The resulting emulsified product was spray dried under the following conditions-inlet temperature, 175° C.; outlet temperature, 90° C., aspiration at 95%, feed pump rate of 95 mL/min, and air flow rate of 40 mm to produce a spray dried bromoform powder. The spray dried powder was further processed as follows:

(i) Formulation 2a: Used directly as feed supplement without kelp matrix.
(ii) Formulation 2b: Added directly to a kelp substrate (1:5 w/w).
(iii) Formulation 2c: Added directly to the kelp substrate (1:5 w/w), followed by spraying vegetable oil (Crisco) at 63 g of vegetable oil per kilogram of dry kelp.
(iv) Formulation 2d: Added directly to the kelp substrate (1:5 w/w), followed by top spraying with molasses at 63 g of molasses per kg of dry kelp.

5.2.2. Stability Studies

An aliquot of the spray dried powder (test sample) stored at room temperature in open air was weighed and placed in a sample tube. The sample tube was shaken rigorously with the addition of deionized water (1 mL), heated at 42° C. for three minutes. A 10 μg/mL internal standard solution of naphthalene in methanol was added to the sample tube at a ratio of 30 μL per mg of the test sample. The contents of the sample tube were sonicated in a water bath for 3 minutes. The liquid was removed from the sample tube, dried with anhydrous sodium sulfate, and passed through a 0.2 μM nylon filter into a glass GC-MS vial. Bromoform content was determined using an Agilent 7890c gas chromatograph as described above in Example 1.

5.2.3. Results

Table 3 shows the results for changes in bromoform concentrations at the indicated times for the various Formulation 2 derivatives stored in open air.

TABLE 3

Change in CHBr3 concentration over time

| Formulation | Time elapsed (h) | Concentration (% w/w) |
|---|---|---|
| Formulation 2a | 0 | 0.12 |
| | 24 | 0.13 |

TABLE 3-continued

| Change in CHBr3 concentration over time | | |
|---|---|---|
| Formulation | Time elapsed (h) | Concentration (% w/w) |
| Formulation 2b | 0 | 0.38 |
| | 20 | 0.41 |
| Formulation 2c | 0 | 0.42 |
| | 20 | 0.35 |
| Formulation 2d | 0 | 0.16 |
| | 20 | 0.25 |

5.2.4. Conclusions

Bromoform formulated as a spray dried powder is protected from degradation for at least 20 hours in an open air environment.

5.3. Example 3. Formulation 3: Excipient Binding

This study shows an exemplary method for binding bromoform to an excipient.

5.3.1. Preparation of Formulation 3—Bromoform-Excipient Mixtures

An oil and bromoform mixture (35% w/w) was mixed with tapioca maltodextrin excipient powder (Modernist Pantry) in a 1:3 ratio w/w. The mixture was combined using a handheld mixer until a free-flowing powder bromoform-excipient mixture was obtained. The oil-loaded excipient was then (i) Formulation 3a: Used directly as feed supplement without kelp matrix.

(ii) Formulation 3b: Formulation 3b: The bromoform-excipient mixture was added to a kelp substrate (1:5 ratio w/w), followed by spraying vegetable oil (Crisco) at 63 g of vegetable oil per kilogram of dry kelp, mixing using a handheld mixer and vacuum sealed.

(iii) Formulation 3c: The bromoform-excipient mixture was added to a kelp substrate (1:5 ratio w/w), distributed on a tray, top sprayed with 63 g of molasses (Golden Barrel) per kg of dry kelp and mixed using a handheld mixer until evenly coated and vacuum-sealed.

5.3.2. Stability Studies

An aliquot of Formulation 3a, 2b or 3c (test sample) was weighed and placed in a sample tube. The sample tube was shaken rigorously with the addition of deionized water (1 mL), heated at 42° C. for three minutes. A 10 μg/mL internal standard solution of naphthalene in methanol was added to the sample tube at a ratio of 30 μL per mg of the test sample. The contents of the sample tube were sonicated in a water bath for 5 minutes. The liquid was removed from the sample tube, dried with anhydrous sodium sulfate, and passed through a 0.2 μM nylon filter into a glass GC-MS vial. Bromoform content was determined using an Agilent 7890c gas chromatograph as described above in Example 1.

5.3.3. Results

Table 4 shows the results for changes in bromoform concentrations at the indicated times for the various Formulation 3 derivatives.

TABLE 4

| Change in CHBr3 concentration over time | | |
|---|---|---|
| Formulation | Time elapsed (h) | Concentration (% w/w) |
| Formulation 3b | 0 | 0.882 |
| | 16 | 0.333 |
| Formulation 3c | 0 | 0.294 |
| | 16 | 0.294 |

5.3.4. Conclusions

Bromoform is stabilized by the use of a maltodextrin-derived excipient binding agent over the course of 16 hours. The use of molasses (Formulation 3c) further improves bromoform stabilization compared to Formulation 3b.

Among the two groups tested, Formulation 3c shows significant stability suggesting a beneficial effect of adding molasses to the bromoform/excipient/kelp substrate mixture.

5.4. Example 4. Optimization of Oil Phase for Spray Dried Formulation

This study shows optimization studies for spray dried formulations.

5.4.1. Solubility of Bromoform in Different Oil Phases

Table 5 summarizes solubility data for bromoform in various solvents. Based on these results, oleic acid and MIGLYOL® 812 N were selected as oil solvent, Kolliphor® ELP, Kolliphor® RH40 and Transcutol® HP were selected as potential emulsifiers, and propylene glycol was selected as a co-emulsifier for further experiments as described below.

TABLE 5

| Bromoform solubility in solvents | | | | | | |
|---|---|---|---|---|---|---|
| # | $CHBr_3$ (mg) | Solvents | Volume/mL | Separated layer (Y/N) | Solubility (mg/mL) | Appearance |
| 1 | 55.00 | Soybean oil | 0.2 | N | >275 | light yellow |
| 2 | 64.93 | Corn Oil | 0.2 | N | >324.65 | yellow |
| 3 | 68.01 | Oleic acid | 0.2 | N | >340.05 | clear |
| 4 | 63.40 | MIGLYOL ® 812 N | 0.2 | N | >317 | clear |
| 5 | 70.36 | Anhydrous Ethanol | 0.2 | N | >351.8 | yellow |
| 6 | 79.20 | Transcutol ® HP | 0.2 | N | >396 | light yellow |
| 7 | 61.25 | Propylene Glycol | 0.2 | N | >306.25 | clear |
| 8 | 77.03 | Kolliphor ® ELP | 0.4 | N | >192.575 | clear |
| 9 | 67.68 | PEG300 | 0.2 | N | >338.4 | light yellow |
| 10 | 70.61 | Kolliphor ® RH 40 | 0.2 | N | >353.05 | clear |

5.4.2. Preparation of Water Phase

Maltodextrin (100 g) was dissolved in water (400 mL) by ultrasonication to obtain a 20% maltodextrin aqueous solution.

5.4.3. Preparation of Oil Phase and Mix with Water Phase

Oil, emulsifier, and co-emulsifier were weighed according to the formulation shown in Table 6 below to obtain Mixtures 1 to 7 and the mixture vortexed to mix well. To 0.2 mL of each mixture was added 2 mL of 20% maltodextrin solution, vortexed and mixed well. The sample solution was irradiated vertically with an infrared thermometer to observe light penetration. Among the 7 mixture, Mixture 6 demonstrated the best light penetration performance. Further, Mixture 6 was clearer than the other mixtures and therefore was selected as the oil phase solution.

TABLE 6

Mixtures of oil, emulsifier, and co-emulsifier

| Mixture # | Ingredients: Oil | Co-Emulsifier | Emulsifier | | Ratio (w/w) | Appearance (oil + water) |
|---|---|---|---|---|---|---|
| 1 | MIGLYOL ® 812 N | Propylene Glycol | RH40 | Transcutol ® HP | 30:50:10:10 | Milky white, opaque |
| 2 | MIGLYOL ® 812 N | Propylene Glycol | RH40 | — | 30:50:20 | |
| 3 | MIGLYOL ® 812 N | Propylene Glycol | RH40 | ELP | 30:50:10:10 | |
| 4 | Oleic acid | Propylene Glycol | RH40 | ELP | 30:50:10:10 | White-like, opaque |
| 5 | Oleic acid | Propylene Glycol | RH40 | Transcutol ® HP | 30:50:10:10 | |
| 6 | Oleic acid | Propylene Glycol | RH40 | Transcutol ® HP | 20:45:15:20 | White, clear |
| 7 | Oleic acid | Propylene Glycol | RH40 | Transcutol ® HP | 20:40:15:25 | White-like, opaque |

5.4.4. Determination of Bromoform Concentration

An oil phase solution was prepared in the following ratio. Oleic acid:Propylene glycol:Kolliphor® RH40 (RH40): Transcutol® HP=20:45:15:20. Different amounts of bromoform were added to the oil phase (Table 7).

TABLE 7

Bromoform concentration in oil phase solutions

| Number | Oil phase (mL) | Bromoform (mg) | [Bromoform] (mg/mL) |
|---|---|---|---|
| 1 | 2.0 | 426.06 | 213.03 |
| 2 | 2.0 | 603.93 | 301.965 |
| 3 | 2.0 | 820.44 | 410.22 |

5.5. Example 5. Preparation of Spray Dried Formulation 4

5.5.1 Method 1

5.5.1.1 Preparation of Water Phase Solution

Maltodextrin (50 g) was added to 200 mL of water and dissolved by ultrasonication to obtain a 20% maltodextrin solution. Aerosil® 200 Pharma (an amorphous anhydrous colloidal silicon dioxide, 2.0 g) was added to the maltodextrin solution and dissolved by ultrasonication to obtain the water phase solution comprising 1% colloidal silicon dioxide.

5.5.1.2 Preparation of Oil Phase Solution

Oleic acid (4 g), propylene glycol (9 g), Kolliphor® RH40 (RH40) (3 g) and Transcutol® HP (4 g) were weighed out and vortexed to mix well. To the resulting solution was added bromoform (8 g) and dissolved by sonication to obtain the oil phase solution with concentration 400 mg/g (40% w/w) of bromoform.

5.5.1.3. Spray Drying

The oil phase solution was added to the water phase solution and stirred well to obtain the spray-drying stock solution which was spray-dried according to the parameters shown in Table 8. During the spray drying process, the sample was found to be viscous, sticking to the glass wall of the apparatus. The spray-dried sample was collected and appeared as a white to off-white powder. The spray dried product had the characteristics shown in Table 8.

TABLE 8

Exemplary spray drying parameters and characteristics of spray dried product prepared using Method 1

| Spray drying parameter | Set up value |
|---|---|
| Inlet air temperature | 110° C.-120° C. |
| Outlet air temperature | 55° C.-63° C. |
| Spray nozzle | 0.7 mm |
| Nozzle air flow | 35 mm/min |
| Pump speed | 15-20% |
| Aspirator | 95-100% |
| **Spray dried product characteristics** | |
| Oil phase | Oleic acid: propylene glycol: RH40: Transcutol ® HP = 20:45:15:20 |
| Water phase | 20% maltodextrin aqueous solution containing 1% colloidal silicon dioxide |
| [Bromoform] in oil phase | 400 mg/g |
| Oil/water ratio | 1:7 |
| Bromoform encapsulation | 10% |
| Appearance | White to off-white powder |
| $D_{90}$ | 71.69 μm |
| Bulk density | 0.39 g/cm3 |
| Tap density | 0.62 g/cm3 |
| Carr index | 37.5% |

5.5.2. Method 2

5.5.2.1. Preparation of Water Phase Solution

Maltodextrin (125 g) was added to 500 mL of water and dissolved by ultrasonication to obtain a 20% maltodextrin solution. Aerosil® 200 Pharma (an amorphous anhydrous colloidal silicon dioxide, 10.0 g) was added to the maltodextrin solution and dissolved by ultrasonication to obtain the water phase solution comprising 2% colloidal silicon dioxide.

5.5.2.2. Preparation of Oil Phase Solution

Oleic acid (7.5 g), propylene glycol (16.875 g), RH40 (5.625 g) and Transcutol® (7.5 g) were weight out and vortexed to mix well. To the resulting solution was added bromoform (15 g) and dissolved by sonication to obtain the oil phase solution with a bromoform concentration of 400 mg/g.

5.5.2.3. Spray Drying

The oil phase solution was added to the water phase solution and stirred well to obtain the spray-drying stock solution which was spray-dried according to the parameters shown in Table 9. The spray-dried sample was collected and appeared as a white to off-white powder. The spray dried product had 58.39% yield and the characteristics shown in Table 9.

TABLE 9

Exemplary spray drying parameters and characteristics of spray dried product prepared using Method 2

| Spray drying parameter Set up value | |
|---|---|
| Inlet air temperature 100° C.-110° C. | |
| Outlet air temperature 47° C.-58° C. | |
| Spray nozzle 0.7 mm | |
| Nozzle air flow 35 mm/min | |
| Pump speed 15-20% | |
| Aspirator 95-100% | |
| Spray dried product characteristics | |
| Oil phase | Oleic acid: propylene glycol: RH40: Transcutol ® HP = 20:45:15:20 |
| Water phase | 20% maltodextrin aqueous solution containing 2% colloidal silicon dioxide |
| [Bromoform] in oil phase | 400 mg/g |
| Oil/water ratio | 1:10 |
| Bromoform encapsulation | 8% |
| Appearance | White to off-white powder |
| $D_{90}$ sample on collection bottle | 18.30 µm |
| $D_{90}$ sample on glass wall | 36.59 µm |
| Bulk density | 0.38 g/cm3 |
| Tap density | 0.59 g/cm3 |
| Carr index | 34.48% |
| Yield | 58.39% (109.476 g) |

5.6. Example 6. Bromoform Encapsulation in Wax Carriers Via Spinning Disk Atomization This example describes a method of encapsulating bromoform using Melt Spray Congealing (MSC) on a spinning disk apparatus.

Formulations using various food grade waxes were optimized according to the following specifications—

(i) 20-30% loading of oil/bromoform blend into the waxes;

(ii) <200 µm particle size;

(iii) 5-100 g batch size.

Suspension tests were conducted for 30% loading (70:30 wax:core). Three3 variants of core composition were tested per wax (i) 60:40 soybean oil:bromoform (ii) 50:50 soybean oil:bromoform (iii) 100% bromoform.

Figure 16A:
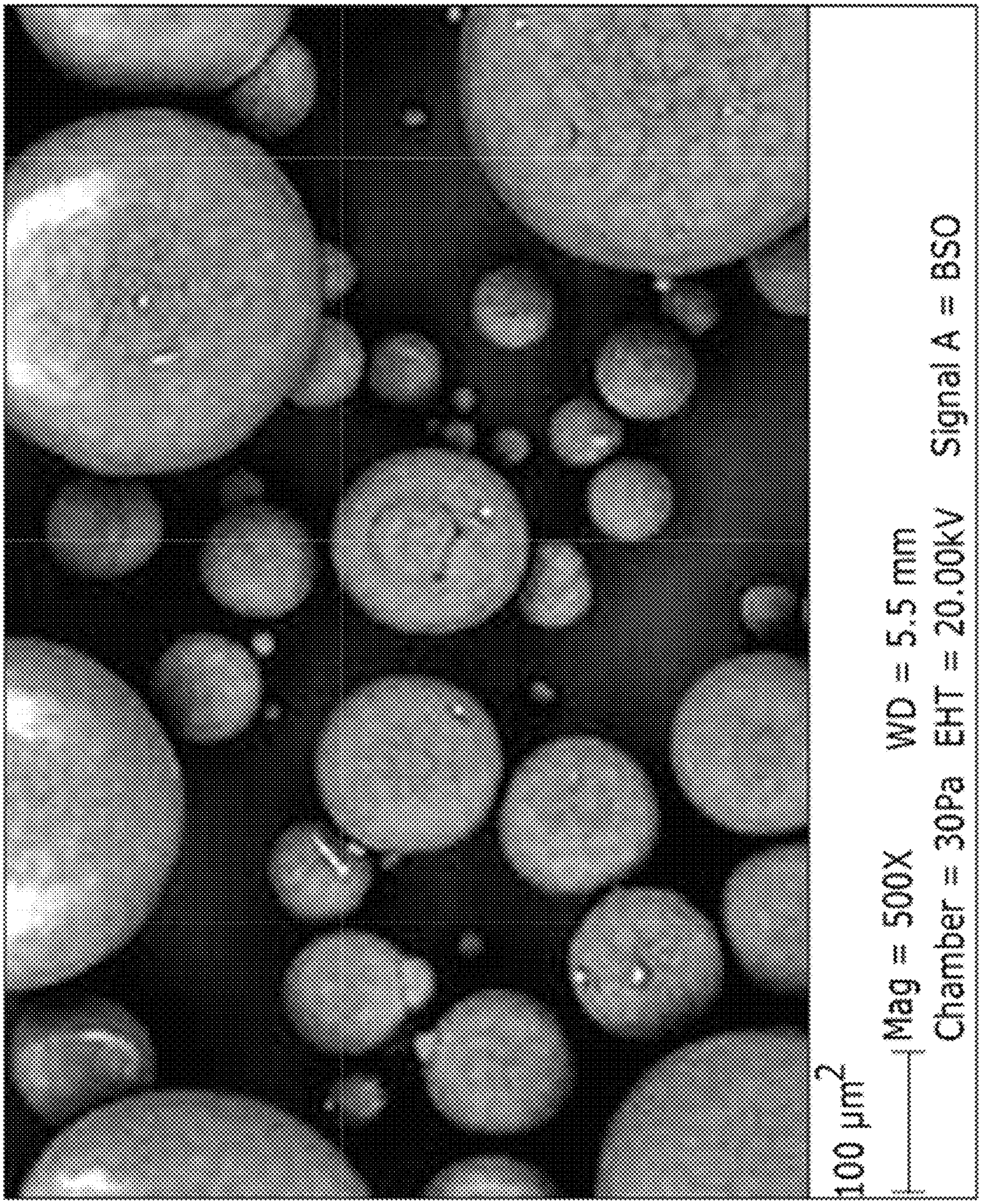
FIGS. 16A-16H show exemplary electron micrograph images for bromoform encapsulated wax-based carriers.
Figure 16B:
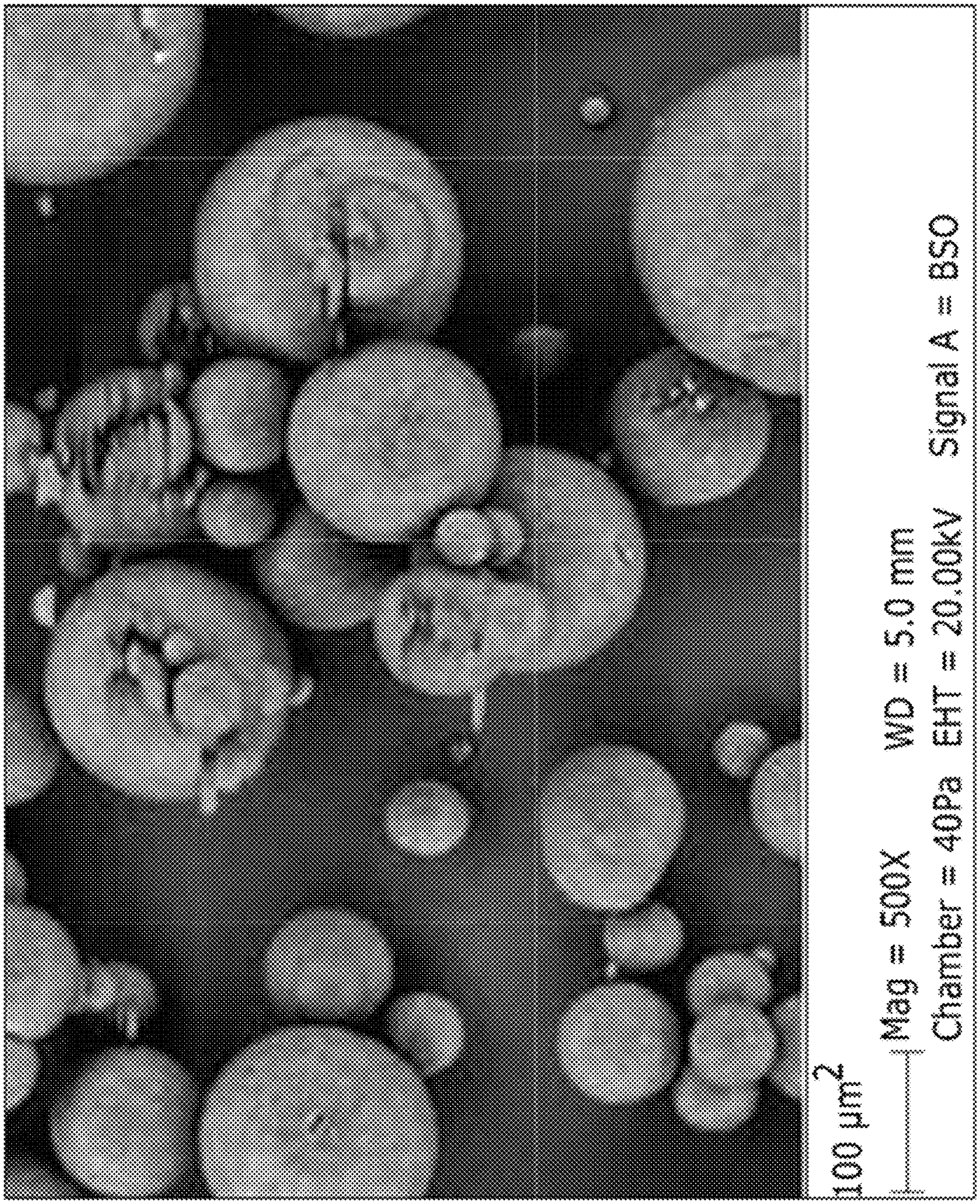
Figure 16C:
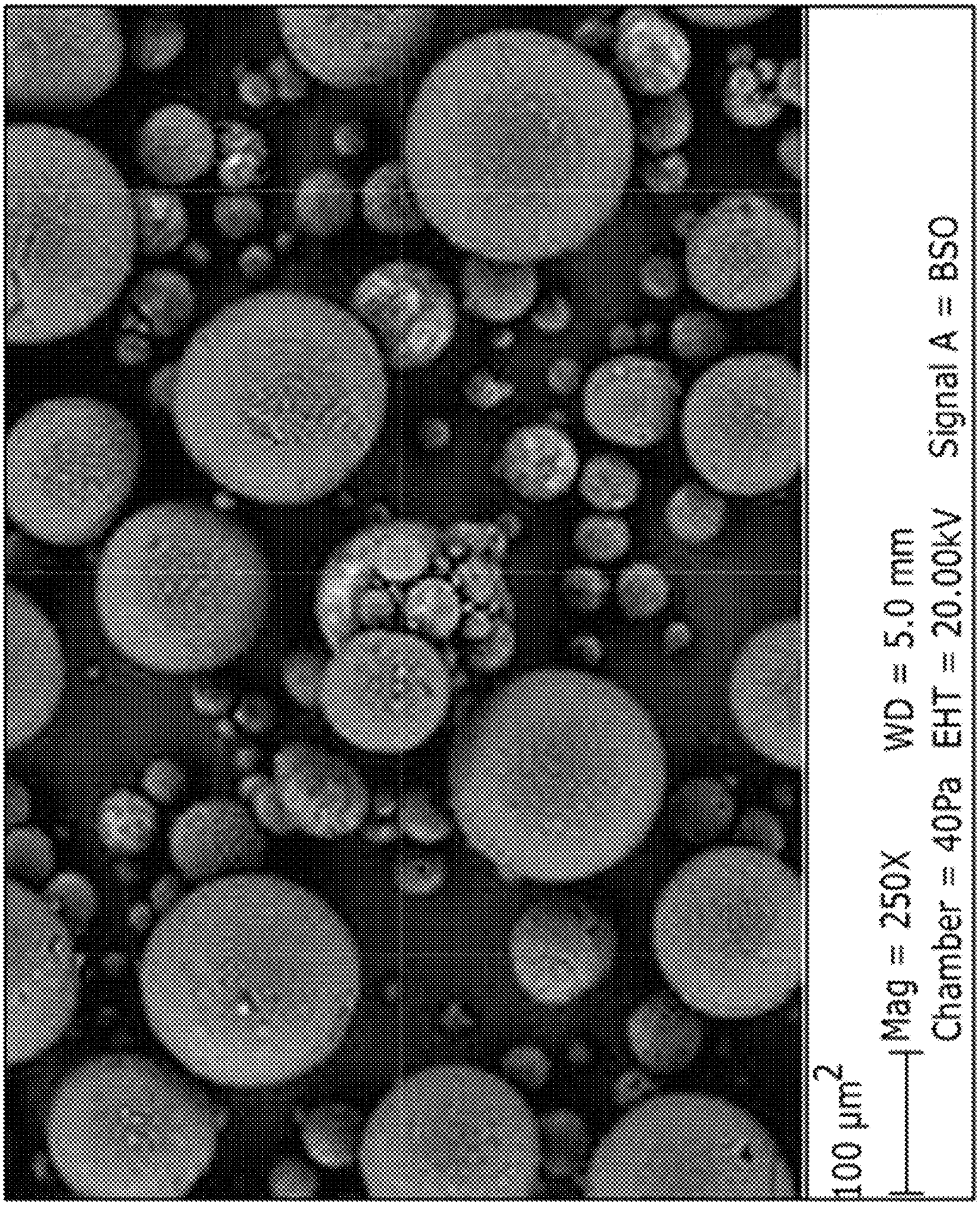
Figure 16D:
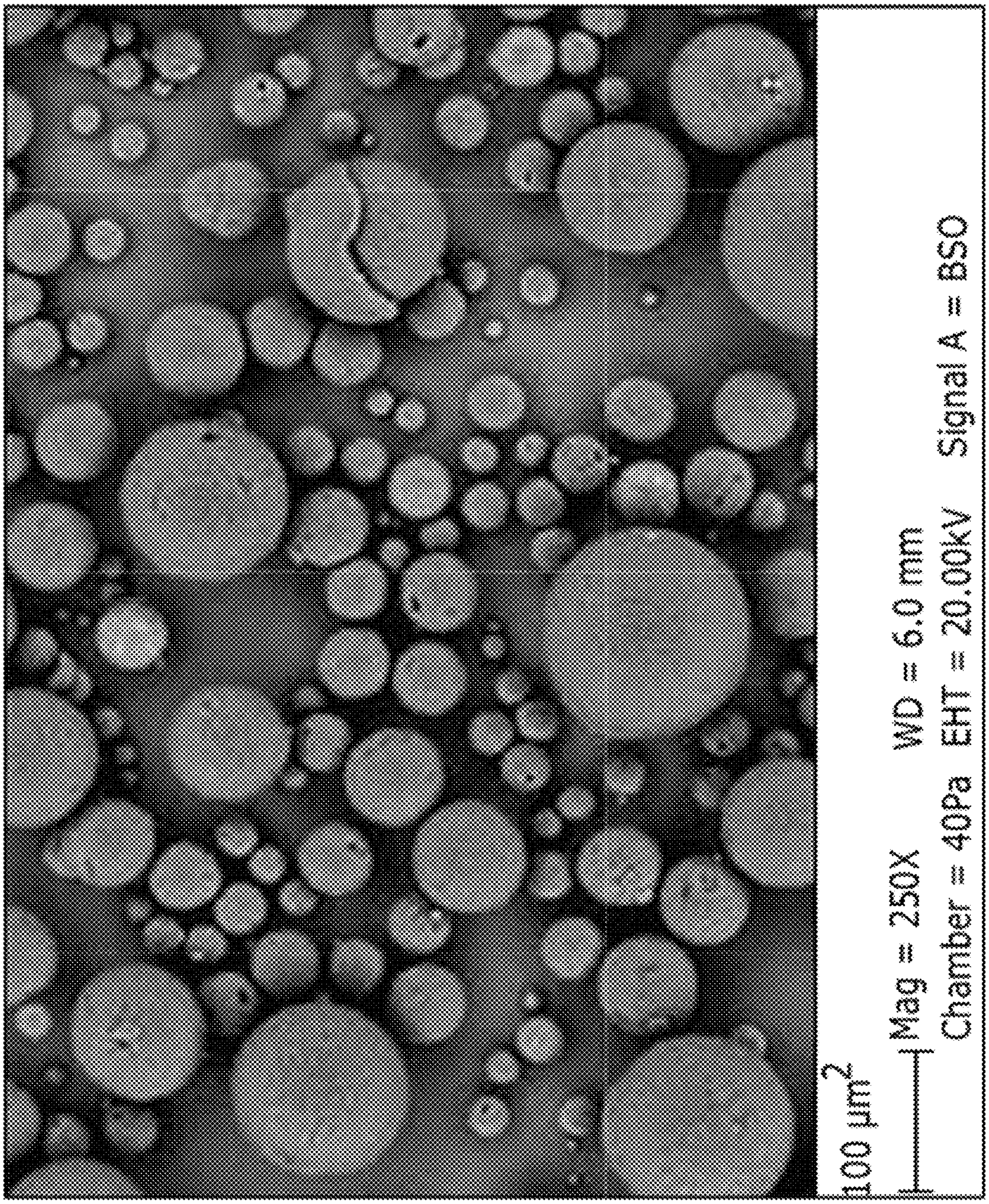
Figure 16E:
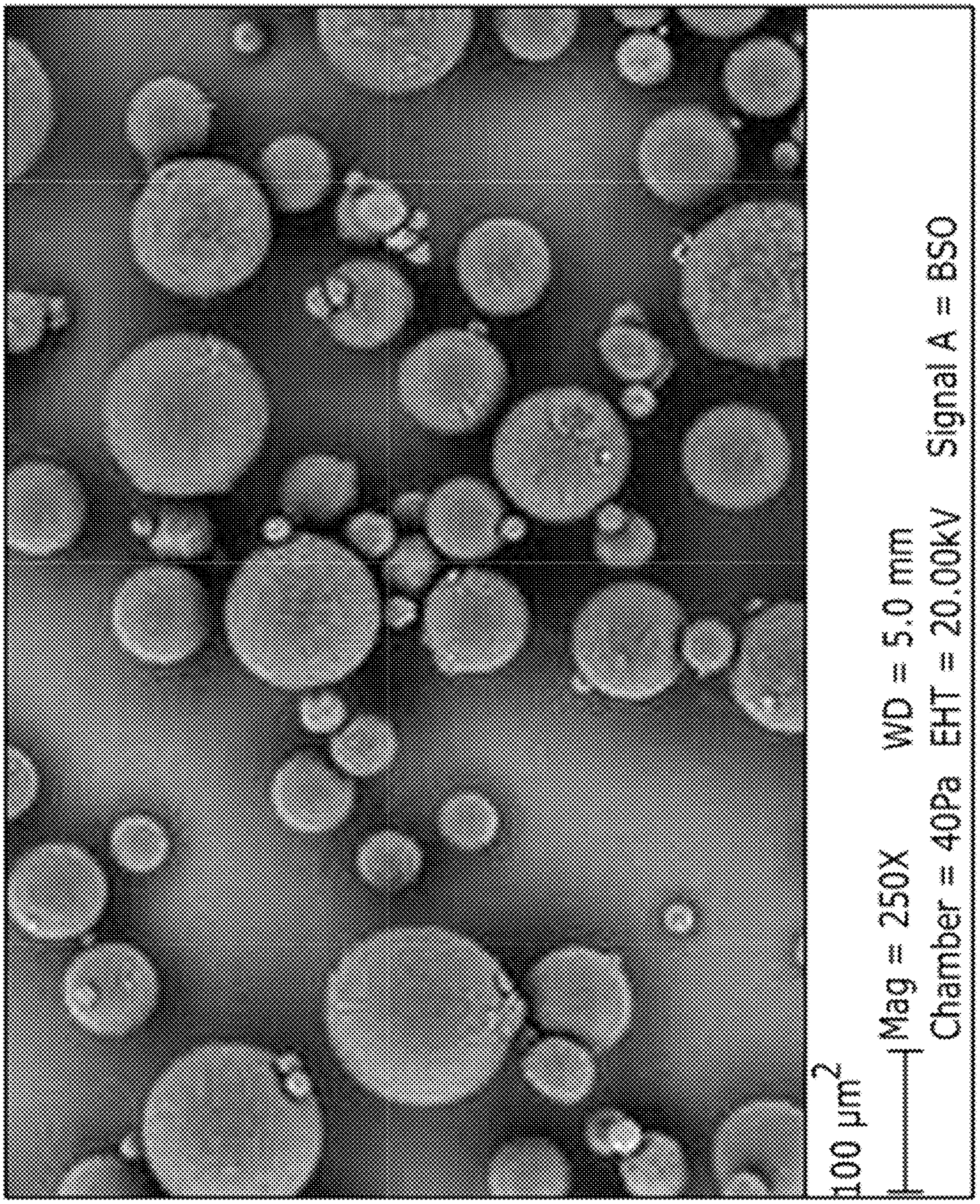
Figure 16F:
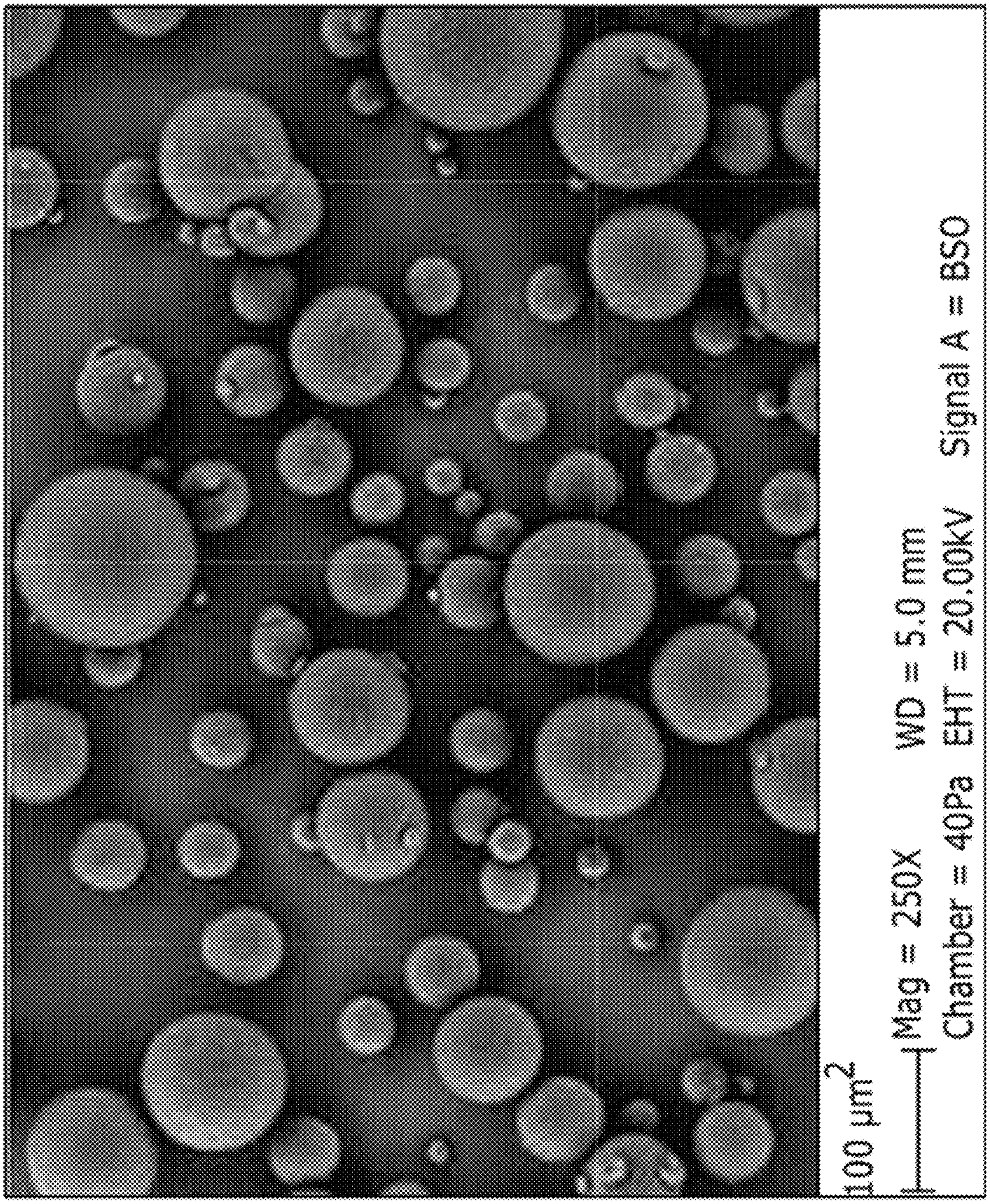
Figure 16G:
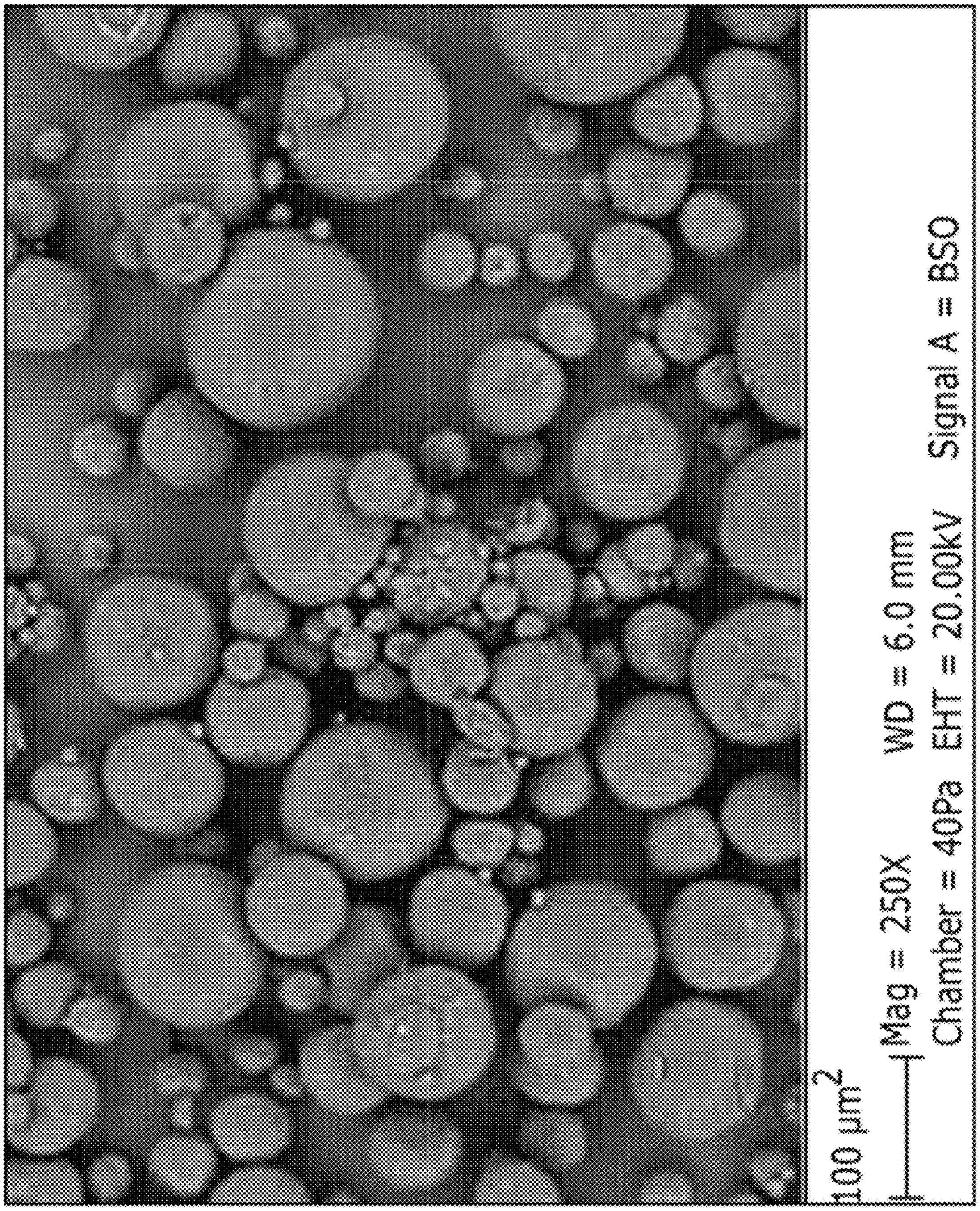
Figure 16H:
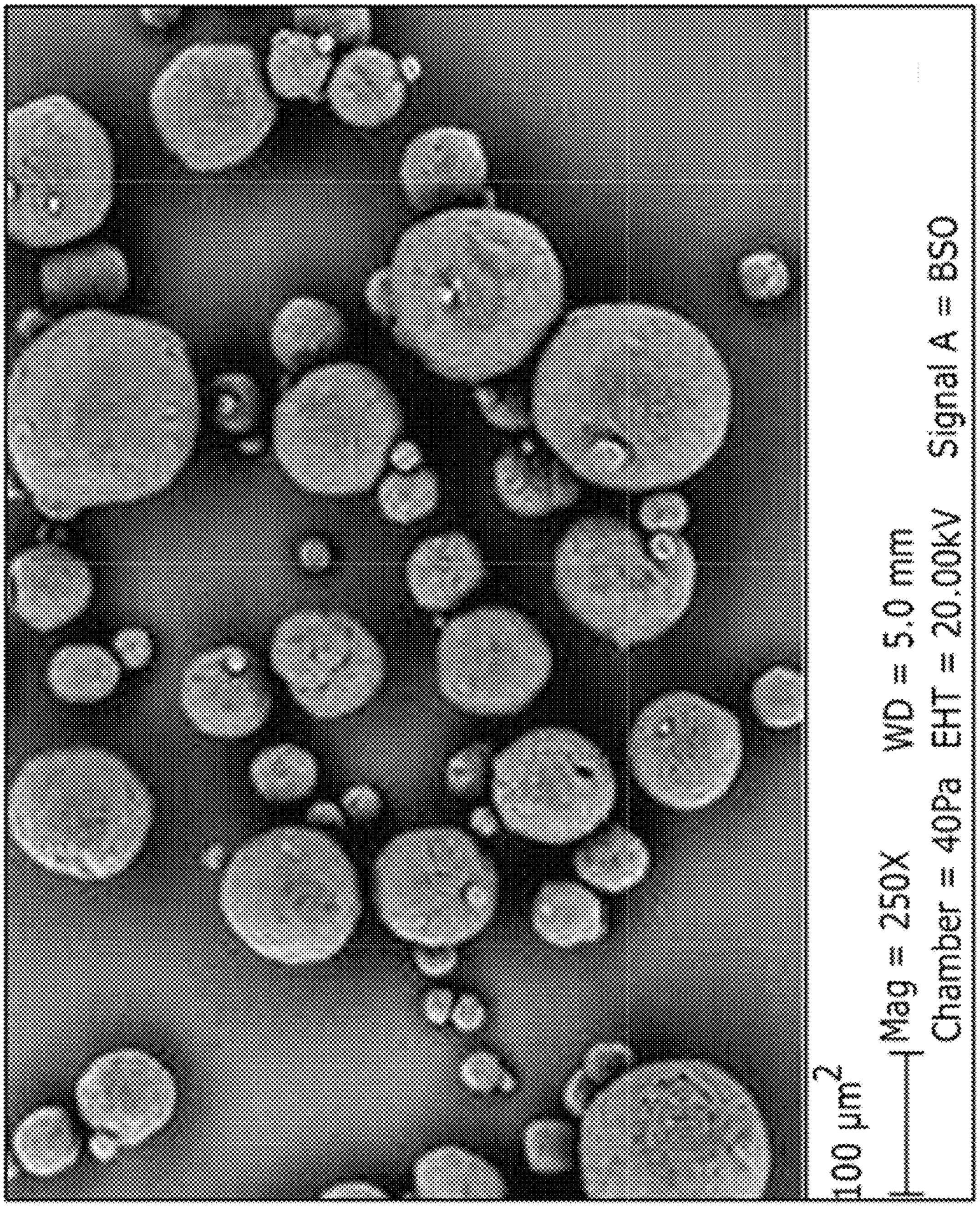

Waxes were first melted inside vials placed on a hot oil bath maintained at a temperature at least 5° C. above wax melting temperature. Bromoform (60:40 soya bean oil: bromoform, 50:50 soyabean oil:bromoform, and 100% bromoform) was then incorporated into the melted wax by homogenization (~10,000 rpm, 15 s). No phase separation was observed after incorporation. The homogenate thus obtained is injected onto a spinning disk (4000 rpm) of a spin disk atomizer (disk temperature at least 5° C. above wax melting temperature) to obtain wax carriers comprising bromoform. FIG. 15 shows an exemplary table illustrating yield and particle size analysis for bromoform encapsulated in wax-based carriers prepared by spinning disk atomization. FIGS. 16A-16H show exemplary electron micrograph images for bromoform encapsulated wax-based carriers. FIG. 16A shows bromoform/carnauba wax carriers manufactured without soyabean oil. FIG. 16B shows bromoform/carnauba wax carriers manufactured with soyabean oil. FIG. 16C shows bromoform/DYNASAN® 118 carriers manufactured without soyabean oil. FIG. 16D shows bromoform/DYNASAN® 118 carriers manufactured with soyabean oil. FIG. 16E shows bromoform/beeswax carriers manufactured without soyabean oil. FIG. 16F shows bromoform/beeswax carriers manufactured with soyabean oil. FIG. 16G shows bromoform/stearic acid carriers manufactured without soyabean oil. FIG. 16H shows bromoform/stearic acid carriers manufactured with soyabean oil.

5.7. Example 7. Method of Hot Melt Extrusion (HME)

Polymers with low melting point (Tm) and glass transition temperature (Tg), such as Soluplus® (Table 10) were used in the HME process. Bromoform (0.2 g) and Soluplus® (1.0 g) were mixed (bromoform:Soluplus®=1:5 w/w) and heated to approximately 90° C. to melt until viscous. The mixture was then cooled down and crushed to collect the product. The product appeared as an opaque powder.

TABLE 10

Tm and Tg for some polymers

| Polymer | Melting Point (Tm ) ° C. | Glass transition temperature (Tg) ° C. |
|---|---|---|
| Kollidon ® VA64 | 230 | ~101 |
| HPMC | 230 | ~170 |
| HPMCP ® | >145 | ~160 |
| PVA | 230 | ~75~85 |
| Soluplus ® | 250 | ~70 |

5.8. Example 8. Method of Bromoform Granulation (Microparticle Granules)

5.8.1. Preparation of Oil Phase

Oleic acid (1 g), propylene glycol (2.25 g), RH40 (0.75 g), and Transcutol® HP (1 g) mixed in a ratio of 20:45:15:20, were vortexed to sonicated to mix well to obtain the oil phase. Bromoform was added to the oil phase and vortexed to obtain a bromoform in oil phase.

5.8.2. Preparation of Bromoform Encapsulated Granules

The oil phase and bromoform were mixed in three different ratios. The oil-bromoform mixture was added to Polyplasdone™ XL and the mixture ground to evenly adsorb the oil phase to the adsorbent. The resulting mixture was passed through a 40-mesh sieve to obtain bromoform encapsulated granules. The granules were manually filled into hydroxypropyl methylcellulose (HPMC) shells having a theoretical filling capacity of 400±5 mg.

5.8.3. Results

Table 11 shows the bromoform content in granules soon after preparation and after 24 h. These results show that bromoform can be solidified by granulation process. When the loading of bromoform is approximately 5%, the granular bromoform content is >94%, whereas when bromoform encapsulation is approximately 10%, the granular bromoform content >85%.

TABLE 11

Bromoform content in granules

| | Bromoform (g) | Oil phase (g) | Polyplasdone ™ XL (adsorbent) (g) | Bromoform in granules theoretical, % w/w | Bromoform in granules, 0 h absolute, % w/w (relative, %) | Bromoform in granules, 24 h absolute, % w/w (relative, %) | Bromoform in capsules (relative, %) |
|---|---|---|---|---|---|---|---|
| 1 | 0.914 | 2.999 | 7.701 | 4.72 | 3.93 (83.19) | 4.67 (99.02) | (116.71) |
| 2 | 1.058 | 2.922 | 7.708 | 5.53 | 4.53 (81.92) | 5.22 (94.31) | (104.93) |
| 3 | 1.997 | 2.792 | 7.699 | 10.63 | 8.49 (79.82) | 9.11 (85.66) | (107.32) |

The characteristics of these bromoform encapsulated granules are shown in shown in Table 12.

TABLE 12

Characteristics of the granulated bromoform products

| | Bromoform (g) | Oil phase (g) | Polyplasdone ™ XL (adsorbent) (g) | Appearance | Angle of repose (°) | Bulk density (g/cm3) | Tap density (g/cm3) | Carr index (%) |
|---|---|---|---|---|---|---|---|---|
| 1 | 0.914 | 2.000 | 7.701 | snowflake- | 48.0 | 0.17 | 0.27 | 37.5 |
| 2 | 1.058 | 2.922 | 7.708 | like white | 46.5 | 0.17 | 0.26 | 36.0 |
| 3 | 1.997 | 2.792 | 7.699 | powder | 45.0 | 0.22 | 0.30 | 26.2 |

5.9. Example 9. Estimated Consumption Levels in Cattle

The European Food Safety Authority (EFSA) provides default values for daily food intake (DM g/kg bw). EFSA guidance (2017), recommends 20 DM g/kg bw for cattle used for meat (beef cattle) and 31 DM g/kg bw for dairy cows. Based on this recommendation, an exemplary intake of Sea-Gains and bromoform is shown in Table 13.

TABLE 13

Estimated Intake of Sea-Gains and Bromoform

| Animal | Default Value for Daily Food Intake (DM g/kg bw) | Bromoform concentration of Sea-Gains (mg/g) | Low Dosage Sea-Gains intake (% DM)[a] | High Dosage Sea-Gains intake (% DM)[b] |
|---|---|---|---|---|
| Beef cattle | 20 | 5 | 0.18 | 0.36 |
| Beef cattle | 20 | 10 | 0.09 | 0.18 |
| Dairy cow | 31 | 5 | 0.12 | 0.24 |
| Dairy cow | 31 | 10 | 0.06 | 0.12 |

[a]Low bromoform dosage from Sea-Gains (0.18 mg/kg BW)

[b]High bromoform dosage from Sea-Gains (0.36 mg/kg BW)

The term "Sea-Gains" refers to ruminant feed comprising organohalides (e.g. bromoform), which are included in the diets of animals. Sea-Gains provides approximately 288 kCal/100 g. When administered at approximately 0.2% in the diet, Sea-Gains is adapted to contribute approximately 16 g of dry matter to cattle diets and 40.3 g of dry matter to dairy cattle diets per day. At this level of inclusion, it is unlikely that feed formulators would need to make significant adjustments in other diet ingredients to meet nutritional needs for macronutrients. Further, Sea-Gains contributes approximately 0.36 mg/kg dw of iodine to the daily diet. Iodine levels of 0.2 to 0.5 g/kg total diet have been estimated to be sufficient to meet animal nutritional requirements in beef cattle. These values are based in part on a theoretical iodine requirement of 0.6 mg/100 kg bw (NRC, 2000). The maximum tolerable level of iodine is 50 mg/kg diet, which has been shown to be safe for both calves and lactating cows (NRC, 2000).

5.10. Example 10. Method of Manufacturing a Food Supplement Comprising a Methanogenesis Inhibitor Sea-Gains is a food supplement for beef and dairy cattle comprising methanogenesis inhibitor(s), blended with soybean oil and kelp. FIG. 17 shows an exemplary table illustrating ingredients in Sea-Gains. This kelp-based feed supplement was composed of ingredients sourced from FDA approved, FSMA compliant facilities, and produced in accordance with good manufacturing practices and in accordance with the Food and Drug Administration 21 CFR 507, as well as Hazard Analysis and Risk-Based Preventive Controls regulations. The product was found to be free of extraneous matter of any sanitary significance. The dried kelp was passed over a screen (size 20 mesh, 0.841 mm) to remove large materials. The screened kelp was placed in the mixer along with the appropriate quantity of the dry proprietary blend and mixed for 15 minutes. Soybean oil was then added and mixed in to achieve homogeneity. Batches were then transferred to a lined supersack, sealed, and stored in a refrigerated box trailer at 4° C. until final packaging. During final packaging, each supersack was loaded into a 45 Degree Hopper 8097 Series (Bonar Plastics Inc, IL) and foil bags were filled on a bagging line. The bags were loaded onto a pallet, wrapped, and labeled before storage under ambient conditions (maximum temperature, 80° F.) and/or shipment. The specifications for Sea-Gains are shown in Table 14.

TABLE 14

Specifications for Sea-Gains

| Parameter | Specification | Method |
|---|---|---|
| Description | Green powder | Visual Inspection |
| Bromoform | 0.5 to 1.0% w/w | GCMS-method undergoing validation by AMPAC Fine Chemicals |
| Nutritional parameters | | |
| Carbohydrates | ≤48% | Contact Medallion Food Laboratories Method Details |
| Ash | ≤40% | AOAC 923.03 |
| Moisture | ≤15% | AOAC 945.43, 934.01 |
| Insoluble Fiber | ≤34.0% | AOAC 991.43 |
| Soluble Fiber | ≤10% | AOAC 991.43 |
| Protein | 5%-12% | AACC 46-30, AOAC 992.15 |
| Starch | ≤9% | AOAC 979.1, AACC 76-11 |
| Fat | ≤7.5% | AOAC 948.15, 922.06, 925.32, 950.54, 922.09 |
| Microbiological | | |
| Maximum Total Plate Count (Aerobic Plate Count + Anaerobic Plate count) | ≤510,000 CFU/g | FDA BAM CH3, Compendium |
| Yeast | ≤15 CFU/g | FDA BAM CH18, Compendium |
| Mold | ≤80 CFU/g | FDA BAM CH18, Compendium |
| *E. Coli* | ≤30 CFU/g | AOAC 991.14 |
| *Salmonella* | Negative | AOAC 2020.02 |
| *Listeria* | Negative | AOAC 2019.10 |
| *Enterobacteriaceae* | ≤100 est. CFU/g | Compendium |
| Heavy Metals | | |
| Lead | ≤5 ppm | AOAC 993.14, AOAC 2015.06 |
| Cadmium | ≤1 ppm | AOAC 993.14, AOAC 2015.06 |
| Mercury | ≤30 ppb | AOAC 993.14, AOAC 2015.06 |
| Arsenic | ≤70 ppm | AOAC 993.14, AOAC 2015.06 |
| Iodine | <1500 ppm | Contact Michigan State University Veterinary Diagnostic Laboratory |

Abbreviations: CFU = colony forming units; ppm = parts per million

Although this disclosure describes a methanogenesis inhibiting food supplement having particular components in particular amounts, this disclosure contemplates methanogenesis inhibiting food supplements having any suitable components in any suitable amounts.

5.11. Example 11. Stability Studies

Vendors for the individual components of Sea-Gains provide a certificate of analysis with shelf-life/expiration dates. The shortest shelf-life component is dextrin, which has a shelf-life of 18 months. This shelf-life is used as a guide for Sea-Gains during the research and development stage, i.e., the shelf life for the Sea-Gains product is considered to be the length of the shortest shelf-life component.

A stability study is performed quarterly for 1 year at 25° C.±2° C./60%±5% Relative Humidity (RH) and at 40° C.±2° C./75%±5% RH to establish shelf life for Sea-Gains as assessed from appearance, bromoform content, and water activity (as a measure of potential for microbial growth).

5.12. Example 12. Efficacy of Methanogenesis Inhibitor on Methane Reduction In Vitro This study shows the efficacy of feed supplements comprising a methanogenic inhibitor in reducing methane production by rumen contents.

5.12.1. Materials and Methods 5.12.1.1. Feed Supplement.

The test material was a kelp-product formulated with bromoform. The test material was a precursor to the final Sea-Gains product called "Icelandic Kelp Supplement" that had similar functional ingredients to test the proof of concept. Specifically, the ingredients contained: *Ascophylum nodosum*, bromoform in ethanol solution, potato starch, and molasses, mixed together and freeze dried. The material was received vacuum packed and was stored frozen (−20° C.) prior to use. Methanolic solutions were prepared containing 0, 0.25% or 0.5% of the test material. GCMS results indicated concentrations at T=0 of 12.07 mg bromoform per kg of feed supplement.

5.12.1.2. Study Conduct

Three ruminally cannulated Holstein steers (250-350 kg body weight) were used as a source of ruminal contents. The animals were fed a forage diet (alfalfa cubes) at 1.75×NEm (Net energy for maintenance). The steers were adapted to each diet for a minimum of 21 days prior to sampling. Approximately 2 kg of ruminal content were collected from each of the three steers receiving the same diet into individual insulated containers. The ruminal content from each steer were processed with a blender under a $CO_2$ head space and strained through 4 layers of cheesecloth. The three ruminal contents were combined on an equal volume basis to form a pooled ruminal inoculum source for each experiment.

Substrates (0.4 g) were pre-weighed into each 260 mL fermentation vessel, and pre-wetted with 1 mL water. Buffer solution, macro- and micro-mineral solutions, and reducing solution were prepared as described in Goering and Van Soest (1970). These solutions (3300 mL) and pooled ruminal inoculum described above (600 mL) were combined and 99 mL added to each fermentation vessel. The vessels were then gassed with $CO_2$ and fitted with automatic pressure transducers and a gas sampling port (Ankom Technology, Macedon, NY). Each vessel was pre-calibrated using water displacement to determine the total volume of gases produced.

The experiment consisted of six treatments, each replicated four times daily, for a total of 24 batch culture vessels each day. This was replicated for 3 days. The treatments were arranged as a 2×3 factorial (Table 15).

TABLE 15

Treatments used in in vitro efficacy testing

| Treatment | Kelp Extract (KE) % | Grain (Corn):Alfalfa %/% |
|---|---|---|
| Control | 0 | 80:20 |
| Treatment-0.25KE | 0.25 | 80:20 |
| Treatment-0.5KE | 0.5 | 80:20 |
| Control | 0 | 20:80 |

TABLE 15-continued

| Treatments used in in vitro efficacy testing | | |
|---|---|---|
| Treatment | Kelp Extract (KE) % | Grain (Corn):Alfalfa %/% |
| Treatment-0.25KE | 0.25 | 20:80 |
| Treatment-0.5KE | 0.5 | 20:80 |

For each fermentation, gas production was monitored at 5-minute intervals throughout a 48-h fermentation period using an automated pressure transducer system (Ankom Technology, Macedon, NY). At the completion of the 48-h fermentation, vessels were placed into an ice bath while gas samples were drawn into evacuated test tubes. Gas samples were analyzed for methane concentration using gas chromatography (Xu et al. 20101). Flasks were then opened, pH measured, and an 8-mL aliquot of the fermentation media combined with 2 mL of 25% metaphosphoric acid for subsequent analyses. The samples were centrifuged at 39,000×g, transferred to vials, and analyzed for volatile fatty acids (VFA) content using the Proc GLM procedure, and L (+) lactate content using a L(+)lactate dehydrogenase (LDH) procedure adapted to a micro-plate (Thermo Fisher Scientific Inc., Beverly, MA). The potential extent and rate of gas production in response to feed degradation were determined using the one-pool exponential model represented by the following equation;

$$P=b(1-e^{-k(t-L)}) \quad \text{(I)}$$

where P is the cumulative pressure (psi), b is the maximum pressure (psi), k is the rate of pressure (h−1), t is the time (h), and L is a discrete time lag prior to the start of fermentation (h). Gas production data were fitted to the above nonlinear model using GraphPad Prism 6 (GraphPad Software, Inc., La Jolla, CA, USA). In this model, it is assumed that no pressure is produced until the discrete time lag has elapsed. Gas production is then calculated from the vessel pressure corrected from current atmospheric pressure into standard atmospheric pressure (101.325 kPa). This approach yielded total gas production and methane production values.

5.12.1.3. Statistical Analysis

The following response variables were analyzed using the Proc GLM procedure of SAS (SAS Institute, Cary, NC); pH, total gas production, gas production rate, methane concentration and production, concentrations and proportions of acetate, propionate, butyrate, valerate, isobutyrate, and isovalerate, total VFA and the acetate:propionate ratio. The experimental design was randomized complete block with a 2×3 factorial treatment structure. The blocking factor is day of assay, and the factors are KE concentration, and substrate. The model included block with treatment effects partitioned into effects of diet and KE along with the diet×KE interaction. The KE effects were partitioned using linear and quadratic contrasts for the effects of KE concentration.

5.12.2. Results

Figure 18A:
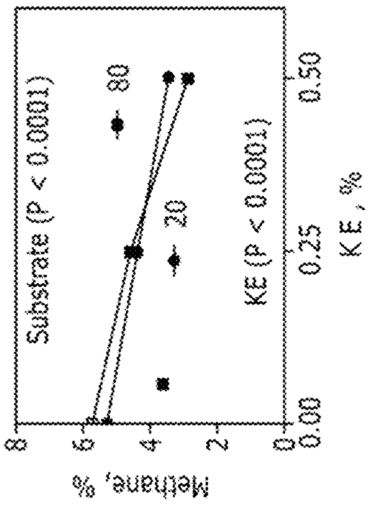
FIGS. 18A-18C show the effects of Kelp Extract (KE) comprising bromoform on fermentation of 180% and 80% corn diets.
Figure 18B:
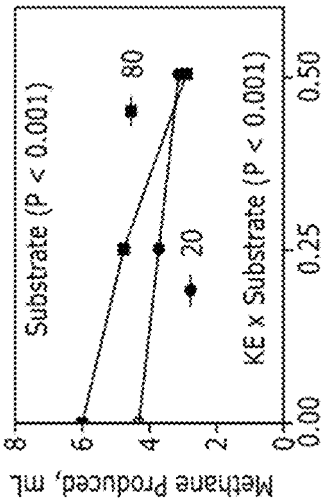
Figure 18C:
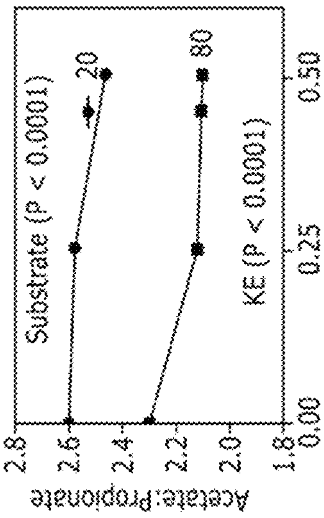

FIGS. 18A-18C show the effects of Kelp Extract (KE) comprising bromoform on fermentation of 180% and 80% corn diets, expressed as % mass kelp extract (KE) per mass of substrate. FIG. 18A illustrates the effect of KE/bromoform on % methane produced in animals administered either of the two corn diets. FIG. 18B illustrates the effect of KE/bromoform on methane produced in animals administered either of the two corn diets. FIG. 18C illustrates the effect of KE/bromoform on acetate:propionate ratios in animals administered either of the two corn diets.

Total gas produced was 24% greater ($P<0.0001$) for the 80% corn substrate compared with the 20% corn substrate indicative of greater digestible energy in corn. The rate of fermentation was greater for the 20% corn substrate (8 vs. 6.4%/h; $P<0.0001$) and was increased linearly ($P<0.0001$) by KE. Addition of KE to the substrate linearly ($P<0.0001$) decreased methane concentration (%) and production (mL); however, there was an interaction ($P<0.01$) for methane production as the decrease was greater for the 80% corn substrate where more methane was produced (FIGS. 18A-18C). Methane production was also 18.4% lower ($P<0.001$) for the 20% corn substrate. As expected, all the molar percentages of VFA were affected ($P<0.01$) by the substrate with the exception of valerate. Both propionate and butyrate were linearly ($P<0.05$) increase by KE addition. The total VFA concentration was not affected by substrate, however, the acetate:propionate decreased for both diets and was decreased ($P<0.0001$) by KE addition (FIG. 18C).

5.12.3. Conclusions

Addition of kelp extract (KE) caused a reduction in methane production for both substrates. For the 20% corn substrate there was a 27% reduction in methane production, whereas for the 80% corn substrate there was a 52% reduction in methane production, with an overall reduction of 42%. In addition to the reduction in methane there was an increase in the proportion of propionate (acetate:propionate ratio from 2.6 to 2.1.) averaging 5.7% across both diets. Taken together, these data indicate an overall more energetically favorable fermentation due to inclusion of KE.

5.13. Example 13. Efficacy of Methanogenesis Inhibitor on Methane Reduction in Cattle This study shows the efficacy of feed supplements comprising a methanogenic inhibitor in reducing methane production in cattle.

5.13.1. Materials and Methods 5.13.1.1. Animal Management

Twelve Holstein steers (160.5±8.54 kg bw) were used in a 14-day randomized complete block design experiment to test whether kelp reduces enteric methane production. Prior to initiation of the experiment, all steers were vaccinated and backgrounded on a corn-silage based diet for a minimum of 14-days. Steers were housed indoors at thermo-neutral conditions (22° C.) in individual 3 m×3 m pens with ad libitum access to water. A 14 h: 10 h, light: dark cycle was established with lights turning on at 0600 h and off at 2000 h each day. For measurements of methane production, steers were moved within the same facility to metabolism stalls (1.25 m×2 m) fitted with indirect calorimetry headboxes for 72 h of continuous measures of gas production. Animals were limit-fed a corn silage-based diet (Table 16) at 1.5 times the net energy requirements for maintenance of growing steers.

TABLE 16

| Diet Composition (% DM Basis) | | |
|---|---|---|
| | Treatments | |
| | Control | Kelp |
| | %, DM basis | |
| Basal Diet | | |
| Corn Silage | 59.8 | 59.8 |
| Distiller's Dried Grains | 27.1 | 27.1 |

TABLE 16-continued

| Diet Composition (% DM Basis) | | |
|---|---|---|
| | Treatments | |
| | Control | Kelp |
| | %, DM basis | |
| Soybean Meal | 5.8 | 5.8 |
| Calcium Carbonate | 1.6 | 1.6 |
| Trace Mineral Mix | 0.6 | 0.6 |
| ADE Vitamin Premix | <0.1 | <0.1 |
| Topdress Supplement | | |
| Ground Corn | 5.0 | 4.5 |
| Proprietary Kelp | 0.0 | 0.5 |

Steers were blocked (n=4 per block) by weight and randomly assigned to one of two treatments (n=2 per treatment within each block). Dietary treatments consisted of a corn silage-based diet supplemented with either a ground corn carrier (control) or ground corn carrier plus kelp supplement (10% of carrier). The test material was a precursor to the final Sea-Gains product called "Icelandic Kelp Supplement" that had similar functional ingredients to test the proof of concept. Specifically, the ingredients contained: *Ascophylum nodosum* (906 g), 160 mL bromoform in ethanol solution [1M], potato starch (66 g), and molasses (400 mL), mixed together and freeze dried for 2 hours. The kelp supplement was included at a rate to supply 0.5% of the total ration dry matter and contained 12.07 mg bromoform/g for a target dose of 1.26 g bromoform/kg bw/day. The kelp supplement was prepared by mixing the kelp with ground corn carrier in a commercial stainless-steel chopper (Mandeville Company, Inc., Minneapolis, MN, USA) for 10 minutes followed by 10 seconds of pulse-blending (Waring MX1000XTX Extreme, Waring Commercial, McConnellsburg, PA, USA). Observationally, this mixing procedure produced a uniform distribution of kelp material throughout the supplement. The control supplement (ground corn only) was subjected to the same procedures to equalize potential changes in particle size. Supplements were prepared for each block and stored in sealed containers at 5° C. until fed.

5.13.1.2. Feed Preparation and Management

Each supplement was added to the corn-silage based ration as a top-dress and hand mixed in the feed bunk. The basal diet was sub-sampled daily and composited weekly for dry matter analysis (55° C., air-forced oven). Similarly, any feed refusals were weighed, sampled, dried, and included in the calculation of dry matter intake.

5.13.1.3. Measurements of Gases

Enteric methane production, along with carbon dioxide production and oxygen consumption, was measured by confining the animals in metabolism stalls fitted with stainless steel headboxes. Each headbox was fitted with an air conditioning unit (humidity and temperature control), a stainless steel feed bunk, and a continuously supplied water basin. Animals were tethered inside the headbox through an opening encased with a canvas shroud that is secured around the animal's neck. Collection and analysis of respired gasses was made by a semi-continuous automated process. Airflow through the headbox was set at 300 liters per minute to maintain a carbon dioxide concentration of between 0.4 to 0.7% of the exhaust air. Daily respiratory gas production or consumption was calculated as the sum over a 24 h period and averaged over a 72 h period.

5.13.1.4. Statistical Analysis

Data were analyzed as a randomized complete block design using the GLM procedure of SAS (SAS Institute, Cary, NC). Treatment and block were included as fixed variables. Oxygen consumption and carbon dioxide and methane production were totaled over each 24 h period and averages for each animal included as the dependent variables. Because methane concentrations in expired air were below detection in the kelp group, maximal methane production was estimated for this group using the lowest measured methane concentration (2 ppm) in the exhaust air of control animals. A common variance, i.e. that observed for the control treatment was used across treatments for statistical analysis. This method was chosen because it is highly conservative in terms for reducing type 1 error. Dry matter intake was analyzed separately as intake during the treatment adaptation period and during gas collection. One steer assigned to the kelp treatment group became ill and had low dry matter intake throughout the entire study was therefore removed from all analyses. Based on subsequent observations and death two-weeks after the experiment, the illness appeared to be unrelated to the experimental treatment. Significance was set at $P \leq 0.05$ 5.13.2. Results The amount of feed offered was limited to 1.5 times the net energy required for maintenance of growing steers (Table 17). Accordingly, dry matter consumption was mostly complete and exceeded 2.0% of body weight across both treatments. Dry matter intake (DMI) was impacted by block ($P<0.01$) and a slight reduction ($P=0.04$) in intake was observed for steers supplemented with kelp during measurements of respiratory gases. However, in both of these cases differences were largely reflective of slight differences in steer body weights (161 vs 160 kg) between the treatment groups. As such, dry matter intake expressed as a function of body weight was unaffected by either block ($P \geq 0.10$) or dietary treatment ($P \geq 0.11$) during both the diet adaptation and respiratory gas collection period. Based on actual body weights and DMI, the dose of bromoform was estimated to be 1.207 mg/kg bw/day.

TABLE 17

Effects of Dietary Treatment on Dry Matter Intake of Holstein Steers During Dietary Adaptation and Measurements of Respiratory Gases

| | Control | Kelp | SE[a] | Block | Trt |
|---|---|---|---|---|---|
| Dry matter intake (kg) | | | | | |
| Diet Adaptation | 3.39 | 3.34 | 0.027 | <0.01 | 0.20 |
| Gas Collection | 3.35 | 3.21 | 0.045 | <0.01 | 0.04 |
| Dry matter intake (kg/kg bw) | | | | | |
| Diet Adaptation | 0.021 | 0.021 | 0.0002 | 0.10 | 0.17 |
| Gas Collection | 0.021 | 0.02 | 0.0021 | 0.51 | 0.11 |

[a]Data are presented as least square means ± the standard error of the mean; n = 6 and n = 5 for the control and kelp supplanted treatment, respectively.

Figure 19:
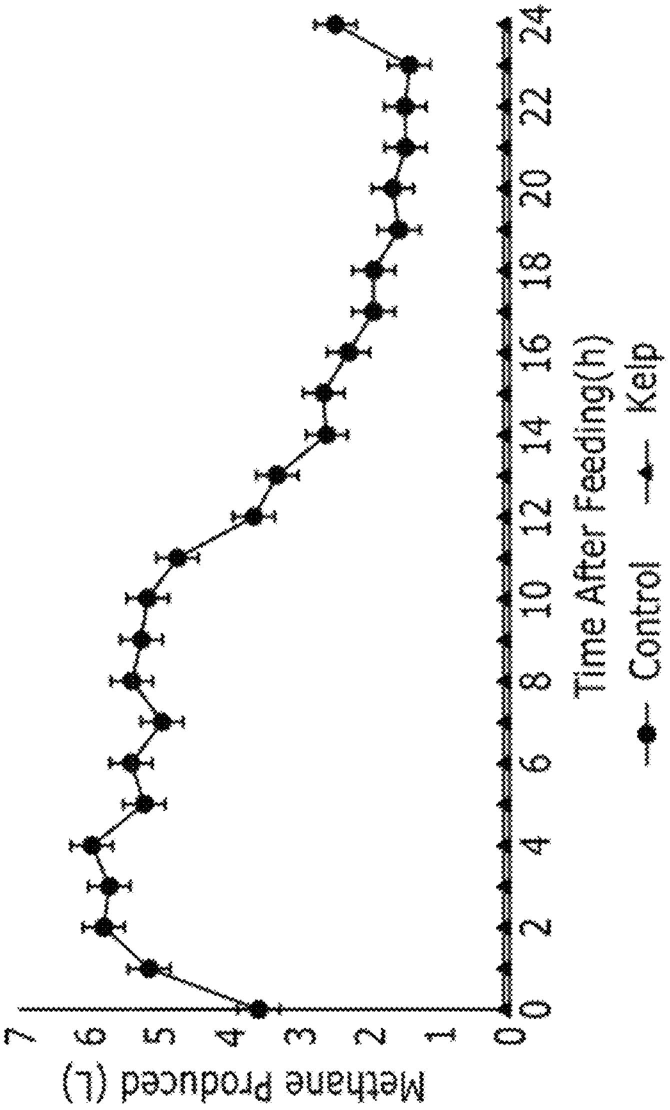
FIG. 19 shows exemplary methane production in steers administered the bromoform/kelp diet or a control diet without bromoform.

Methane production was dramatically reduced ($P<0.001$) by kelp treatment (Table 18). FIG. 19 shows exemplary methane production in steers administered the bromoform/kelp diet or a control diet without bromoform. Steers consuming the control supplement exhibited a typical postprandial increase in methane production, resulting in a mean production of 88.7 L/d. In contrast, methane concentration in exhaust air of steers consuming kelp was below detectable levels at all measured time points throughout the entire 72 h measurement period. Thus, for the purpose of statistical comparison, the lowest detectable methane concentration observed in this experiment was used to estimate a maximal daily methane production of 2.2 L/d for kelp group. Methane yield in the control treatment group averaged 18.96 g/kg of dry matter intake as compared to a maximum of 0.49 g/kg of dry matter intake for steers consuming kelp. Recently, Roque et al. (2021) reported that supplementation of red macroalgae (*Asparagopsis taxiformis*) to beef steers consuming diets varying in forage concentration reduced methane production and yield in a dose-dependent manner. The "medium forage" diet used in that study was chemically similar to that used in the current experiment. In comparison Roque et al. reported that methane yield was reduced from 19.2 (control) to 3.92 g/kg dry matter intake when red macroalgae was included in the diet at 0.5% (dry matter basis). Although methane yield for the control groups is strikingly similar between the experiments, the 80% reduction in methane yield observed for red macroalgae is substantially less than the minimal estimate of 97% observed for kelp supplementation in the study presented here.

TABLE 18

Effects of Dietary Treatment on Respiratory Gas Production (L/d) and Oxygen Consumption (L/d) in Holstein Steers

| | Control | Kelp | SE[a] | Block | Trt |
|---|---|---|---|---|---|
| Methane Produced | 88.7 | <2.2[b] | 7.5 | 0.33 | <0.001 |
| Oxygen Consumed | 1473 | 1606 | 65.9 | 0.41 | 0.2 |
| Carbon Dioxide | 1500 | 1595 | 60.8 | 0.28 | 0.31 |

[a]Data are presented as least square means ± the standard error of the mean; n = 6 and n = 5 for the control and kelp supplanted treatment, respectively.
[b]Estimated maximal production based on a sensitivity of 2 ppm.

Oxygen consumption (P≥0.20) and carbon dioxide production (P≥0.28) did not differ between dietary treatments or blocks. Given that dry matter intake, and hence energy intake, was similar between treatments, these observations indicate that oxidative metabolism by the animal was unaffected by kelp supplementation.

5.13.3. Conclusion

Dietary kelp supplementation decreased methane production and yield without affecting dry matter intake or changes in whole animal oxidative metabolism.

5.14. Example 14. Efficacy of Methane Reduction and Feed Efficiency in Non-Lactating Dairy Cows by Methanogenesis Inhibitor This study shows the effect of feed supplements comprising a methanogenic inhibitor on reducing methane production in non-lactating dairy cows.

5.14.1. Materials and Methods 5.14.1.1. Animal Management

Twelve non-lactating, open Jersey cows (previously trained for the headboxes) were used in a 3-period replicated design. Cows were blocked by intake and assigned randomly within 4 blocks to 1 of 3 treatments (4 cows per treatment). Each block was replicated three times with each cow receiving each of the treatments. Treatments included 0, 69 and 103 g (DM basis) of the Icelandic Kelp Supplement (*Ascophylum nodosum* (906 g), 160 mL bromoform in ethanol solution [1M], potato starch (66 g), and molasses (400 mL), Alga Biosciences, San Francisco, CA) provided as a top-dress. This was equal to approximately 0, 0.77, and 1.2% of diet DM. The kelp product contained 12.07 mg bromoform/g; therefore, the intended doses of bromoform were 0, 1.70 and 2.55 mg/kg bw. Modified distillers grains plus solubles (MDGS) was used as a carrier and was displaced with the algae to equal one-pound DM of top-dress. No milk or meat from these animals entered the food supply chain.

5.14.1.2. Feed Preparation and Management

Cattle were housed in individual stalls and fed once daily in the morning with ad libitum access to feed and water. Feed refusals were collected each day before feeding. Diet consisted of 60% dry-rolled corn, 20% corn silage, 15% MDGS, and 5% supplement (DM basis; Table 19). Each period was 21 days with diet samples, orts, and total feces collected for the last 4 days of each period. Samples were dried for 48 hr at 60° C. in a forced-air oven and ground through a 1-mm screen. Samples were analyzed for DM, organic matter (OM), and energy using a bomb calorimeter.

TABLE 19

Diet Composition

| Ingredient | % of DM[1] |
|---|---|
| Dry-rolled corn | 60 |
| Corn Silage | 20 |
| Modified distillers grains plus solubles | 15 |
| Supplement | 5 |
| Fine ground corn | 2.2025 |
| Limestone | 1.68 |
| Tallow | 0.125 |
| Urea | 0.60 |
| Salt | 0.30 |
| Trace mineral premix | 0.05 |
| Vitamin ADE | 0.015 |
| Remensin-90[2] | 0.0165 |
| Tylan-40[3] | 0.011 |

[1]All treatments received the same basal diet with the addition of the kelp supplement as a topdress (0, 69, or 103 g/d) mixed with modified distillers grains plus solubles at 1 lb DM/cow daily
[2]Supplement formulated to provide 30 g/ton of Rumensin ® (Elanco Animal Health, DM basis)
[3]Supplement formulated to provide 8.8 g/ton of Tylan ® (Elanco Animal Health, DM basis 5.14.1.3. Measurements of Gases Gas emissions (methane and carbon dioxide) were collected using indirect headbox style calorimeter. Cows were in headboxes for two, non-consecutive 23-hr periods (adjusted to 24-hr) and gas samples were collected in foil bags that filled evenly throughout the time frame. Gas measurements were averaged per cow for one value per period. Dry matter intake (DMI) of the cows during the 4 days of collections was used for reporting gas emissions on a per lb DMI basis. Digestibility and gas emissions were analyzed using the GLIMMIX procedure of SAS (SAS Institute, Cary, NC). Cow within the period was the experimental unit. Cow and period were random effects and treatment was a fixed effect. Differences were considered significant if P≤0.05.

5.14.2. Results

Average body weights, dry matter intakes and bromoform intakes are shown in Table 20. Intake was significantly decreased with the addition of the kelp supplement, but digestibility and dietary energy concentration of the diet were not impacted (Table 21).

TABLE 20

Average Body Weight, DMI and Bromoform Intakes

| Treatment | Average body weight (kg) | Average DMI (kg/day) | Bromoform intake (mg/kg bw/day) |
|---|---|---|---|
| Control | 495 | 9.96 | 0 |
| 0.77% inclusion (69 g/d) | 489 | 8.95 | 1.70 |
| 1.2% inclusion (103 g/d) | 491 | 8.64 | 2.55 |

TABLE 21

Effect of Kelp Supplement Inclusion on Cattle Performance, Intake, Digestibility, and Energy

| | Treatment[1] | | | | F- | | |
|---|---|---|---|---|---|---|---|
| | Control | 69 g | 103 g | SEM | Test | Linear | Quadratic |
| Performance | | | | | | | |
| Body Weight, kg | 495 | 489 | 491 | 19.4 | 0.51 | 0.36 | 0.50 |
| BCS[2] | 3.9 | 3.8 | 3.8 | 0.2 | 0.23 | 0.17 | 0.31 |
| Energy | | | | | | | |
| Gross Energy, Mcal/d | $39.3^a$ | $35.3^b$ | $34.0^b$ | 2.6 | 0.01 | <0.0.1 | 0.77 |
| Gross Energy, Mcal/kg DM | 4.04 | 4.05 | 4.04 | 0.02 | 0.44 | 0.83 | 0.22 |
| Digestible Energy, Mcal/d | $28.3^a$ | $25.3^b$ | $24.2^b$ | 2.0 | 0.01 | <0.01 | 0.82 |
| Digestible Energy, Mcal/kg DM | 1.44 | 1.43 | 1.42 | 0.03 | 0.67 | 0.38 | 0.99 |
| DE/GE | 0.72 | 0.71 | 0.71 | 0.02 | 0.66 | 0.37 | 0.95 |

[1]All treatments received the same basal diet with the addition of the kelp supplement as a topdress (0, 69, or 103 g/d) mixed with modified distillers grains plus solubles at 0.454 kg DM/cow daily.
[2]Body Condition Score was performed using a 5-point scale common in the dairy industry.
[a,b,c]Means in row with unique superscripts are different ($P \leq 0.05$)

The inclusion of kelp supplement in the diet decreased methane production measured as g/d (P<0.01; Table 22) and g/lb DMI (P<0.01). There was a 39% reduction in methane emissions with 69 g/d algae inclusion and 63% reduction with 103 g/d kelp supplement inclusion compared to the control diet. Emissions of carbon dioxide ($CO_2$; g/d) tended (P=0.08) to be lower for cattle on kelp supplement treatments but did not differ when calculated as g/lb DMI (P=0.39). Oxygen consumption ($O_2$) amounts did not differ between treatments for g/day (P=0.26) and g/lb DMI (P=0.39). Respiratory quotient (RQ; a measure of basal metabolic rate) was not significantly impacted (P=0.32) by the treatments. Kelp supplement inclusion did influence DMI (P=0.01) with the 2 algae treatments having lower DMI than the control. There was no difference in DM digestibility among the treatments (P=0.51).

TABLE 22

Effect of Kelp Supplement Inclusion on Gaseous Loss and Consumption

| | Treatment[1] | | | | | | |
|---|---|---|---|---|---|---|---|
| | Control | 69 g | 103 g | SEM | F-Test | Linear | Quadratic |
| $CH_4$, g/day | $164.9^a$ | $88.2^b$ | $44.4^c$ | 15.6 | <0.01 | <0.01 | 0.80 |
| $CH_4$, g/kg DMI | $17.0^a$ | $10.3^b$ | $6.2^c$ | 1.7 | <0.01 | <0.01 | 0.65 |
| $CO_2$, g/day | $8420^a$ | $7844^a$ | $7728^b$ | 424 | 0.08 | 0.03 | 0.69 |
| $CO_2$, g/kg DMI | 873 | 891 | 915 | 40.8 | 0.41 | 0.20 | 0.74 |
| $O_2$ consumption, g/day | 5729 | 5065 | 5430 | 362 | 0.26 | 0.31 | 0.20 |
| $O_2$ consumption, g/kg DMI | 603 | 567 | 633 | 46.8 | 0.40 | 0.70 | 0.20 |
| RQ[2] | 1.04 | 1.02 | 1.02 | 0.02 | 0.32 | 0.18 | 0.50 |

[1]All treatments received the same basal diet with the addition of the kelp supplement as a topdress (0, 69, or 103 g/d) mixed with modified distillers grains plus solubles at 0.454 kg DM/cow daily.
[2]RQ = respiratory quotient, Liters per day of $CO_2$ production/Liters per day of $O_2$ consumption
[a,b,c]Means in row with unique superscripts are different ($P \leq 0.05$)

5.14.3. Conclusion

Cattle supplemented with kelp at 69 or 103 g/d (effective dose of 1.77 and 2.50 mg bromoform/kg bw/d) had lower methane emissions compared to a dry rolled corn control diet. There was no significant impact on carbon dioxide emissions (g/lb of DMI). Intake was significantly decreased with the addition of the kelp supplement without impacting digestibility and dietary energy. The body weights were not statistically different for any of the treatment groups indicating that less feed was required to maintain the same body weight for the treatment doses. This is beneficial as it would improve feed efficiency. It is unexpected that if the ruminant animals are eating less that they would still maintain the same body weight. This indicates the supplement in the presently disclosed subject matter was superior to control supplements in converting consumed food into energy.

5.15. Example 15. Efficacy of Methane Reduction and Feed Efficiency in Lactating Dairy Cows by Methanogenesis Inhibitor This study shows the effect of feed supplements comprising a methanogenic inhibitor on reducing methane production in lactating Jersey cows.

5.15.1. Materials and Methods 15.1.1. Animal Management

Twelve lactating, open Jersey cows (previously trained for the headboxes) are used in 28 d periods. The Sea-Gains test sample comprises a spray dry powder with dextrin, bromoform, soybean oil, and *Ascophyllum nodosum* kelp. Treatments include, 0% (control), 0.5% of DM (low inclusion) and 1% of DM (high inclusion). The bromoform content of Sea-Gains is 0.29% (0.3 mg/kg bw (body weight) for the 0.5% DM and 0.6 mg/kg bw for the 1% DM. Measurements of methane production, oxygen consumption, carbon dioxide production, energy utilization, and nitrogen utilization are conducted as outlined in detail by Morris and Kononoff (2021).

5.15.1.2. Measurements of Gases

Key measurements in this study include feed intake, milk production and composition, body weight, methane and hydrogen production, milk yield and composition, nitrogen (protein)/energy use, balance and utilization, total tract nutrient digestion, heat production, tissue energy (gain or loss), digestible, metabolizable, and net energy intake. Milk samples are also analyzed for fat, protein, water and bromoform content.

At the end of each treatment period, the following samples are collected to assess animal health:

(1) Blood Chemistry: Complete blood count, hemoglobin, WBC, platelets, packed cell volume (PCV), mean corpuscular volume (MCV), mean corpuscular hemoglobin concentration (MCHC), glucose, creatinine, total bilirubin, cholesterol, phosphorous, potassium, calcium, sodium, chloride, total protein, globulin, albumin, albumin/globulin ratio, CK, BUN, ALT, AST, LDH, alkaline phosphatase, and amylase. Serum magnesium, bile acids, gamma-glutamyl Transferase (GGT), and fibrinogen are also measured.

(2) Urinalysis: Urine pH, Specific gravity, Glucose, Protein, Ketones, Bilirubin, Urobilinogen, Microscopic examination.

5.15.2. Results

The data presented in Table 23 shows reduction in methane production for both the low inclusion (0.5% DM) and high inclusion (1.0% DM) diets.

TABLE 23

Efficacy of Methane Reduction in Lactating Dairy Cows

| Treatment Group | Control (0%) | 0.5% DM | 1.0% DM | SEM | P-Value |
|---|---|---|---|---|---|
| DMI, kg | 19.2 | 19.4 | 18.8 | 0.56 | 0.043 |
| Methane, L/d | 464.7 | 429.3 | 368.0 | 24.9 | <0.01 |
| Methane/DMI, L/kg | 24.3 | 22.1 | 19.7 | 1.11 | <0.01 |

5.15.3. Conclusion

A decrease in methane production is observed in dairy cows feed supplements comprising bromoform. An improvement in milk production of up to 10% is observed. Additionally, bromoform levels in the milk are less than or equal to 0.7 ppm. is found in milk.

5.16. Example 16. Impact of Sea-Gains Kelp Supplement on Methane Mitigation and Duration in Growing Steers As discussed in Example 8 above, enteric methane emission is reduced by greater than 97%. Due to the slow regeneration time of methanogens (i.e., the target of the kelp supplementation), it is likely that reduction in $CH_4$ is sustained after ceasing of kelp supplementation. This study examines residual effects of kelp supplementation on enteric $CH_4$ measures in cattle. Specifically, this study determines the duration of the inhibitory effects of kelp supplementation on methane production and yield in growing steers.

5.16.1. Materials and Methods 5.16.1.1. Animal Management

Twelve Holstein steers (approximately 350 kg) are used in a 17-d experiment which includes a gas collection period. Steers are adapted to the headboxes in 4 h increments until a 24 h stay has been achieved prior to the beginning of the first experimental period. Steers (n=4/trt) are blocked by body weight and assigned randomly to headbox and treatment. There are four headboxes and three treatments being tested, thus, the order of the duplicated treatment are randomized across the three periods. Treatments are randomized across headboxes. Treatments include, 0% (control), 0.5% of DM (low inclusion) and 1% of DM (high inclusion). The Sea-Gains test sample comprises a spray dry powder with dextrin, bromoform, soybean oil, and *Ascophyllum nodosum* kelp containing 0.21% w/w bromoform, for a target dose of 0, 0.2 and 0.4 mg bromoform/kg bw.

Each 17-d experimental period consists of a 10-d kelp supplementation period, followed by a 7-d residual period (no kelp supplementation). Prior to the experiment and when gas collection measures are not being collected, steers are housed indoors in individual pens. On day 8 of each experimental period, steers are moved into tie-stalls fitted with indirect calorimetry headboxes for up to 10 day of continuous measurement of respiratory gases ($CH_4$, $O_2$, and $CO_2$). Days 8-10 are used for measurements occurring during kelp supplementation and Days 11-17 represent residual measurements. If steers return to baseline for two consecutive days prior to the end of the 10-d period, they are moved back to individual pens.

5.16.1.2. Measurements of Gases

Enteric $CH_4$ and other expired gases are measured by placing steers heads through the shroud which is secured at the base of the neck. Each headbox is equipped with an air conditioning unit (control humidity and maintain temperature as close to ambient as possible), stainless steel feed bunks, and a continuous supply waterer. Collection and analysis of respired gases is made by continuous automated process. Airflow through the hood is adjusted to maintain a $CO_2$ concentration of 0.4-0.7 in the exhaust air. Airflow for each hood ranges between 0 and 2000 L/min, ensuring that airflow can be adjusted to maintain $CH_4$ and $CO_2$ at the desired concentration.

5.16.1.3. Diets and Feeding

Figure 20:
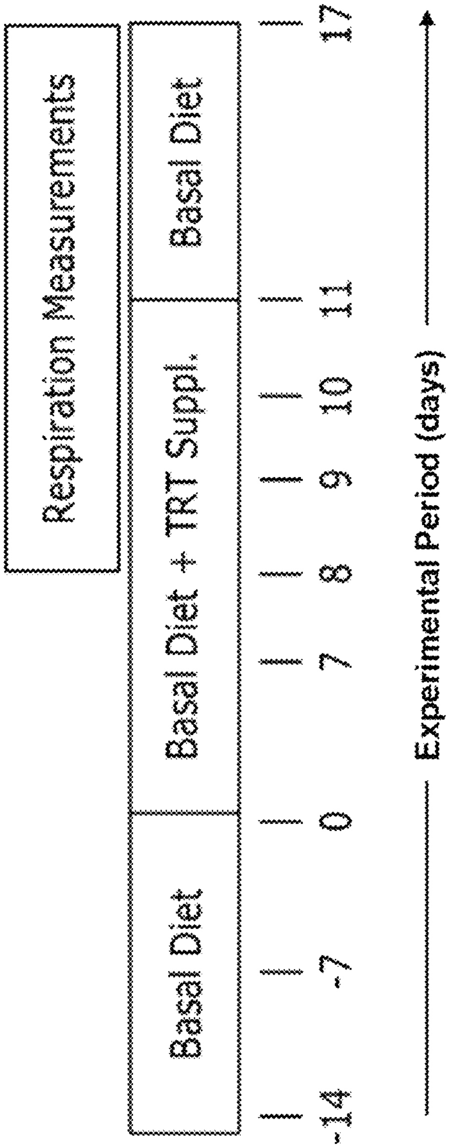
FIG. 20 illustrates the schedule for studying the impact of kelp supplement on methane mitigation and duration in growing steers.

Steers are adapted to a silage-based basal diet plus control supplement (0% kelp) for 14 d prior to the start of each experimental period (Table 24). On Days 0 through 10 of each period, steers receive the basal diet plus their appropriate treatment supplement, formulated to supply either 0.0, 0.5, or 1.0% kelp to the total ration (DM basis). Beginning on Day 11, and throughout the remaining portion of the experiment, all steers are once again switched to the control supplement in order to measure residual effects of treatment. Each supplement is then topdressed at a rate of 5% of the ration DM. Kelp supplement is prepared prior to the beginning of each experimental period by mixing kelp with a ground corn carrier and distillers dried grains in commercial stainless-steel chopper (Mandeville Company, Inc., Minneapolis, MN, USA) for 10 minutes until uniform distribution of kelp is achieved. Following mixing, topdress is stored at −20° C. in plastic containers (Rubbermaid Commercial Products, Sarasota Spring, NY, USA) with a plastic cover and snap on lid. Feed is supplied at 1.5-times the net energy requirement for maintenance to each animal and topdress is added to the corn-silage diet and hand mixed once per day at 0800 h. The diet ingredients are subsampled daily and composited weekly for DM analysis (55° C. forced air oven). For each collection, a 200 g sample is collected in duplicate, weighed, and dried for DM analysis. Feed refusals are collected daily, weighed, subsampled in duplicate (100-200 g per sample) and dried for DM analysis. Dry matter is determined by weighing samples daily until sample weight remains constant for two consecutive days. Values for refusals are used in calculations for dry matter intake. Animals are weighed on days −7 and d−1, weight for day −1 is used to set intake for each steer for the remaining experiment. FIG. 20 illustrates the schedule for studying the impact of kelp supplement on methane mitigation and duration in growing steers.

TABLE 24

| Ration and Top-dress Composition (DM Basis) | | | |
|---|---|---|---|
| | Kelp, % | | |
| | 0 | 0.5 | 1 |
| Ingredients | % DM Basis | | |
| Corn Silage | 50.0 | 50.0 | 50.0 |
| Cracked Corn | 20.0 | 20.0 | 20.0 |
| Soybean Meal-49 | 10.0 | 10.0 | 10.0 |
| UKARC Generic Supplement (no monensin) | 10.0 | 10.0 | 10.0 |
| Topdress | | | |
| Distillers Dried Grains | 5.0 | 5.0 | 5.0 |
| Ground Corn | 5.0 | 4.5 | 4.0 |
| Sea-Gains | 0.0 | 0.5 | 1.0 |
| Total | 100.0 | 100.0 | 100.0 |

NEm = 0.85 Mcal/lb (DM basis)
NEm = 1.87 Mcal/kg (DM basis)

5.16.2. Results

A 50% reduction in methane production is observed with the low inclusion diet (0.5% DM) and no methane is detectable methane in animals administered the high inclusion diet (1% DM). Table 25 shows results of animal health analysis assessed from urine and blood chemistry.

TABLE 25

| Animal health analysis | | | |
|---|---|---|---|
| | Results | | |
| Panel: Urinalysis | Control | 0.5% Additive | 1% Additive |
| Transparency[1] | Clear | Clear | Hazy |
| Color[1] | Dark Yellow | Yellow | Yellow |
| Urinalysis-Specific Gravity[2] | 1.048 | 1.028 | 1.032 |
| Urinalysis-pH | 9 | 9 | 9 |
| Urinalysis-Protein[3] | Trace | Negative | Negative |
| Urinalysis-Glucose[3] | Negative | Negative | Negative |
| Urinalysis-Ketone[3] | Negative | Negative | Negative |
| Urinalysis-Urobilinogen[3] | Normal | Normal | Normal |
| Urinalysis-Blood[3] | Negative | Negative | Negative |
| Urinalysis-Bilirubin[3] | Negative | Negative | Negative |
| Urinalysis-RBC[4] | — | — | Rare/hpf |
| Urinalysis-Crystals[4] | — | Triple Phosphate 3+ | Triple Phosphate Trace |
| Urinalysis-Epithelial[4] | 2+ | Trace | — |
| Urinalysis-Amorphous[4] | 1+ | — | — |
| Urinalysis-Bacteria[4] | 1+ | — | — |
| Urinalysis-Casts | Finely Granular Cast 1+ | — | — |
| Panel: Blood Chemistry (Reference Range) | Control | 0.5% Additive | 1% Additive |
| Sodium[3] (132-152 mmol/L) | 142 mmol/L | 139 mmol/L | 141 mmol/L |
| Potassium[3] (3.7-6 mmol/L) | 5.0 mmol/L | 5.0 mmol/L | 4.4 mmol/L |

TABLE 25-continued

| Animal health analysis | | | |
|---|---|---|---|
| | Results | | |
| Panel: Urinalysis | Control | 0.5% Additive | 1% Additive |
| Chloride[3] (91-111 mmol/L) | 100 mmol/L | 98 mmol/L | 98 mmol/L |
| $CO_2$[3] (21-32 mEq/L) | 30 mEq/L | 30 mEq/L | 33 mEq/L |
| Calcium[3] (8-11.5 mg/dL) | 9.9 mg/dL | 9.7 mg/dL | 9.9 mg/dL |
| Phosphorus[3] (3.5-8 mg/dL) | 8.6 mg/dL | 9.1 mg/dL | 7.1 mg/dL |
| Magnesium[3] (1.7-2.9 mg/dL) | 2.0 mg/dL | 2.3 mg/dL | 1.8 mg/dL |
| BUN[3] (5-27 mg/dL) | 7 mg/dL | 12 mg/dL | 8 mg/dL |
| Creatinine[3] (0.7-2 mg/dL) | 1.1 mg/dL | 1.1 mg/dL | 0.9 mg/dL |
| BUN/Creatinine Ratio[3] None | 6 mg/dL | 11 mg/dL | 9 mg/dL |
| Glucose[3] (40-108 mg/dL) | 79 mg/dL | 73 mg/dL | 78 mg/dL |
| Total Bilirubin[3] (0.1-0.8 mg/dL) | 0.2 mg/dL | 0.2 mg/dL | <0.2 mg/dL |
| Alkaline Phosphatase[3] (27-260 U/L) | 164 U/L | 149 U/L | 145 U/L |
| Creatine Kinase[3] (57-386) | 107 U/L | 161 U/L | 63 U/L |
| SGOT/AST[3] (40-150 U/L) | 58 U/L | 58 U/L | 51 U/L |
| Gamma GT[3] (2-30 U/L) | 11 U/L | 16 U/L | 24 U/L |
| Total Protein[3] (5.9-8.5 g/dL) | 6.3 g/dL | 7.0 g/dL | 5.7 g/dL |
| Albumin[3] (2.3-3.7 g/dL) | 3.2 g/dL | 3.2 g/dL | 3.0 g/dL |
| Globulin[5] (3-4.9 g/dL) | 3.1 g/dL | 3.8 g/dL | 2.7 g/dL |
| A/G Ratio[5] | 1 | 0.8 | 1.1 |

[1]Visual;
[2]Refractometer;
[3]Automated Instrument;
[4]Microscopic;
[5]Calculated

5.17. Example 17. Animal Safety Studies 1: Impact of Kelp Supplementation on Steer Feedlot Performance and Bromoform Residues in Tissues The objective of this study was to determine the effect of kelp supplementation on growth performance, feed intake, and accumulation of bromoform.

5.17.1. Materials and Methods 5.17.1.1. Animal Management

Twelve Angus steers (average initial bw 423.71±12.48 kg) were used in a 30-d feeding study to determine the effects of kelp supplementation on growth performance, intake, and the accumulation of bromoform. Prior to the beginning of the study, animals were adapted to ad libitum intake of an 80% concentrate basal diet for a minimum of 14 days. Steers were housed individually in partially covered pens equip with concrete feed bunks and automatic waterers which allow for ad libitum access to water. For the duration of the experiment animals were fed a corn silage-based diet ad libitum (Table 26).

TABLE 26

| Ration Composition | | | |
|---|---|---|---|
| | Treatments | | |
| | Control | Kelp | |
| | | 0.5% | 1.0% |
| | % DM basis | | |
| Basal Diet | | | |
| Corn Silage | 50.0 | 50.0 | 50.0 |
| Cracked Corn | 20.0 | 20.0 | 20.0 |
| Distillers Dried Grains | 15.0 | 15.0 | 15.0 |
| UKARC 105 | 10.0 | 10.0 | 10.0 |
| Topdress Supplement | | | |
| Ground Corn | 2.5 | 2.0 | 1.5 |
| Distillers Dried Grains | 2.5 | 2.5 | 2.5 |
| Kelp | 0.0 | 0.5 | 1.0 |

5.17.1.2 Experimental Design and Procedures

Steers were blocked (n=4 per block) by weight and assigned randomly to one of three treatments (n=3 per treatment). Dietary treatments (Table 27) consisted of either a ground corn carrier (Control) or a ground corn carrier including kelp (either 10 or 20% kelp). Each supplement was topdressed at a rate of 5% of ration DM in order to provide kelp at a rate of 0, 0.5, or 1% of the total ration DM. Kelp supplement was prepared prior to the first block. Following preparation, the topdress was stored at room temperature in sealed containers labeled with treatment dosage. Company supplied kelp was mixed with a ground corn carrier in commercial stainless-steel chopper (Mandeville Company, Inc., Minneapolis, MN, USA) for 10 minutes until uniform distribution of kelp was achieved. The control supplements were subjected to the same procedures to minimize differences in particle size. Topdress was pre-weighed into containers labeled with animal number and treatment level and stored at room temperature. Each supplement was added to the corn-silage based ration as a topdress and hand mixed once per day at 0800 h. Individual ingredients in the basal diet were sampled (500 g) weekly and analyzed for DM (duplicate 200-250 g samples at 55° C. in a forced air oven). Weekly DM determinations were used to adjust dietary ingredients and to calculate DM intake. Amount of feed offered were adjusted twice weekly to provide ad libitum with minimal amounts of feed refusals. Any feed refusals were collected weekly and weighed (duplicate 200-250 g samples at 55° C. in forced air oven) and analyzed for DM analysis.

Animals were weighed prior to morning feeding at the beginning of the feeding period (d0) and weighed. Following the 30-d feeding trial, steers were humanely harvested under USDA inspection. Following separation from the carcass, approximately 1 g (wet weight) samples from the liver, kidney, subcutaneous fat, and longissimus dorsi muscle at the 12th/13th rib interface were harvested using a biopsy needle (Bergström-Stille, Torshälla, Sweden). Tissues were placed into vials labeled with animal number and tissue type and then immediately placed into liquid nitrogen (−80 C). Animals were staggered started to accommodate scheduling conflicts. Following sample collection from the final block of animals, samples were frozen until further analysis. Bromoform in the samples were assessed using a modification of Paul et al. (2006). Briefly, samples were weighed and extracted in MeOH with 4 μg/mL naphthalene as an internal standard. The extraction volume was approximately 0.5 mL MeOH extractant/g sample, this ratio was established following extensive testing for extraction efficiency. The sample and MeOH extractant were then added into the GC-MS inserts and were bead-beat for 15 minutes (Retsch Mixer Mill MM40) at 30 Hz, with 2.0 mm Zirconia Oxide beads per sample. Next, samples were centrifuged for 15 minutes at 15,000 rpm. Samples were then transferred using a glass syringe into a separate GC-MS vial. MeOH extracts were quantified using GC-MS (Shimadzu QP2010 GC-MS, 30-meter RTX 502.2 column). 1 μL injections were performed with a split ratio of 20 with an inlet pressure of 8 psi. The injection port temperature was set to 200° C. and the interface temperature was 220° C. A selected ion monitoring mode (SIM) was used for ions m/z 173 and 128, with temperature program starting at 65° C. and immediately increasing to 220° C. at 30 C/min with a 3 min hold at 220° C. (total run time: 8.17 minutes). All other steps described in Paul et al. were used as such for finalizing sample bromoform quantification. Sample limits of detection were established for each of the tissues prior to quantification and are listed in Table 27.

TABLE 27

Effects of Kelp Treatment on Bromoform Residues in Organ, Adipose and Muscle Tissue Samples

| | Bromoform, μg/kg | LOD, μg/kg |
|---|---|---|
| Liver | <LOD | 8.5 |
| Kidney | <LOD | 9.1 |
| Adipose | <LOD | 3.7 |
| Muscle | <LOD | 4.4 |

5.17.1.3. Statistical Analysis

Data was analyzed using the MIXED procedure of SAS (SAS Institute, Cary, NC). Response variables included 1) intake, 2) Gain: Feed, 3) average daily gain, and 4) concentration of bromoform in the liver, kidney, subcutaneous fat, and longissimus dorsi muscle tissue. Significance was set at $P \leq 0.05$.

5.17.2. Results

Ad libitum intake of ration resulted in residual feed which were collected once weekly. Dry matter intake was not affected by treatment (P=0.252) (Table 27). When observed on a body weight basis, DMI was also not affected by treatment (P=0.530). Average daily gain (ADG) and gain: feed (G:F) were also not affected by treatment (P=0.687 and P=0.603) (Table 27). No bromoform residues were observed for any animal (Table 28).

TABLE 28

Effects of Kelp Treatment on Dry Matter Intake and Growth Performance Measures of Angus Steers During Experimental Period

| | Control | 0.50% | 1% | SE | p-value Trt | Linear | Quadratic |
|---|---|---|---|---|---|---|---|
| Initial BW, kg | 425 | 438 | 408 | 22.9 | 0.67 | 0.62 | 0.47 |
| DMI, kg | 9.34 | 10.57 | 8.04 | 0.888 | 0.25 | 0.35 | 0.13 |

TABLE 28-continued

Effects of Kelp Treatment on Dry Matter Intake and Growth Performance Measures of Angus Steers During Experimental Period

| | Control | 0.50% | 1% | SE | p-value Trt | Linear | Quadratic |
|---|---|---|---|---|---|---|---|
| DMI, kg/kg BW | 0.026 | 0.025 | 0.1122 | 0.028 | 0.53 | 0.55 | 0.30 |
| ADG, kg/d | 1.67 | 1.41 | 1.5303 | 0.18 | 0.55 | 0.60 | 0.41 |
| G:F, g/kg DMI | 150.5 | 148.2 | 163.5 | 16.3 | 0.82 | 0.60 | 0.67 |

[a] Data are presented as least squares means ± the standard error of the mean; n = 4 for control, n = 3 for 0.5% kelp treatment and n = 2 for 1% kelp treatment.

5.19. Example 19. Animal Safety Studies 3: Impact of Kelp Supplementation on Lactating Dairy Cattle This is a whole-animal energy balance study that determines the effects of Sea-Gains on methane production and animal safety in lactating Jersey cows.

5.19.1. Materials and Methods

5.19.1.1. Animal Management

Twelve lactating, open Jersey cows (previously trained for the headboxes) are used in 28 d periods. The Sea-Gains test sample comprises a spray dry powder with dextrin, bromoform, soybean oil, and *Ascophyllum nodosum* kelp. Treatments include, 0% (control), 0.5% of DM (low inclusion) and 1% of DM (high inclusion). The bromoform content of Sea-Gains is 0.29% (0.3 mg/kg bw for the 0.5% DM and 0.6 mg/kg bw for the 1% DM.

5.19.1.2. Measurements

Target animal performance and safety related measurements include, feed intake, milk production and composition, body weight, milk yield and composition, nitrogen (protein)/energy use, balance and utilization, total tract nutrient digestion, as well as heat production, tissue energy (gain or loss), digestible, metabolizable, and net energy intake. Additionally, the milk is tested for bromoform, milk fat, milk protein.

At the end of each treatment period, the following samples are collected to assess animal health:

(1) Blood Chemistry: Complete blood count, hemoglobin, WBC, platelets, packed cell volume (PCV), mean corpuscular volume (MCV), mean corpuscular hemoglobin concentration (MCHC), glucose, creatinine, total bilirubin, cholesterol, phosphorous, potassium, calcium, sodium, chloride, total protein, globulin, albumin, albumin/globulin ratio, CK, BUN, ALT, AST, LDH, alkaline phosphatase, and amylase. Serum magnesium, bile acids, gamma-glutamyl Transferase (GGT), and fibrinogen are also measured.

(2) Urinalysis: Urine pH, Specific gravity, Glucose, Protein, Ketones, Bilirubin, Urobilinogen, Microscopic examination.

5.19.2. Results

Animals consume 22.5 kg DM/kg bw/day. The bromoform content of Sea-Gains is 0.27%. The delivered bromoform doses are 0.3 mg/kg bw for the 0.5% Low inclusion and 0.6 mg/kg bw for the 1% high inclusion.

5.19.3. Conclusions

In conclusion, the examples presented in this disclosure support the following beneficial attributes of the compositions disclosed herein:

(i) In steer, bromoform intakes of 1.207 mg/kg bw for 14 days reduced methane levels to below detection limits.

(ii) In dairy cows (non-lactating), there was a 39% reduction in methane emissions with 1.70 mg bromoform/kg bw and 63% reduction with 2.55 mg bromoform/kg bw compared to the control diet after 21 days of feeding.

Figure 21A:
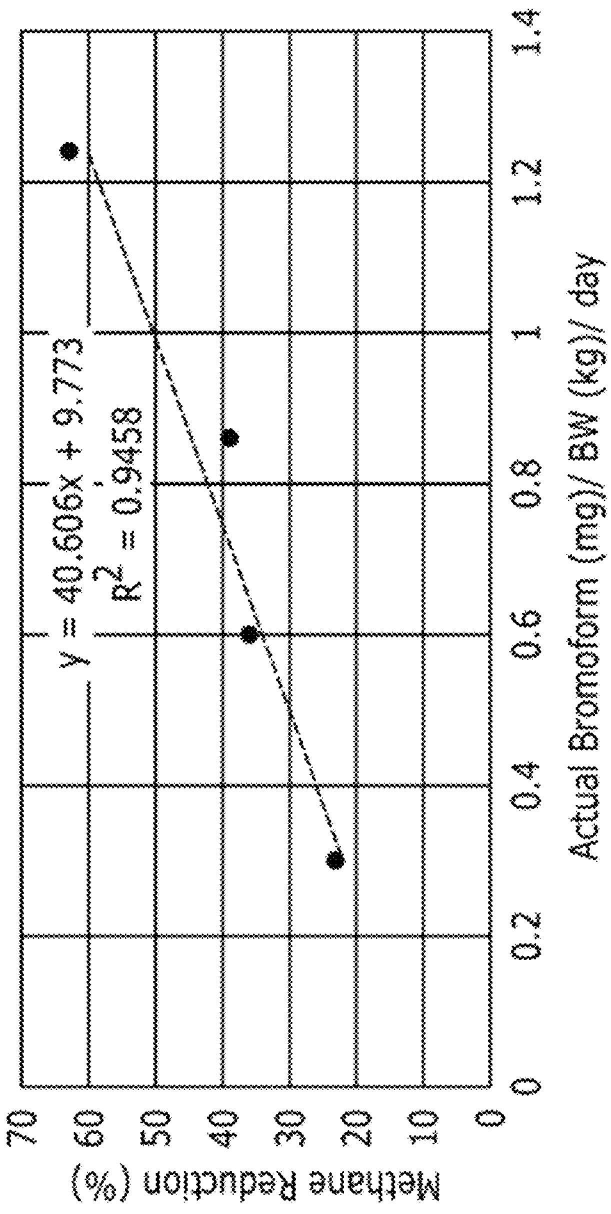
FIGS. 21A-21B illustrate linear models of methane reduction in cattle (beef steers and dairy cows).
Figure 21B:
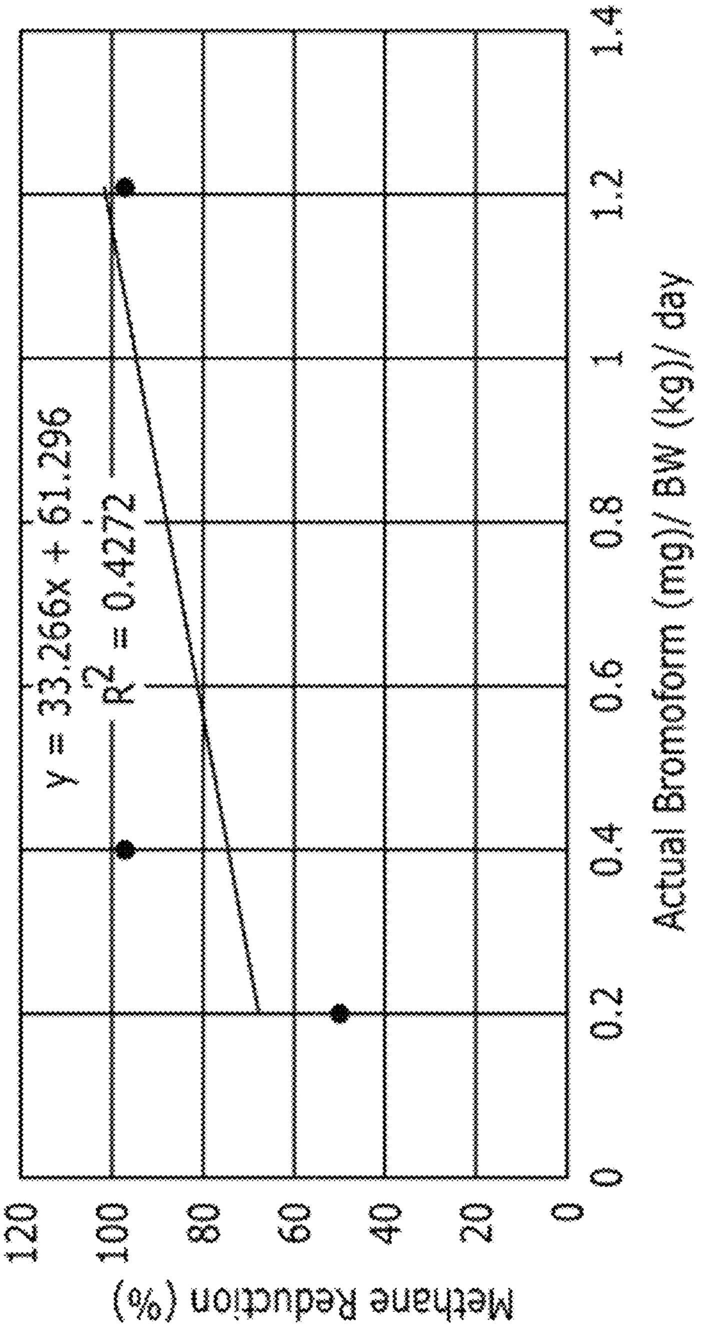

(iii) FIGS. 21A-21B illustrate linear models of methane reduction in cattle (beef steers and dairy cows). FIG. 21A shows methane reduction in dairy cows as a function of bromoform dosage. FIG. 21B shows methane reduction in beef steers as a function of bromoform dosage. Based on this model, it is expected that a dose of 0.2 to 0.6 mg bromoform/kg bw results in approximately 15% to approximately 40% reduction in methane for dairy cows and over 60-90% methane reductions in beef steers. The differences in methane reductions between dairy cattle and beef cattle are attributed to genetic differences, diet differences, diet intake differences, milk production, cattle breed-type, rumen size, and microbiomes, among others.

(iv) Dry matter intake (DMI) was not affected by treatment. When observed on a body weight basis, DMI was also not affected by treatment. The average daily gain (ADG) and gain: feed (G: F) were also not affected by treatment.

(v) No bromoform residues were observed for any animal.

5.20. Example 20. Bromoform Stability

This study uses degradable formulations comprising poly (lactic-co-glycolic acid) (PLGA) microspheres encapsulated with bromoform to determine the stability of bromoform encapsulation.

5.20.1. Formulations

Formulations were manufactured using either a microfluidic device, a fed batch process, or continuous flow processes.

5.20.1.1. Microfluidics Formulation Method.

A stock solution of bromoform and PLGA was prepared. PLGA from various manufacturers, including Resomer® R 202 H, Viatel® DL 02A, Viatel® DL 05A, or Revode 11a were used for this purpose. The PLGA/Bromoform solution ("dispersed phase") and a polyvinyl alcohol 85-120 kDa (PVA) continuous phase, were run through a microfluidic device to yield a solution containing bromoform encapsulated PLGA microspheres, which were evaporated, washed, and dried before use.

5.20.1.2. Feed Batch Method.

A stock solution of bromoform and PLGA was prepared. The PLGA/Bromoform solution ("dispersed phase") was mixed using a pump with a PVA continuous phase. The mixture was stirred, evaporated, washed, and dried to yield bromoform encapsulated PLGA microspheres.

5.20.1.3. Continuous Flow Processes.

A stock solution of bromoform and PLGA was prepared. The PLGA/Bromoform solution ("dispersed phase") was mixed with a PVA continuous phase using a continuous homogenizer, followed by passing the mixture through a continuous flow filter to yield bromoform encapsulated PLGA microspheres.

5.20.2. Bromoform Encapsulation

Figure 22A:
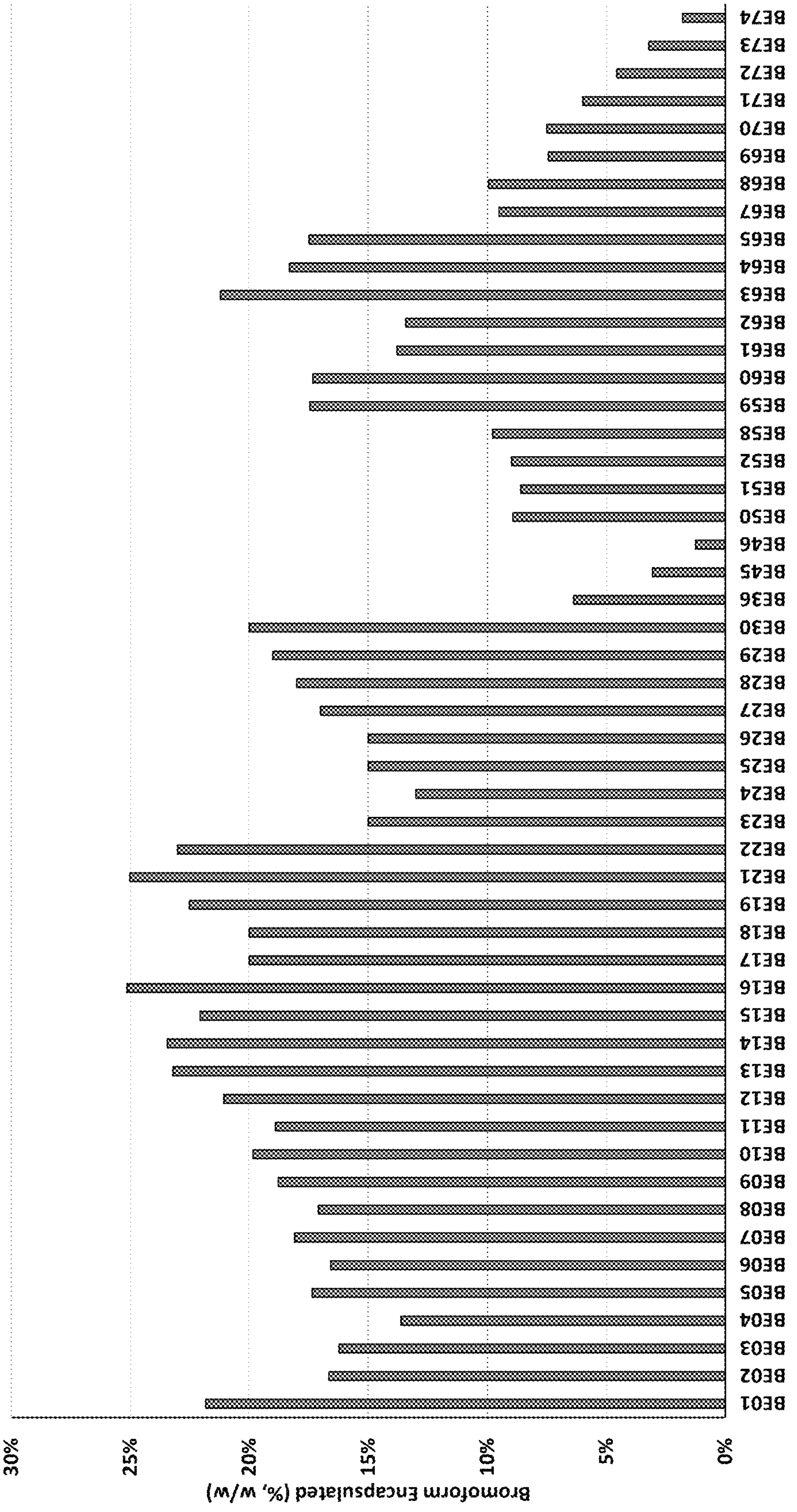
FIGS. 22A-22B illustrate the amount of bromoform encapsulated in poly(lactic-co-glycolic acid) (PLGA) microsphere carriers immediately after manufacture.
Figure 22B:
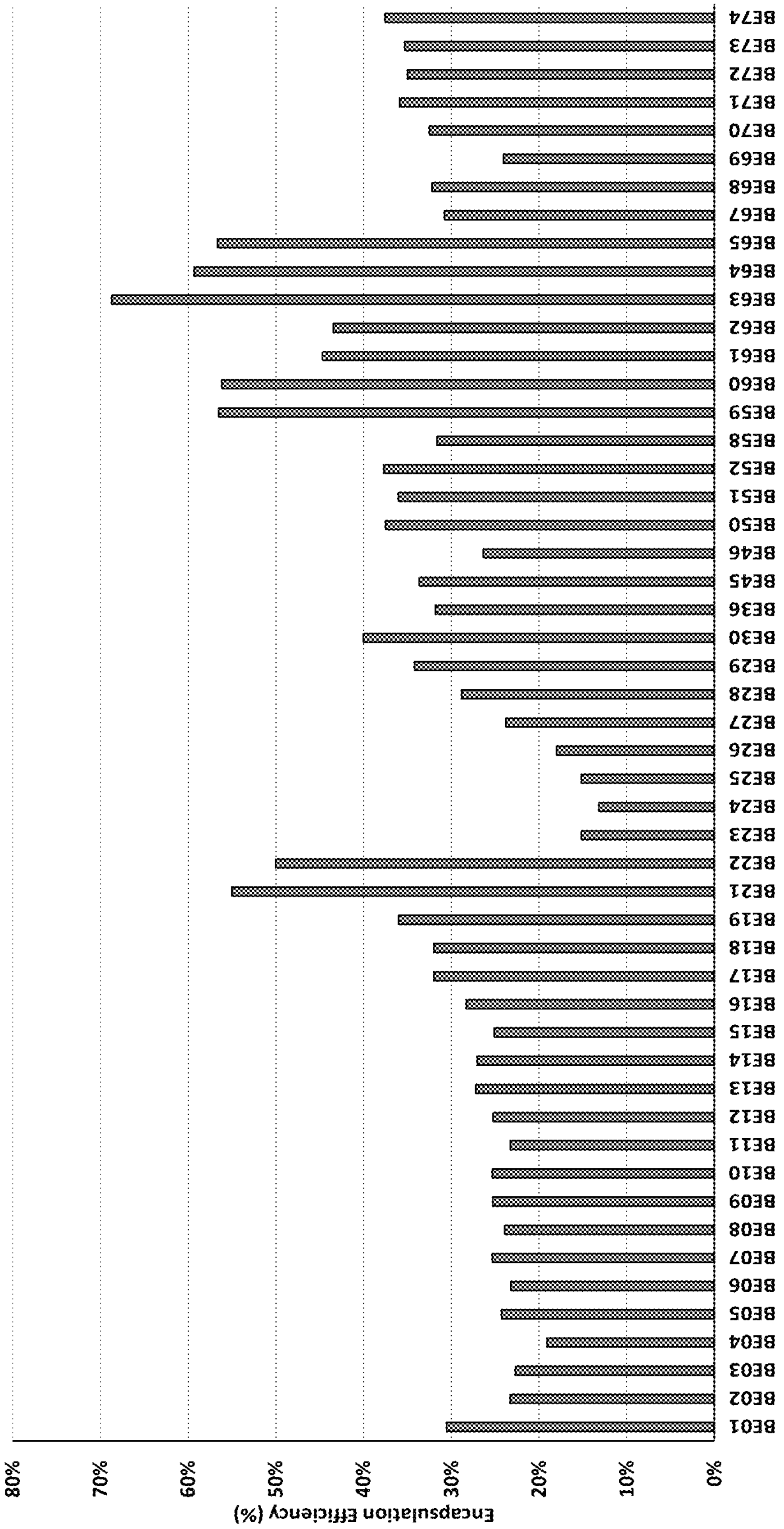

Table 29 shows the exemplary amounts of bromoform, PLGA and PVA used in preparing the various formulations. FIGS. 22A-22B are exemplary data showing for the amounts of bromoform encapsulated and encapsulation efficiency in the PLGA microspheres on day 0.

5.20.3. Stability Studies

Stability studies were performed to determine the loss of bromoform observed when these encapsulated microspheres were exposed to open air post-manufacture. Briefly, after exposing the bromoform encapsulated microspheres to open air at ambient temperature for 0 days, 5 days, 14 days, or 30 days, a portion of the sample was analyzed for bromoform content using GC-MS.

TABLE 29

Amounts of the various ingredients used to manufacture PLGA microspheres

| Formulation Code | PLGA Name | Dispersed Phase PLGA (mg) | Dispersed Phase Bromoform (mg) | Dispersed Phase Bromoform (ml) | Dispersed Phase Solvent Volume (ml) | Continuous Phase PVA % | Disperse Phase Flow Rate (ml/min) | Continuous Phase Flow Rate (ml/min) | Method |
|---|---|---|---|---|---|---|---|---|---|
| BE1 | Resomer ® R 202 H | 100 | 250.00 | 86.6 | 1500 | N | 1 | 15 | microfluidic flow |
| BE2 | Viatel ® DL 02A | 100 | 250.00 | 86.6 | 1500 | 2 | 1 | 15 | microfluidic flow |
| BE3 | Viatel ® DL 05A | 100 | 250.00 | 86.6 | 1500 | N | 1 | 15 | microfluidic flow |
| BE4 | Resomer ® R 202 H | 100 | 250.00 | 86.6 | 1500 | 2 | 1 | 15 | microfluidic flow |
| BE5 | Resomer ® R 202 H | 100 | 250.00 | 86.6 | 1500 | 2 | 1 | 15 | microfluidic flow |
| BE6 | Resomer ® R 202 H | 100 | 250.00 | 86.6 | 1500 | 2 | 1 | 15 | microfluidic flow |
| BE7 | Resomer ® R 202 H | 100 | 250.00 | 86.6 | 1500 | 2 | 2 | 15 | microfluidic flow |
| BE8 | Resomer ® R 202 H | 100 | 250.00 | 86.6 | 1500 | 2 | 0.75 | 15 | microfluidic flow |
| BE9 | Revode 11a | 100 | 289.00 | 100 | 1500 | 2 | 1 | 15 | microfluidic flow |
| BE10 | Revode 11a | 100 | 361.25 | 125 | 1500 | 2 | 1 | 15 | microfluidic flow |
| BE11 | Revode 11a | 100 | 433.50 | 150 | 1500 | 2 | 1 | 15 | microfluidic flow |
| BE12 | Revode 11a | 100 | 505.75 | 175 | 1500 | 2 | 1 | 15 | microfluidic flow |
| BE13 | Revode 11a | 100 | 578.00 | 200 | 1500 | 2 | 1 | 15 | microfluidic flow |
| BE14 | Revode 11a | 100 | 650.25 | 225 | 1500 | 2 | 1 | 15 | microfluidic flow |
| BE15 | Revode 11a | 100 | 722.50 | 250 | 1500 | 2 | 1 | 15 | microfluidic flow |
| BE16 | Revode 11a | 100 | 794.75 | 275 | 1500 | 2 | 1 | 15 | microfluidic flow |
| BE17 | Resomer ® R 202 H | 300 | 500.00 | 173.2 | 3000 | 1 | 1 | 12.5 | microfluidic flow |
| BE18 | Resomer ® R 202 H | 300 | 500.00 | 173.2 | 3000 | 3 | 1 | 12.5 | microfluidic flow |
| BE19 | Resomer ® R 202 H | 300 | 500.00 | 173.2 | 3000 | 4 | 1 | 12.5 | microfluidic flow |
| BE20 | Resomer ® R 202 H | 600 | 500.00 | 173.2 | 3000 | 1 | 1 | 12.5 | microfluidic flow |
| BE21 | Resomer ® R 202 H | 600 | 500.00 | 173.2 | 3000 | 3 | 1 | 12.5 | microfluidic flow |
| BE22 | Resomer ® R 202 H | 600 | 500.00 | 173.2 | 3000 | 4 | 1 | 12.5 | microfluidic flow |
| BE23 | Revode 11a | 100 | 8660.51 | 3000 | 0 | 2 | 1 | 12.5 | microfluidic flow |
| BE24 | Revode 11a | 100 | 8660.51 | 3000 | 0 | 2 | 2 | 12.5 | microfluidic flow |
| BE25 | Revode 11a | 100 | 8660.51 | 3000 | 0 | 2 | 3 | 12.5 | microfluidic flow |
| BE26 | Revode 11a | 100 | 500.00 | 173.2 | 3000 | 4 | 1 | 12.5 | microfluidic flow |
| BE27 | Revode 11a | 200 | 500.00 | 173.2 | 3000 | 4 | 1 | 12.5 | microfluidic flow |
| BE28 | Revode 11a | 300 | 500.00 | 173.2 | 3000 | 4 | 1 | 12.5 | microfluidic flow |
| BE29 | Revode 11a | 400 | 500.00 | 173.2 | 3000 | 4 | 1 | 12.5 | microfluidic flow |
| BE30 | Revode 11a | 500 | 500.00 | 173.2 | 3000 | 4 | 1 | 12.5 | microfluidic flow |

TABLE 29-continued

Amounts of the various ingredients used to manufacture PLGA microspheres

| Formulation Code | PLGA Name | Dispersed Phase PLGA (mg) | Dispersed Phase Bromoform (mg) | Dispersed Phase Bromoform (ml) | Dispersed Phase Solvent Volume (ml) | Continuous Phase PVA % | Disperse Phase Flow Rate (ml/min) | Continuous Phase Flow Rate (ml/min) | Method |
|---|---|---|---|---|---|---|---|---|---|
| BE31 | Revode 11a | 600 | 500.00 | 173.2 | 3000 | 4 | 1 | 12.5 | microfluidic flow |
| BE32 | Revode 11a | 700 | 500.00 | 173.2 | 3000 | 4 | 1 | 12.5 | microfluidic flow |
| BE33 | Revode 11a | 800 | 500.00 | 173.2 | 3000 | 4 | 1 | 12.5 | microfluidic flow |
| BE34 | Revode 11a | 250 | 250.00 | 86.6 | 1500 | 2 | 1 | 12.5 | microfluidic flow |
| BE35 | Revode 11a | 250 | 125.00 | 43.3 | 1500 | 2 | 1 | 12.5 | microfluidic flow |
| BE36 | Revode 11a | 250 | 62.50 | 21.65 | 1500 | 2 | 1 | 12.5 | microfluidic flow |
| BE37 | Revode 11a | 250 | 250.00 | 86.6 | 1500 | 2 | 2 | 12.5 | microfluidic flow |
| BE38 | Revode 11a | 250 | 125.00 | 43.3 | 1500 | 2 | 2 | 12.5 | microfluidic flow |
| BE39 | Revode 11a | 250 | 75.00 | 21.65 | 1500 | 2 | 2 | 12.5 | microfluidic flow |
| BE40 | Revode 11a | 250 | 250.00 | 86.6 | 1500 | 2 | 4 | 12.5 | microfluidic flow |
| BE41 | Revode 11a | 250 | 125.00 | 43.3 | 1500 | 2 | 4 | 12.5 | microfluidic flow |
| BE42 | Revode 11a | 250 | 75.00 | 21.65 | 1500 | 2 | 4 | 12.5 | microfluidic flow |
| BE43 | Revode 11a | 250 | 250.00 | 86.6 | 1500 | 1 | 2 | 12.5 | microfluidic flow |
| BE44 | Revode 11a | 200 | 40.00 | 13.84 | 1400 | 2 | 1 | 12.5 | microfluidic flow |
| BE45 | Revode 11a | 200 | 20.00 | 6.92 | 1400 | 2 | 1 | 12.5 | microfluidic flow |
| BE46 | Revode 11a | 200 | 10.00 | 3.46 | 1400 | 2 | 1 | 12.5 | microfluidic flow |
| BE47 | Revode 11a | 200 | 62.50 | 21.65 | 1400 | 2 | 0.8 | 12.5 | microfluidic flow |
| BE48 | Revode 11a | 200 | 62.50 | 21.65 | 1400 | 2 | 0.65 | 12.5 | microfluidic flow |
| BE49 | Revode 11a | 200 | 62.50 | 21.65 | 1400 | 2 | 0.5 | 12.5 | microfluidic flow |
| BE50 | Revode 11a | 200 | 62.50 | 21.65 | 1400 | 2.5 | 1 | 12.5 | microfluidic flow |
| BE51 | Revode 11a | 200 | 62.50 | 21.65 | 1400 | 3 | 1 | 12.5 | microfluidic flow |
| BE52 | Revode 11a | 200 | 62.50 | 21.65 | 1400 | 4 | 1 | 12.5 | microfluidic flow |
| BE58 | Revode 11a | 420 | 187.5 | 64.95 | 4200 | 2 | 1 | NA | batch homogenizer |
| BE59 | Revode 11a | 420 | 187.5 | 64.95 | 4200 | 1 | 1 | NA | batch homogenizer |
| BE60 | Revode 11a | 420 | 187.5 | 64.95 | 4200 | 2 | 1 | NA | batch homogenizer |
| BE61 | Revode 11a | 420 | 187.5 | 64.95 | 4200 | 3 | 1 | NA | batch homogenizer |
| BE62 | Revode 11a | 420 | 187.5 | 64.95 | 4200 | 4 | 1 | NA | batch homogenizer |
| BE63 | Revode 11a | 420 | 187.5 | 64.95 | 4200 | 2 | 1 | NA | batch homogenizer |
| BE64 | Revode 11a | 420 | 187.5 | 64.95 | 4200 | 2 | 1 | NA | batch homogenizer |
| BE65 | Revode 11a | 420 | 187.5 | 64.95 | 4200 | 2 | 1 | NA | batch homogenizer |
| BE66 | Revode 11a | 420 | 187.5 | 64.95 | 4200 | 2 | 1 | NA | batch homogenizer |
| BE67 | Revode 11a | 500 | 223.2 | 77.23 | 5000 | 2 | NA | NA | batch homogenizer |
| BE68 | Revode 11a | 500 | 223.2 | 77.23 | 5000 | 2 | NA | NA | batch homogenizer |
| BE69 | Revode 11a | 500 | 223.2 | 77.23 | 5000 | 2 | NA | NA | batch homogenizer |
| BE70 | Revode 11a | 500 | 150 | 51.9 | 5000 | 2 | NA | NA | batch homogenizer |
| BE71 | Revode 11a | 500 | 100 | 34.6 | 5000 | 2 | NA | NA | batch homogenizer |

TABLE 29-continued

Amounts of the various ingredients used to manufacture PLGA microspheres

| Formulation Code | PLGA Name | Dispersed Phase PLGA (mg) | Dispersed Phase Bromoform (mg) | Dispersed Phase Bromoform (ml) | Dispersed Phase Solvent Volume (ml) | Continuous Phase PVA % | Disperse Phase Flow Rate (ml/min) | Continuous Phase Flow Rate (ml/min) | Method |
|---|---|---|---|---|---|---|---|---|---|
| BE72 | Revode 11a | 500 | 75 | 25.95 | 5000 | 2 | NA | NA | batch homogenizer |
| BE73 | Revode 11a | 500 | 50 | 17.3 | 5000 | 2 | NA | NA | batch homogenizer |
| BE74 | Revode 11a | 500 | 25 | 8.65 | 5000 | 2 | NA | NA | batch homogenizer |

GC-MS. The sample was weighed and mixed with acetonitrile at 5 mg/mL. The mixture was shaken, sonicated for about 1 min, incubated at 4° C. overnight, followed by centrifugation to sediment the microspheres. Bromoform concentration in the acetonitrile phase was determined by GC-MS. GC-MS was performed using an AutoSpec Premier Mass Spectrometer (Waters, Milford, MA), equipped with an Agilent 7890A gas chromatograph (Agilent Technology, Santa Clara, CA; Column: DB-WAX, 30 m×0.25 mm×0.25 µm. Inlet temperature, 250° C.; He gas; Oven program; 40° C. for 2 min; 40 C/min to 90° C., at 2 C/min; 90° C. to 240° C. at 25 C/min; hold at 250° C. for 3 min; total run time 36 min; Splitless injection; Mass range, 50-400 m/z), CTC Combi PAL autosampler (CTC Analytics, Switzerland, 4 µL of liquid sample), an electron impact ion source and MassLynx software. The ion at m/z 173 from bromoform and ion at m/z 128 from naphthalene were used for quantitation analysis.

5.20.4. Results

FIG. 22A shows the amount of bromoform encapsulated on day 0. FIG. 22B shows efficiency of encapsulation for bromoform in PLGA microspheres. Encapsulation efficiency was calculated using Equation II.

$$\text{Efficiency} = 100 \times \frac{\text{bromoform measured at day 0}}{\text{bromoform input prior to manufacture.}} \qquad \text{II}$$

Figure 23A:
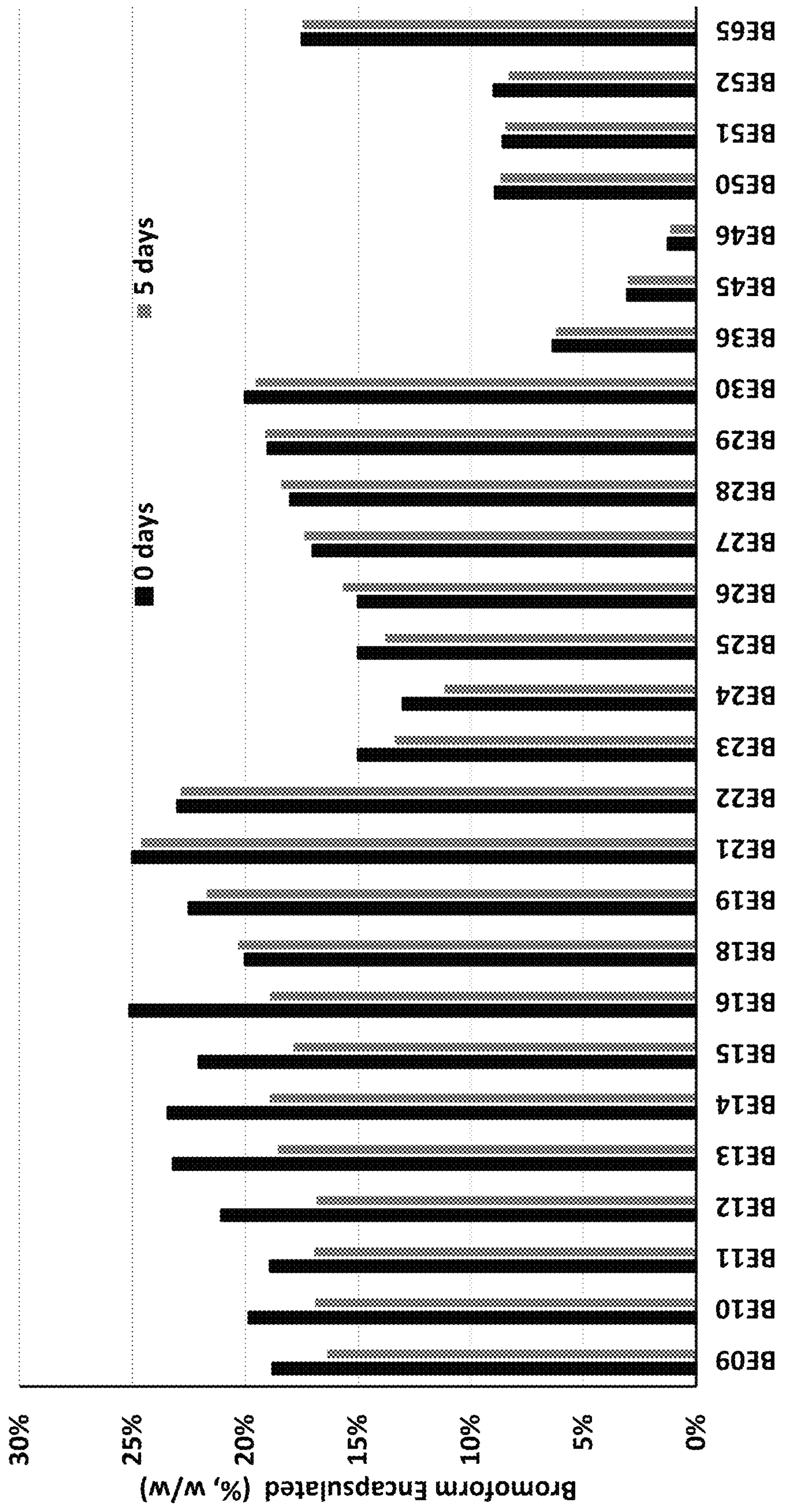
FIGS. 23A-23B illustrate the amount of bromoform encapsulated in PLGA microsphere carriers after exposure to air at ambient temperatures for different time intervals.
Figure 23B:
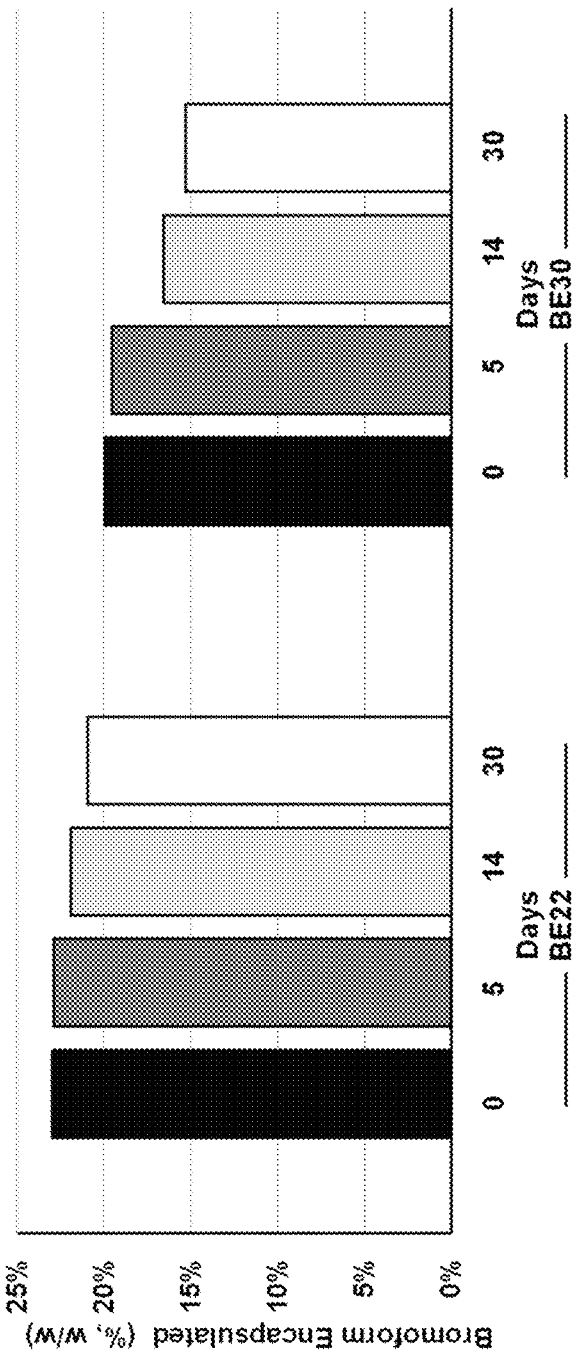

FIGS. 23A-23B illustrate the amount of bromoform encapsulated in PLGA microsphere carriers after exposure to air at ambient temperatures for different time intervals. The data shows that the formulations have long-term stability for up to 30 days. Specifically formulation BE22 shows a 91% retention of bromoform and formulation BE30 shows a 75% retention of bromoform in PLGA microspheres after exposure to air at ambient temperatures for 30 days.

6. MISCELLANEOUS

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All references, issued patents, and patent applications cited within the body of the instant specification are hereby incorporated by reference in their entirety.

7. BIBLIOGRAPHY

1. Abbott D W, Aasen I M, Beauchemin K A, Grondahl F, Gruninger R. Hayes M, Huws S, Kenny D A, Krizsan S J, Kirwan S F, Lind V. Meyer U. Ramin M. Theodoridou K, von Soosten D, Walsh P J, Waters S, Xing X. (2020). Seaweed and Seaweed Bioactives for Mitigation of Enteric Methane: Challenges and Opportunities. Animals (Basel). 10 (12): 2432. doi: 10.3390/ani10122432.
2. Abbott, I. A. The uses of seaweed as food in Hawaii. Econ. Bot. (1978), 32, 409-412.
3. Bowman, F., J. F. Borzelleca, and A. E. Munson. (1978). The toxicity of some halomethanes in mice. Toxicol. Appl. Pharmacol. 44 (1): 213-215.
4. Bryant M A. (2014). Bromoform. In: Encyclopedia of Toxicology, Volume 1
5. Camus, C., Infante, J. and Buschmann, A. H. (2018). Overview of 3 year precommercial seafarming of *Macrocystis pyrifera* along the Chilean coast. Rev Aquacult, 10:543-559.
6. Carpenter, L. J., and Liss, P. S. (2000). On temperate sources of bromoform and other reactive organic bromine gases, J. Geophys. Res., 105 (D16), 20539-20547. doi: 10.1029/2000JD900242.
7. Chemsafety Pro. (2013) . . . n-Octanol/Water Partition Coefficient (Kow/logKow).
8. Chu, I., V. Secours, I. Marino, and D. C. Villeneuve. (1980). The acute toxicity of four trihalomethanes in male and female rats. Toxicol. Appl. Pharmacol. 52 (2): 351-353.
9. Cieslak A. Szumacher-Strabel M, Stochmal A, Oleszek W. (2013). Plant components with specific activities against rumen methanogens. Animal. Jun; 7 Suppl 2:253-65. doi: 10.1017/S1751731113000852. PMID: 23739468.

10. Denman S. E., N. W. Tomkins, C. S. McSweeney, (2007). Quantitation and diversity analysis of ruminal methanogenic populations in response to the antimethanogenic compound bromochloromethane, FEMS Microbiol. Ecol. 62 313-322.

11. Dittmann M. T., K. J. Hammond, P. Kirton, D. J. Humphries, L. A. Crompton, S. Ortmann, T. H. Misselbrook, K.-H. Südekum, A. Schwarm, M. Kreuzer, C. K. Reynolds, M. Clauss, (2016). Influence of ruminal methane on digesta retention and digestive physiology in non-lactating dairy cattle, Br. J. Nutr. 116, 763-773

12. EFSA (FEEDAP Panel-EFSA Panel on additives and products or substances used in animal feed), Rychen G, Aquilina G, Azimonti G, Bampidis V, Bastos M L, Bories G, Chesson A, Cocconcelli P S, Flachowsky G, Gropp J, Kolar B, Kouba M, Lopez-Alonso M, L opez Puente S, Mantovani A, Mayo B, Ramos F, Saarela M, Villa R E, Wallace R J, Wester P, Anguita M, Galobart J, Innocenti M L and Martino L, (2017). Guidance on the assessment of the safety of feed additives for the target species. EFSA Journal 2017; 15 (10): 5021, 19 pp.

13. EPA. (2000). Hazard Summary for Bromoform. (Summary created in April 1992, updated in January 2000).

14. EPA. (2005). Drinking Water Criteria Document for Brominated Trihalomethanes. Document number EPA-822-R-05-011

15. EPA. (2016). EPA Protocol for the Third Review of Existing National Primary Drinking Water Regulations. Document Number: EPA 810-R-16-007

16. FAO. (2017). Livestock solutions for climate change.

17. Flynn, A. (2014). Farmed Seaweed. Monterrey Bay Aquarium Seafood Watch.

18. Glasson C R K, Robert D. Kinley, Rocky de Nys, Nick King, Serean L. Adams, Michael A. Packer, Johan Svenson, Charles T. Eason, Marie Magnusson, (2022). Benefits and risks of including the bromoform containing seaweed *Asparagopsis* in feed for the reduction of methane production from ruminants, Algal Research, 64, 102673, ISSN 2211-9264.

19. Goering and Van Soest (1970). Forage Fiber Analyses, Agriculture Handbook 379, U.S. Department Of Agriculture.

20. Hofbauer, W. K. (2021). Toxic or Otherwise Harmful Algae and the Built Environment. Toxins, 13, 465. doi.org/10.3390/toxins13070465

21. Hurd, C., Harrison, P., Bischof, K., & Lobban, C. (2014). Seaweed Ecology and Physiology (2nd ed.). Cambridge: Cambridge University Press. doi: 10.1017/CBO9781139192637

22. IARC (International Agency for Research on Cancer). Working Group on the Evaluation of Carcinogenic Risks to Humans. Re-evaluation of Some Organic Chemicals, Hydrazine and Hydrogen Peroxide. Lyon (FR): 1999. IARC Monographs on the Evaluation of Carcinogenic Risks to Humans, No. 71

23. Johnson E. D., A. S. Wood, J. B. Stone, E. T. Moran Jr., (1972). Some effects of methane inhibition in ruminants (steers), Can. J. Animal. Sci. 52, 703-712

24. Kinley, R. D., G. Martinez-Fernandez, M. K. Matthews, R. de Nys, M. Magnusson, and N. W. Tomkins, (2020). Mitigating the carbon footprint and improving productivity of ruminant livestock agriculture using a red seaweed. Journal of Cleaner Production 259:120836.

25. Knight T., R. S. Ronimus, D. Dey, C. Tootill, G. Naylor, P. Evans, G. Molano, A. Smith, M. Tavendale, C. S. Pinares-Patino, ~ H. Clark, (2011). Chloroform decreases rumen methanogenesis and methanogen populations without altering rumen function in cattle, Anim. Feed Sci. Technol. 166-167, 101-112

26. Koontz, A., S. El-Kadi, D. Harmon, E. Vanzant, J. Matthews, J. Boling, and K. McLeod. (2010). Effect of ractopamine on whole body and splanchnic energy metabolism in Holstein steers. Canadian journal of animal science 90 (1): 77-85.

27. Kraan, S.; Barrington, K. A. (2005). Commercial farming of *Asparagopsis armata* (Bonnemaisoniceae, Rhodophyta) in Ireland, maintenance of an introduced species? J. Appl. Phycol., 17, 103-110.

28. Laturnus F, Teresia Svensson and Christian Wiencke, (2010). Release of reactive organic halogens by the brown macroalga *Saccharina latissima* after exposure to ultraviolet radiation, Polar Research, (29), 3, 379-384.

29. Lean I J, Golder H M, Grant T M D, Moate P J, (2021). A meta-analysis of effects of dietary seaweed on beef and dairy cattle performance and methane yield. PLOS ONE 16 (7): e0249053.

30. Lorenna Machado, Marie Magnusson, Nicholas A. Paul, Robert Kinley, Rocky de Nys, Nigel Tomkins. (2016). Identification of bioactives from the red seaweed *Asparagopsis taxiformis* that promote antimethanogenic activity in vitro J Appl Phycol, 28:3117-3126.DOI 10.1007/s10811-016-0830-7

31. Machado L, Marie Magnusson, Nicholas A. Paul, Robert Kinley, Rocky de Nys, Nigel Tomkins. (2016). Identification of bioactives from the red seaweed *Asparagopsis taxiformis* that promote antimethanogenic activity in vitro J Appl Phycol, 28:3117-3126 DOI 10.1007/s10811-016-0830-7

32. Makkar, H P S, Tran G, Heuzé V, Giger-Reverdin S, Lessire M, Lebas, F Ankers P, (2016). Seaweeds for livestock diets: A review, Animal Feed Science and Technology, 212, 1-17.

33. Martinez-Fernandez G., S. E. Denman, C. Yang. J. Cheung, M. Mitsumori, C. S. McSweeney, (2016). Methane inhibition alters the microbial community, hydrogen flow, and fermentation response in the rumen of cattle, Front. Microbiol. 7.

34. Martinez-Fernandez G., S. E. Denman, J. Cheung, C. S. McSweeney, (2017). Phloroglucinol degradation in the rumen promotes the capture of excess hydrogen generated from methanogenesis inhibition, Frontiers Microbiol. 8, 1871-1871.

35. Min B R. David Parker, David Brauer, Heidi Waldrip, Catherine Lockard, Kristin Hales, Alexia Akbay, Simona Augyte, (2021). The role of seaweed as a potential dietary supplementation for enteric methane mitigation in ruminants: Challenges and opportunities, Animal Nutrition, 7(4), 1371-1387, ISSN 2405-6545.

36. Morris, D. L., and P. J. Kononoff, (2021). Dietary fatty acid and starch content and supplemental lysine supply affect energy and nitrogen utilization in lactating Jersey cows. Journal of Dairy Science 104: 10753'10779. doi: 10.3168/jds.2020-20055.

37. Muizelaar W. Groot M, van Duinkerken G, Peters R, Dijkstra J. (2021). Safety and Transfer Study: Transfer of Bromoform Present in *Asparagopsis taxiformis* to Milk and Urine of Lactating Dairy Cows. Foods, 10(3): 584. doi: 10.3390/foods 10030584.

38. National Research Council (NRC). (2000). Nutrient Requirements of Beef Cattle: Seventh Revised Edition: Washington, D C: The National Academies Press.

39. Niu. M., J. A. D. R. N. Appuhamy, A. Leytem, R. Dungan and E. Kebreab. (2016). Effect of dietary crude protein and forage contents on enteric methane emissions and nitrogen excretion from dairy cows simultaneously. Anim. Prod. Sci. 56:312-321.

40. Nørskov, N. P.; Bruhn, A.; Cole, A.; Nielsen, M. O. (2021). Targeted and Untargeted Metabolic Profiling to Discover Bioactive Compounds in Seaweeds and Hemp Using Gas and Liquid Chromatography-Mass Spectrometry. Metabolites, 11, 259.

41. NRC, National Research Council, (2001). Nutrient Requirements of Dairy Cattle, seventh ed. Natl. Acad. Press, Washington DC, USA 42. NTP, National Toxicology Program. (1989). NTP Technical Report On The Toxicology And Carcinogenesis Studies Of Tribromomethane (Bromoform) (Cas No. 75-25-2) In F344/N Rats and B6C3F1 Mice. NIH Publication No. 89-2806.

43. Paul N. A. de Nys R., Steinber P. D., (2016). Chemical defense against bacteria in the red alga *Asparagopsis armata*: linking structure with function, 2006, 306, 87-101.

44. Pereira, Leonel. Edible Seaweeds of the World. 10.1201/b19970.

45. Pizzolla, P. F (2008). Mastocarpus stellatus False Irish moss. In Tyler-Walters H. and Hiscock K. Marine Life Information Network: Biology and Sensitivity Key Information Reviews, Plymouth: Marine Biological Association of the United Kingdom.

46. Ponte, J. M. S.; Seca, A. M. L.; Barreto, M. C. (2022). *Asparagopsis* Genus: What We Really Know About Its Biological Activities and ChemicalComposition. Molecules, 27, 1787.

47. Preskitt, L. University of Hawaii, Botany Department (2002).

48. Roleda M Y, Heesch S. (2021). Chemical profiling of *Ulva* species for food applications: What is in a name? Food Chemistry, 361, 130084, ISSN 0308-8146.

49. Roque B. M., J. K. Salwen, R. Kinley, E. Kebreab, (2019). Inclusion of *Asparagopsis armata* in lactating dairy cows' diet reduces enteric methane emission by over 50 percent, J. Clean. Prod. 234, 132-138.

50. Roque, B. M., M. Venegas, R. D. Kinley, R. de Nys, T. L. Duarte, X. Yang, and E. Kebreab. (2021). Red seaweed (*Asparagopsis taxiformis*) supplementation reduces enteric methane by 80 percent in beef steers. PLOS ONE 16 (3): e0247820.

51. Santos S A, Vilela C, Freire C S, Abreu M H, Rocha S M, Silvestre A J. (2015). Chlorophyta and Rhodophyta macroalgae: a source of health promoting phytochemicals. Food Chem., 183:122-8. doi: 10.1016/j.foodchem.2015.03.006. Epub 2015 Mar. 11. PMID: 25863619.

52. Stefenoni H A, Räisänen S E, Cueva S F, Wasson D E, Lage C F A, Melgar A, Fetter M E, Smith P. Hennessy M, Vecchiarelli B, Bender J, Pitta D, Cantrell C L, Yarish C, Hristov A N. (2021). Effects of the macroalga *Asparagopsis taxiformis* and oregano leaves on methane emission, rumen fermentation, and lactational performance of dairy cows. J Dairy Sci., 104 (4): 4157-4173. doi: 10.3168/jds.2020-19686. Epub 2021 Jan. 28

53. Tomkins N. W., S. M. Colegate, R. A. Hunter, (2009). A bromochloromethane formulation reduces enteric methanogenesis in cattle fed grain-based diets, Anim. Prod. Sci. 49, 1053-1058.

54. Utley, W S. (2005). Bromoform. In: Encyclopedia of Toxicology (Second Edition).

55. Vijn, B. M., H. J Van Lingen, H. Vrancken, and E. Kebreab. (2019). Effect of Mootral—a garlic- and citrus-extract-based feed additive-on enteric methane emissions in feedlot cattle. Translational Animal Science, 3 (4): 1383-1388.

56. Vijn, S., D. P. Compart, N. Dutta, A. Foukis, M. Hess, A. N. Hristov, K. F. Kalscheur, E. Kebreab, S. V. Nuzhdin, and N. N. Price. (2020). Key considerations for the use of seaweed to reduce enteric methane emissions from cattle. Frontiers in Veterinary Science: 1135.

57. WHO, World Health Organization. (2022). Guidelines for drinking-water quality.

58. Wood J, Kennedy F S, Wolfe R (1968). Reaction of multihalogenated hydrocarbons with free and bound reduced vitamin B12. Biochemistry 7:1707-1713

59. Xu M, Rinker M, McLeod K R et al. (2010). *Yucca schidigera* extract decreases in vitro methane production in a variety of forages and diets. Animal Feed Science and Technology 159 18-26.

60. Zimmerman, P. S. Zimmerman, S. Utsumi, D. Beede. (2011). Development of a user-friendly online system to quantitatively measure metabolic gas fluxes from ruminants. J. Dairy Sci., 94 (E-Suppl. 1) (2011), p. 760 (Abstract).

What is claimed is:

1. A feed supplement for reducing enteric methane emissions comprising:

a formulation comprising at least one methanogenesis inhibitor encapsulated in a biologically acceptable carrier;

a substrate; and a binder;

wherein the substrate is an algae, and wherein the methanogenesis inhibitor is an exogenous methanogenesis inhibitor not derived from the algae.

2. The feed supplement of claim 1, wherein the methanogenesis inhibitor is an organohalide or a salt thereof.

3. The feed supplement of claim 2, wherein the organohalide salt has a formula $(X_3C—)_aY+$; and wherein:

X is a halide selected from bromine, chlorine, or iodine; and

Y is an inorganic cation, wherein:

when a=1, Y is an inorganic monovalent cation;

when a=2, Y is an inorganic bivalent cation; and when a=3, Y is an inorganic trivalent cation.

4. The feed supplement of claim 3, wherein the organohalide salt is $(Br_3C—)$ Na+ or $(Br_3C—)$ K+.

5. The feed supplement of claim 2, wherein the organohalide is a haloform selected from a group consisting of: bromoform, chloroform, derivatives thereof, and combinations thereof.

6. The feed supplement of claim 5, wherein the haloform is present in the feed supplement at a concentration from approximately 10% w/w to approximately 30% w/w.

7. The feed supplement of claim 5, wherein the haloform and the carrier are present in a ratio from approximately 0.1:1 to approximately 100:1.

8. The feed supplement of claim 1, further comprising:

an essential oil, an antibiotic, an ionophore, a saponin, a tannin, a terpene, 3-Nitrooxypropanol, propylene glycol, fumaric acid, a green tea extract, a grape pomace, a garlic and citrus extract, a Biochar, a dried yeast, a probiotic, a fiber, a prebiotic, or a combination thereof.

9. The feed supplement of claim 8, wherein the essential oil comprises one or more of oregano oil, lemongrass oil, garlic oil, cinnamon oil, *eucalyptus* oil, clove oil, rosemary oil, thyme oil, paprika oil, juniper oil, ginger oil, lavender oil, lemon oil, or peppermint oil.

10. The feed supplement of claim 8, wherein the ionophore comprises one or more of monensin, lasalocid, salinomycin, or laidlomycin.

11. The feed supplement of claim 8, wherein the probiotic comprises one or more of a methane oxidizing bacteria, a propionic acid producing bacteria, an acetic acid producing bacteria, or a butyric acid producing bacteria.

12. The feed supplement of claim 8, wherein the prebiotic comprises one or more of inulin, pectin, or chitosan.

13. The feed supplement of claim 1, wherein the carrier is an oil, a wax, a microparticle, a microsphere, a microcapsule, or a nanoparticle, and wherein the methanogenesis inhibitor is encapsulated in the carrier.

14. The feed supplement of claim 13, wherein the carrier further comprises an excipient.

15. The feed supplement of claim 1, wherein the algae is a Rhodophyta (red algae), a Phaeophyta (Brown algae), a Chlorophyta (Green algae) or a combination thereof.

16. The feed supplement of claim 1, wherein the algae is one or more of a *Porphyra* spp, a *Gracilaria* spp, a *Undaria pinnatifida*, a *Saccharina latissima*, a *Laminaria digitata*, a *Alaria esculenta*, a *Sargassum fusiforme*, a *Ulva* spp, a *Monostroma* spp, *Asparagopsis armada*, or *Asparagopsis taxiformis.*

17. The feed supplement of claim 1, wherein the algae is selected from *Ascophyllum nodosum, Laminaria digitata, Ulva* sp., *Codium* sp., and mixtures thereof.

18. The feed supplement of claim 1, wherein the binder is a coating agent, a caking agent, or a combination thereof.

19. The feed supplement of claim 1, wherein the binder is a gum, an oil, a fat, a wax, a lipid, a protein, a polysaccharide, a sugar, molasses, cane syrup, high fructose corn syrup, or a combination thereof.

20. The feed supplement of claim 1, further comprising a flavor masking agent.

21. The feed supplement of claim 20, herein the flavor masking agent is oregano, molasses, distiller's grain, rolled oats, or a combination thereof.

22. The feed supplement of claim 1, further comprising an odor masking agent.

23. The feed supplement of claim 22, herein the odor masking agent is oregano, molasses, distiller's grain, rolled oats, or a combination thereof.

24. A method of preparing a feed supplement comprising:

preparing a formulation comprising at least one methanogenesis inhibitor;

contacting the formulation with a substrate and a binder to obtain a mixture; and dry mixing the mixture; wherein the substrate is an algae, and wherein the methanogenesis inhibitor is an exogenous methanogenesis inhibitor not derived from the algae.

25. The method of claim 24, the method further comprising contacting the formulation with an additive, wherein the additive comprises:

an essential oil, an antibiotic, an ionophore, a saponin, a tannin, a terpene, 3-Nitrooxypropanol, propylene glycol, fumaric acid, a green tea extract, a grape pomace, a a garlic and citrus extract, a Biochar, a dried yeast, a probiotic, a fiber, a prebiotic, or a combination thereof.

26. The method of claim 25, wherein the essential oil comprises one or more of oregano oil, lemongrass oil, garlic oil, cinnamon oil, *eucalyptus* oil, clove oil, rosemary oil, thyme oil, paprika oil, juniper oil, ginger oil, lavender oil, lemon oil, or peppermint oil.

27. The method of claim 25, wherein the ionophore comprises one or more of monensin, lasalocid, salinomycin, or laidlomycin.

28. The method of claim 25, wherein the probiotic comprises one or more of a methane oxidizing bacteria, a propionic acid producing bacteria, an acetic acid producing bacteria, or a butyric acid producing bacteria.

29. The method of claim 25, wherein the prebiotic comprises one or more of inulin, pectin, or chitosan.

30. The method of claim 24, the method further comprising contacting the formulation with a flavor masking agent.

31. The method of claim 24, the method further comprising contacting the formulation with an odor masking agent.

32. The method of claim 24, wherein the methanogenesis inhibitor is an organohalide or a salt thereof.

33. The method of claim 32, wherein the organohalide salt has a formula $(X_3C—)_aY+$, and wherein:

X is a halide selected from bromine, chlorine, or iodine; and

Y is an inorganic cation, wherein:

when a=1, Y is an inorganic monovalent cation;

when a=2, Y is an inorganic bivalent cation; and when a=3, Y is an inorganic trivalent cation.

34. The method of claim 33, wherein the organohalide salt is $(Br_3C—)Na+$ or $(Br_3C—)K+$.

35. The method of claim 32, wherein the organohalide is a haloform selected from a group consisting of: bromoform, chloroform, derivatives thereof, and combinations thereof.

36. The method of claim 35, wherein the haloform is present in the feed supplement at a concentration from approximately 10% w/w to approximately 30% w/w.

37. The method of claim 35, wherein the haloform is encapsulated in a biologically acceptable carrier, wherein the haloform and the carrier are present in a ratio from approximately 0.1:1 to approximately 100:1.

38. The method of claim 37, wherein the carrier is an oil, a wax, a microparticle, a microsphere, a microcapsule, or a nanoparticle, and wherein the methanogenesis inhibitor is encapsulated in the carrier.

39. The method of claim 38, wherein the carrier further comprises an excipient.

40. The method of claim 24, wherein the algae is a Rhodophyta (red algae), a Phaeophyta (brown algae), a Chlorophyta (green algae) or a combination thereof.

41. The method of claim 24, wherein the algae is one or more of a *Porphyra* spp, a *Gracilaria* spp, a *Undaria pinnatifida*, a *Saccharina latissima*, a *Laminaria digitata*, a *Alaria esculenta*, a *Sargassum fusiforme*, a *Ulva* spp, a *Monostroma* spp, *Asparagopsis armada*, or *Asparagopsis taxiformis.*

42. The method of claim 24, wherein the binder is a gum, an oil, a fat, a wax, a lipid, a protein, a polysaccharide, a sugar, molasses, cane syrup, high fructose corn syrup, or a combination thereof.

43. The method of claim 24, wherein the formulation when stored from approximately 1 day to approximately 30 days at ambient temperature has a reduction in methanogenesis inhibitor content by less than approximately 90% w/w to less than approximately 1% w/w.

44. The method of claim 24, wherein the formulation when stored from approximately 1 day to approximately 3 days at ambient temperature has a reduction in methanogenesis inhibitor content by less than approximately 30% w/w to less than approximately 10% w/w.

45. A method for the use of of a feed supplement for reducing methane production in a ruminant animal, wherein the use of the feed supplement comprises:

administering the feed supplement to the ruminant animal, wherein the feed supplement comprises:

a formulation comprising at least one methanogenesis inhibitor encapsulated in a biologically acceptable carrier;

a substrate; and a binder; wherein the substrate is an algae, and wherein the methanogenesis inhibitor is an exogenous methanogenesis inhibitor not derived from the algae; and wherein use of the feed supplement reduces methane production by the ruminant animal from below approximately 70 L/day to below approximately 35 L/day.

46. The method of claim 45, wherein use of the feed supplement reduces methane production by the ruminant animal from below approximately 70 L/day to below approximately 2 L/day.

47. The method of claim 45, wherein use of the feed supplement reduces methane production by the ruminant animal from below approximately 22 L/day to below approximately 5 L/day.

48. The method of claim 45, wherein use of the feed supplement reduces methane production to below approximately 2.2 L/day of a daily dry matter intake (DMI) by the ruminant animal.

49. The method of claim 45, wherein the feed supplement comprises the methanogenesis inhibitor in an amount from approximately 2 mg to approximately 20 mg per gram of the feed supplement.

50. The method of claim 45, wherein the feed supplement provides the methanogenesis inhibitor in an amount from approximately 0.2 mg to approximately 1260 mg per kg body weight of the ruminant animal.

51. The method of claim 45, wherein the feed supplement is administered at a rate to supply approximately 0.05% to approximately 2.5% of a daily dry matter intake (DMI) by the ruminant animal.

52. The method of claim 45, wherein the ruminant animal is a cattle, a goat, a sheep, or a buffalo.

53. The method of claim 45, wherein ruminant animal administered the feed supplement provides approximately 0.1% to approximately 21% more meat than ruminant animals not provided the feed supplement.

54. The method of claim 45, wherein the ruminant animal administered the feed supplement provides approximately 0.05% to approximately 21% more milk than ruminant animals not administered the feed supplement.

55. The method of claim 45, wherein the the ruminant animal administered the feed supplement provides approximately 5% to approximately 31% more wool compared to ruminant animals not administered the feed supplement.

56. The method of claim 45, wherein the feed supplement improves feed efficiency from approximately 0.1% to approximately 12% when administered to the ruminant animal, wherein feed efficiency is based on a ratio of an average daily weight gain of the ruminant animal.

57. The method of claim 45, wherein use of the feed supplement reduces methane production by the ruminant animal from approximately 10% to approximately 30% compared to ruminant animals that are not administered the feed supplement.

58. A kit for an enteric methane-reducing feed supplement for a ruminant animal comprising:

a formulation comprising at least one methanogenesis inhibitor encapsulated in a biologically acceptable carrier;

a substrate;

a binder; and instructions for making the methane-reducing feed supplement;

wherein the substrate is an algae, and wherein the methanogenesis inhibitor is an exogenous methanogenesis inhibitor not derived from the algae.

* * * * *